United States Patent [19]
Shimo

[11] Patent Number: 5,815,321
[45] Date of Patent: Sep. 29, 1998

[54] ZOOM LENS SYSTEM

[75] Inventor: Mituaki Shimo, Osaka, Japan

[73] Assignee: Minolta Co., Ltd., Osaka, Japan

[21] Appl. No.: 726,312

[22] Filed: Oct. 2, 1996

[30] Foreign Application Priority Data

Oct. 6, 1995 [JP] Japan .................................. 7-260147
Oct. 6, 1995 [JP] Japan .................................. 7-260154

[51] Int. Cl.⁶ ................................................. G02B 15/14
[52] U.S. Cl. ........................................ 359/687; 359/686
[58] Field of Search .................................. 359/686, 687, 359/683, 747, 753, 771, 772, 774

[56] References Cited

U.S. PATENT DOCUMENTS

| | | | |
|---|---|---|---|
| 4,629,294 | 12/1986 | Tanaka et al. | 359/687 |
| 4,695,133 | 9/1987 | Kitagishi et al. | 359/687 |
| 4,917,482 | 4/1990 | Ito | 350/423 |
| 5,134,524 | 7/1992 | Hamano et al. | 359/683 |
| 5,412,507 | 5/1995 | Sato | 359/687 |
| 5,537,255 | 7/1996 | Tochigi | 359/683 |
| 5,568,321 | 10/1996 | Ogawa et al. | 359/676 |

FOREIGN PATENT DOCUMENTS 59-52214   3/1984   Japan .

Primary Examiner—Frank G. Font
Assistant Examiner—Michael P. Stafira
Attorney, Agent, or Firm—Price, Gess & Ubell

[57] ABSTRACT

A zoom lens system has four lens units. The first, third and fourth lens units thereof are lens units of positive power. The second lens unit thereof has negative power. During zooming, the first lens unit is moved. During focusing, the second and third lens units are moved and a distance between the third and fourth lens units is varied. The third lens unit is moved toward an object side.

33 Claims, 39 Drawing Sheets

FNO = 4.10
[W(∞)]
— d
----- SC
-0.5    0.5
SPHERICAL  SINE
ABERRATION CONDITION

Y' = 17.3
----- DM
— DS
-0.5    0.5
ASTIGMATISM

Y' = 17.3
-5.0    5.0
DISTORTION %

FNO = 5.21
[M(∞)]
— d
----- SC
-0.5    0.5
SPHERICAL  SINE
ABERRATION CONDITION

Y' = 17.3
----- DM
— DS
-0.5    0.5
ASTIGMATISM

Y' = 17.3
-5.0    5.0
DISTORTION %

FNO = 5.67
[T(∞)]
— d
----- SC
-0.5    0.5
SPHERICAL  SINE
ABERRATION CONDITION

Y' = 17.3
----- DM
— DS
-0.5    0.5
ASTIGMATISM

Y' = 17.3
-5.0    5.0
DISTORTION %

EFFECTIVE FNO=4.10

[W(D)]
—— d
---- SC

-0.5   0.5
SPHERICAL SINE
ABERRATION CONDITION

Y'=17.3

---- DM
—— DS

-0.5   0.5
ASTIGMATISM

Y'=17.3

-5.0   5.0
DISTORTION %

EFFECTIVE FNO=5.21

[M(D)]
—— d
---- SC

-0.5   0.5
SPHERICAL SINE
ABERRATION CONDITION

Y'=17.3

---- DM
—— DS

-0.5   0.5
ASTIGMATISM

Y'=17.3

-5.0   5.0
DISTORTION %

EFFECTIVE FNO=5.67

[T(D)]
—— d
---- SC

-0.5   0.5
SPHERICAL SINE
ABERRATION CONDITION

Y'=17.3

---- DM
—— DS

-0.5   0.5
ASTIGMATISM

Y'=17.3

-5.0   5.0
DISTORTION %

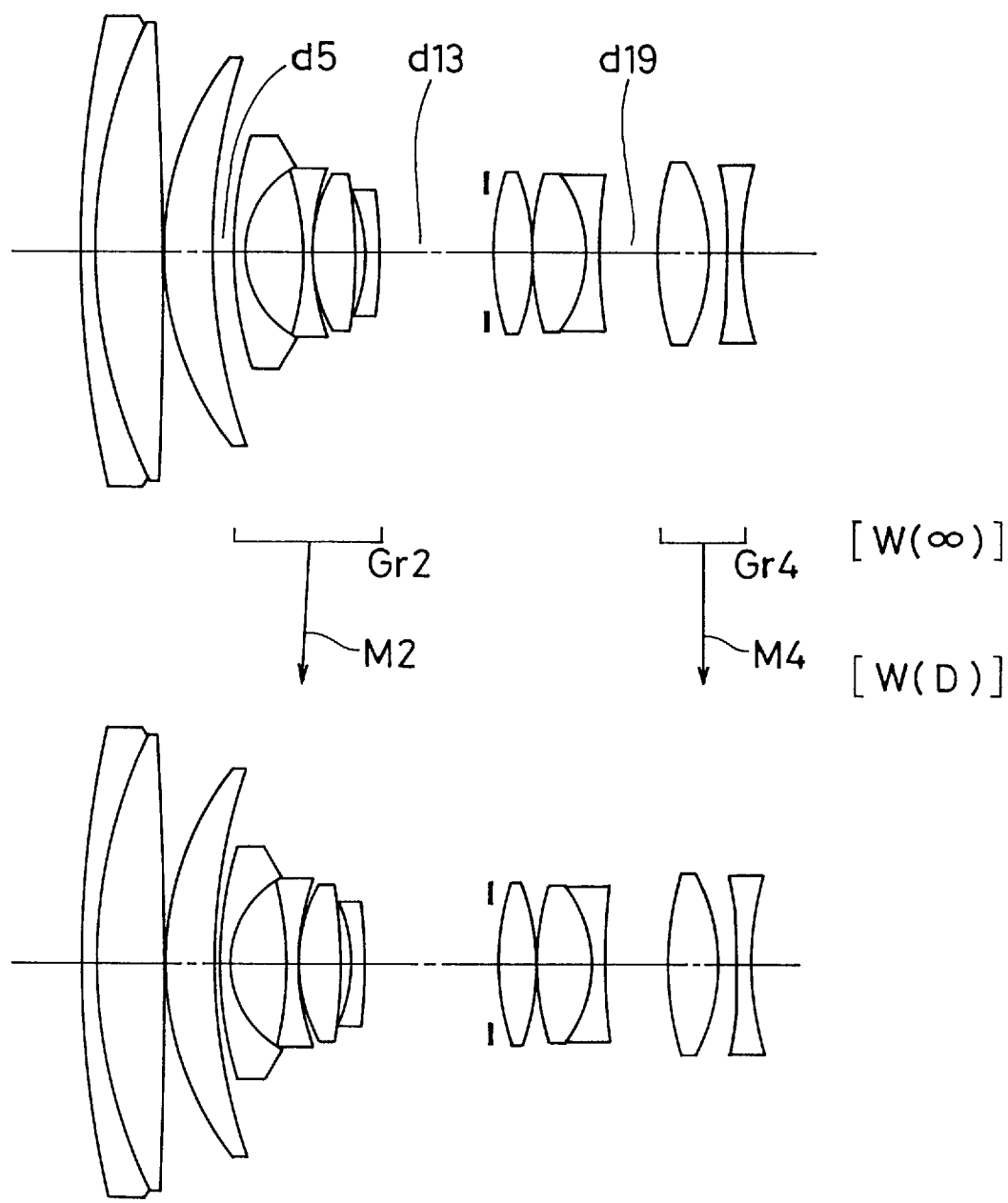

EFFECTIVE FNO=4.06

[W(D)]
— d
---- SC

-0.5  0.5
SPHERICAL   SINE
ABERRATION  CONDITION

Y'=17.3

---- DM
— DS

-0.5  0.5
ASTIGMATISM

Y'=17.3

-5.0  5.0
DISTORTION %

EFFECTIVE FNO=5.16

[M(D)]
— d
---- SC

-0.5  0.5
SPHERICAL   SINE
ABERRATION  CONDITION

Y'=17.3

---- DM
— DS

-0.5  0.5
ASTIGMATISM

Y'=17.3

-5.0  5.0
DISTORTION %

EFFECTIVE FNO=5.62

[T(D)]
— d
---- SC

-0.5  0.5
SPHERICAL   SINE
ABERRATION  CONDITION

Y'=17.3

---- DM
— DS

-0.5  0.5
ASTIGMATISM

Y'=17.3

-5.0  5.0
DISTORTION %

EFFECTIVE FNO = 4.08
[W(D)]
—— d
---- SC
-0.5   0.5
SPHERICAL  SINE
ABERRATION CONDITION

Y' = 17.3
---- DM
—— DS
-0.5   0.5
ASTIGMATISM

Y' = 17.3
-5.0   5.0
DISTORTION %

EFFECTIVE FNO = 5.19
[M(D)]
—— d
---- SC
-0.5   0.5
SPHERICAL  SINE
ABERRATION CONDITION

Y' = 17.3
---- DM
—— DS
-0.5   0.5
ASTIGMATISM

Y' = 17.3
-5.0   5.0
DISTORTION %

EFFECTIVE FNO = 5.64
[T(D)]
—— d
---- SC
-0.5   0.5
SPHERICAL  SINE
ABERRATION CONDITION

Y' = 17.3
---- DM
—— DS
-0.5   0.5
ASTIGMATISM

Y' = 17.3
-5.0   5.0
DISTORTION %

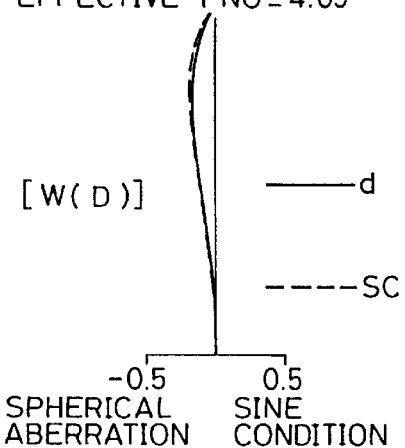
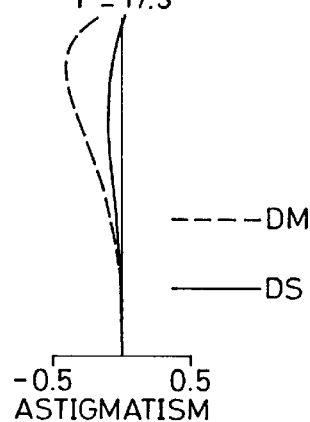
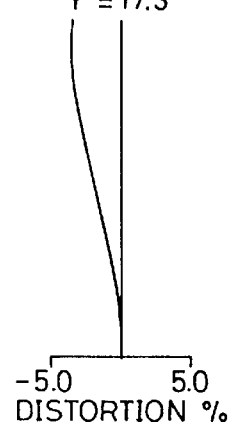
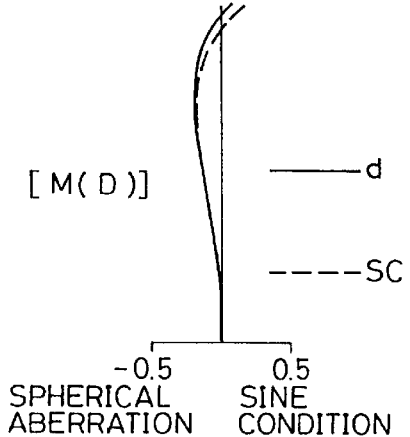
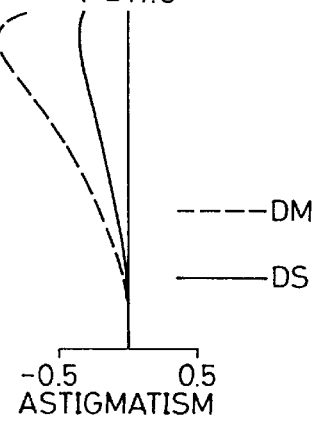
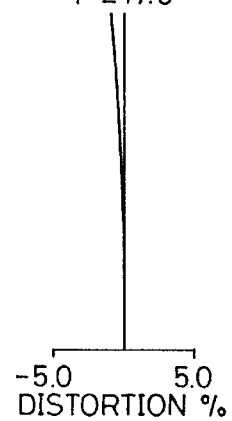
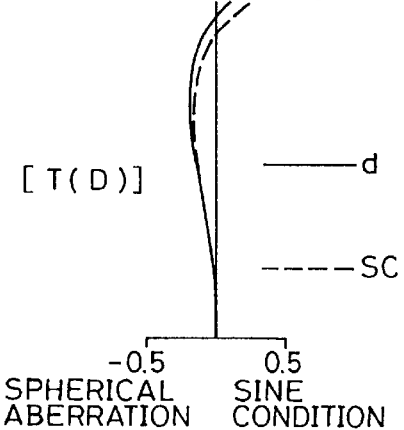
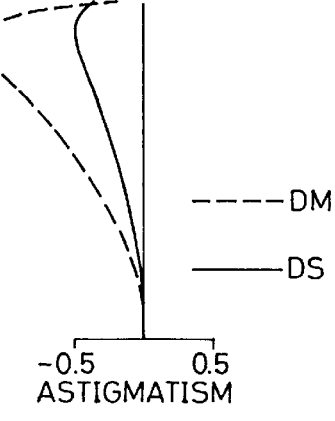
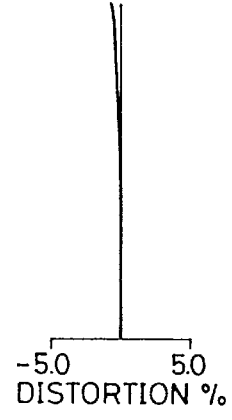

FNO = 4.10

[W(∞)]

— d
---- SC

-0.5  0.5
SPHERICAL ABERRATION
SINE CONDITION

Y' = 17.3

---- DM
— DS

-0.5  0.5
ASTIGMATISM

Y' = 17.3

-5.0  5.0
DISTORTION %

FNO = 4.90

[M(∞)]

— d
---- SC

-0.5  0.5
SPHERICAL ABERRATION
SINE CONDITION

Y' = 17.3

---- DM
— DS

-0.5  0.5
ASTIGMATISM

Y' = 17.3

-5.0  5.0
DISTORTION %

FNO = 5.80

[T(∞)]

— d
---- SC

-0.5  0.5
SPHERICAL ABERRATION
SINE CONDITION

Y' = 17.3

---- DM
— DS

-0.5  0.5
ASTIGMATISM

Y' = 17.3

-5.0  5.0
DISTORTION %

EFFECTIVE FNO=4.09

[W(D)]
—— d
---- SC

-0.5   0.5
SPHERICAL  SINE
ABERRATION CONDITION

Y'=17.3

---- DM
—— DS

-0.5   0.5
ASTIGMATISM

Y'=17.3

-5.0   5.0
DISTORTION %

EFFECTIVE FNO=4.88

[M(D)]
—— d
---- SC

-0.5   0.5
SPHERICAL  SINE
ABERRATION CONDITION

Y'=17.3

---- DM
—— DS

-0.5   0.5
ASTIGMATISM

Y'=17.3

-5.0   5.0
DISTORTION %

EFFECTIVE FNO=5.76

[T(D)]
—— d
---- SC

-0.5   0.5
SPHERICAL  SINE
ABERRATION CONDITION

Y'=17.3

---- DM
—— DS

-0.5   0.5
ASTIGMATISM

Y'=17.3

-5.0   5.0
DISTORTION %

FNO=4.09
[W(D)]
———d
----SC
-0.5   0.5
SPHERICAL   SINE
ABERRATION  CONDITION

Y'=17.3
----DM
———DS
-0.5   0.5
ASTIGMATISM

Y'=17.3
-5.0   5.0
DISTORTION %

FNO=5.21
[M(D)]
———d
----SC
-0.5   0.5
SPHERICAL   SINE
ABERRATION  CONDITION

Y'=17.3
----DM
———DS
-0.5   0.5
ASTIGMATISM

Y'=17.3
-5.0   5.0
DISTORTION %

FNO=5.67
[T(D)]
———d
----SC
-0.5   0.5
SPHERICAL   SINE
ABERRATION  CONDITION

Y'=17.3
----DM
———DS
-0.5   0.5
ASTIGMATISM

Y'=17.3
-5.0   5.0
DISTORTION %

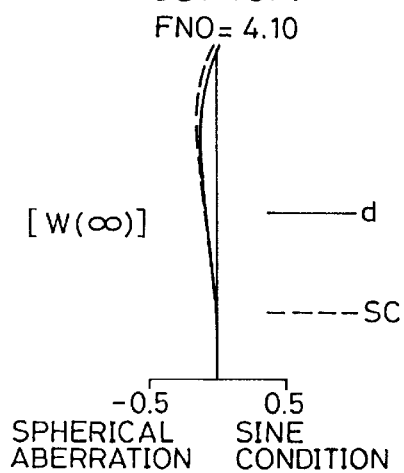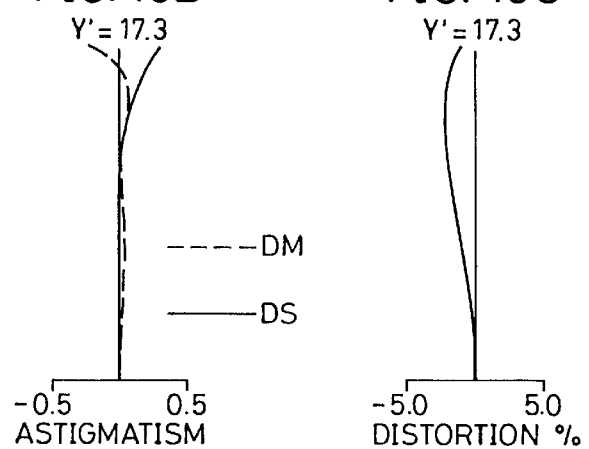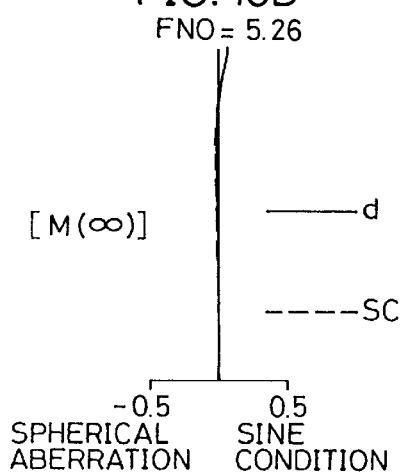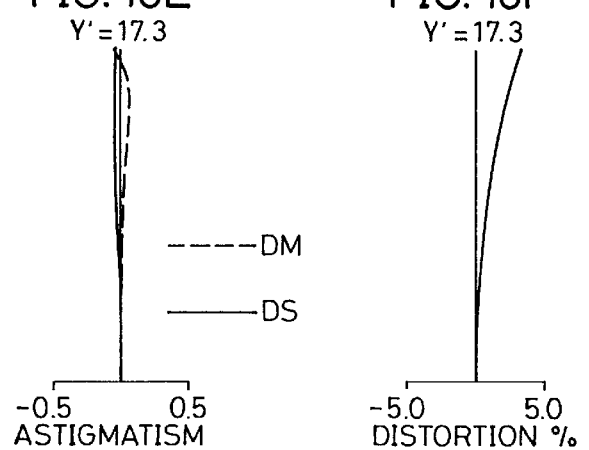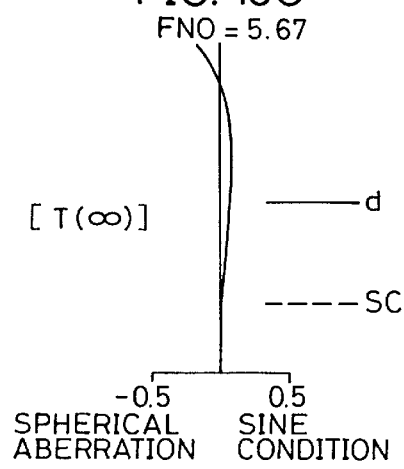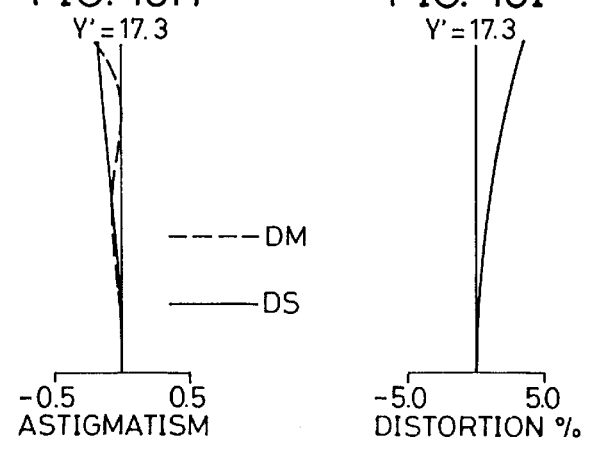

EFFECTIVE FNO = 4.09

[W(D)]
—— d
---- SC

-0.5    0.5
SPHERICAL   SINE
ABERRATION  CONDITION

Y' = 17.3

---- DM
—— DS

-0.5    0.5
ASTIGMATISM

Y' = 17.3

-5.0    5.0
DISTORTION %

EFFECTIVE FNO = 5.26

[M(D)]
—— d
---- SC

-0.5    0.5
SPHERICAL   SINE
ABERRATION  CONDITION

Y' = 17.3

---- DM
—— DS

-0.5    0.5
ASTIGMATISM

Y' = 17.3

-5.0    5.0
DISTORTION %

EFFECTIVE FNO = 5.67

[T(D)]
—— d
---- SC

-0.5    0.5
SPHERICAL   SINE
ABERRATION  CONDITION

Y' = 17.3

---- DM
—— DS

-0.5    0.5
ASTIGMATISM

Y' = 17.3

-5.0    5.0
DISTORTION %

FNO=4.10
[W(∞)]
— d
---- SC
-0.5  0.5
SPHERICAL   SINE
ABERRATION  CONDITION

Y'=17.3
---- DM
— DS
-0.5  0.5
ASTIGMATISM

Y'=17.3
-5.0  5.0
DISTORTION %

FNO=5.26
[M(∞)]
— d
---- SC
-0.5  0.5
SPHERICAL   SINE
ABERRATION  CONDITION

Y'=17.3
---- DM
— DS
-0.5  0.5
ASTIGMATISM

Y'=17.3
-5.0  5.0
DISTORTION %

FNO=5.67
[T(∞)]
— d
---- SC
-0.5  0.5
SPHERICAL   SINE
ABERRATION  CONDITION

Y'=17.3
---- DM
— DS
-0.5  0.5
ASTIGMATISM

Y'=17.3
-5.0  5.0
DISTORTION %

EFFECTIVE FNO = 4.09

[W(D)]
—— d
---- SC

-0.5    0.5
SPHERICAL  SINE
ABERRATION CONDITION

Y' = 17.3

---- DM
—— DS

-0.5    0.5
ASTIGMATISM

Y' = 17.3

-5.0    5.0
DISTORTION %

EFFECTIVE FNO = 5.29

[M(D)]
—— d
---- SC

-0.5    0.5
SPHERICAL  SINE
ABERRATION CONDITION

Y' = 17.3

---- DM
—— DS

-0.5    0.5
ASTIGMATISM

Y' = 17.3

-5.0    5.0
DISTORTION %

EFFECTIVE FNO = 5.72

[T(D)]
—— d
---- SC

-0.5    0.5
SPHERICAL  SINE
ABERRATION CONDITION

Y' = 17.3

---- DM
—— DS

-0.5    0.5
ASTIGMATISM

Y' = 17.3

-5.0    5.0
DISTORTION %

FNO=4.10

[W]

—— d
---- SC

-0.5   0.5
SPHERICAL    SINE
ABERRATION   CONDITION

Y'=17.3

---- DM
—— DS

-0.5   0.5
ASTIGMATISM

Y'=17.3

-5.0   5.0
DISTORTION %

FNO=5.21

[M]

—— d
---- SC

-0.5   0.5
SPHERICAL    SINE
ABERRATION   CONDITION

Y'=17.3

---- DM
—— DS

-0.5   0.5
ASTIGMATISM

Y'=17.3

-5.0   5.0
DISTORTION %

FNO=5.67

[T]

—— d
---- SC

-0.5   0.5
SPHERICAL    SINE
ABERRATION   CONDITION

Y'=17.3

---- DM
—— DS

-0.5   0.5
ASTIGMATISM

Y'=17.3

-5.0   5.0
DISTORTION %

EFFECTIVE FNO=4.11
[W]
——— d
---- SC
-0.5    0.5
SPHERICAL   SINE
ABERRATION  CONDITION

Y'=17.3
---- DM
——— DS
-0.5    0.5
ASTIGMATISM

Y'=17.3
-5.0    5.0
DISTORTION %

EFFECTIVE FNO=5.21
[M]
——— d
---- SC
-0.5    0.5
SPHERICAL   SINE
ABERRATION  CONDITION

Y'=17.3
---- DM
——— DS
-0.5    0.5
ASTIGMATISM

Y'=17.3
-5.0    5.0
DISTORTION %

EFFECTIVE FNO=5.67
[T]
——— d
---- SC
-0.5    0.5
SPHERICAL   SINE
ABERRATION  CONDITION

Y'=17.3
---- DM
——— DS
-0.5    0.5
ASTIGMATISM

Y'=17.3
-5.0    5.0
DISTORTION %

EFFECTIVE FNO= 4.05

[W]

— d
---- SC

-0.5    0.5
SPHERICAL  SINE
ABERRATION CONDITION

Y'=17.3

---- DM
—— DS

-0.5    0.5
ASTIGMATISM

Y'=17.3

-5.0    5.0
DISTORTION %

EFFECTIVE FNO= 5.15

[M]

— d
---- SC

-0.5    0.5
SPHERICAL  SINE
ABERRATION CONDITION

Y'=17.3

---- DM
—— DS

-0.5    0.5
ASTIGMATISM

Y'=17.3

-5.0    5.0
DISTORTION %

EFFECTIVE FNO= 5.61

[T]

— d
---- SC

-0.5    0.5
SPHERICAL  SINE
ABERRATION CONDITION

Y'=17.3

---- DM
—— DS

-0.5    0.5
ASTIGMATISM

Y'=17.3

-5.0    5.0
DISTORTION %

EFFECTIVE FNO = 4.08
[W]
—— d
---- SC
-0.5   0.5
SPHERICAL   SINE
ABERRATION   CONDITION

Y' = 17.3
---- DM
—— DS
-0.5   0.5
ASTIGMATISM

Y' = 17.3
-5.0   5.0
DISTORTION %

EFFECTIVE FNO = 5.18
[M]
—— d
---- SC
-0.5   0.5
SPHERICAL   SINE
ABERRATION   CONDITION

Y' = 17.3
---- DM
—— DS
-0.5   0.5
ASTIGMATISM

Y' = 17.3
-5.0   5.0
DISTORTION %

EFFECTIVE FNO = 5.64
[T]
—— d
---- SC
-0.5   0.5
SPHERICAL   SINE
ABERRATION   CONDITION

Y' = 17.3
---- DM
—— DS
-0.5   0.5
ASTIGMATISM

Y' = 17.3
-5.0   5.0
DISTORTION %

EFFECTIVE FNO=4.09
[W(D)]
—— d
---- SC
-0.5    0.5
SPHERICAL   SINE
ABERRATION  CONDITION

Y'=17.3
---- DM
—— DS
-0.5    0.5
ASTIGMATISM

Y'=17.3
-5.0    5.0
DISTORTION %

EFFECTIVE FNO=5.21
[M(D)]
—— d
---- SC
-0.5    0.5
SPHERICAL   SINE
ABERRATION  CONDITION

Y'=17.3
---- DM
—— DS
-0.5    0.5
ASTIGMATISM

Y'=17.3
-5.0    5.0
DISTORTION %

EFFECTIVE FNO=5.67
[T(D)]
—— d
---- SC
-0.5    0.5
SPHERICAL   SINE
ABERRATION  CONDITION

Y'=17.3
---- DM
—— DS
-0.5    0.5
ASTIGMATISM

Y'=17.3
-5.0    5.0
DISTORTION %

W(∞)

M(∞)

T(∞)

W(D)

M(D)

T(D)

W(D)

M(D)

T(D)

W(D)

M(D)

T(D)

W(D)

M(D)

T(D)

ZOOM LENS SYSTEM

BACKGROUND OF THE INVENTION

1. Field of the Invention

The present invention relates to a zoom lens system, more particularly to a zoom lens system that is suitable to close-up shooting.

2. Description of the Prior Art

In a zoom lens system, the focusing in close-up shooting is most commonly achieved by moving out one lens unit. This focusing method conveniently allows, among other things, the lens barrel construction to be simplified, on one hand, but it inconveniently causes the aberration to deteriorate as the closest shooting distance is made shorter, and also demands rather a large lens unit to be moved for focusing, on the other hand. For these reasons, other methods such as the internal focusing method and the rear focusing method have been proposed as substitutes for the above described method.

In particular, the internal focusing method conveniently allows, among other things, the closest shooting distance to be made shorter, the focusing lens unit to be made smaller and lighter, the focusing movement amount to be made smaller, and the aberration to deteriorate less. For these reasons, this focusing method is adopted in more and more commercial products nowadays. For example, various conventional zoom lens systems are known which include a positive lens unit and a negative lens unit in this order from the object-side end, and in which the second lens unit is used as a focusing lens unit. There, the internal focusing using the second lens unit contributes to the reduction of aberration in close-up shooting.

However, even though the deterioration of the aberration is reduced in this type of zoom lens system, the aberration does deteriorate anyway at close shooting distances, and the deterioration becomes severer as the shooting distance becomes shorter. Especially, at a shooting magnification β exceeding about $-\frac{1}{4}$, the aberration deterioration (the inclination of the image surface, in particular) grows so great that it is no more possible to secure practical optical performance.

Moreover, a zoom lens system is also known which consists of four lens units, that is, positive, negative, positive, and positive lens units, and in which all the lens units are movable. This construction makes it easy to widen the zooming range and to correct aberration.

However, when the second lens unit is used as a focusing lens unit in a four-lens-unit zoom lens system consisting of positive, negative, positive, and positive lens units, the movement amount of the focusing lens unit becomes greater as the closest-shooting-distance is made shorter. An attempt to secure the space for the movement results in a longer total length of the zoom lens system, and an attempt to strengthen the refractive power of the second lens to make the focusing movement amount smaller leads to more complicated aberration compensation.

SUMMARY OF THE INVENTION

An object of the present invention is to provide a zoom lens system that suffers less aberration deterioration even when the closest shooting distance is made shorter.

Another object of the present invention is to provide a zoom lens system that offers a shorter closest shooting distance, compactness, and a high degree of optical performance at the same time.

To achieve the above objects, according to the present invention, a zoom lens system comprises, from the object-side end, a first lens unit having a positive refractive power and a second lens unit having a negative refractive power, and, closer to the image-surface-side end than the second lens, an nth lens unit having a positive refractive power and an (n+1)th lens unit having a positive refractive power. During zooming, at least the first lens unit moves. During focusing, the second lens unit moves at the same time as the distance between the nth and (n+1)th lens units varies.

In a zoom lens system as described above, which comprises, from the object-side end, a first lens unit having a positive refractive power and a second lens unit having a negative refractive power, and, closer to the image-surface-side end than the second lens, an nth lens unit having a positive refractive power and an (n+1)th lens unit having a positive refractive power, and in which at least the first lens unit moves during zooming and the second lens unit moves during focusing, the spherical aberration varies only slightly, whereas the inclination of the image surface becomes greater as the shooting magnification becomes greater. In the present invention, this inclination of the image surface is corrected without much affecting other types of aberration by varying the distance between the nth and (n+1)th lens units as described below.

The first lens unit makes axial light rays converge, and the second lens unit then makes them diverge. Ultimately, the two adjacent positive lens units (the nth and (n+1)th lens units) make the light rays converge. Meanwhile, since the nth and (n+1)th lens units have the same effect on axial light rays, the angle that a light ray forms with respect to the optical axis between the nth and (n+1)th lens units is within the range between the angle that the light ray forms with respect to the optical axis when entering the nth lens unit and the angle that the light ray forms with respect to the optical axis when exiting from the (n+1)th lens unit. This means that the light rays are nearly parallel to the optical axis between the nth and (n+1)th lens units. Consequently, even when the distance between the nth and (n+1)th lens units varies, axial light rays do not suffer so much aberration. On the other hand, off-axial light rays form greater angles with respect to the optical axis between the nth and (n+1)th lens units. Consequently, when the distance between the nth and (n+1)th lens units varies, off-axial light rays suffer a greater change of the image surface. Accordingly, by varying the distance between the nth and (n+1)th lens units, the inclination of the image surface resulting from the focusing using the second lens unit can be corrected.

According to one feature of the present invention, it is desirable that a zoom lens system consist of four lens units, that is, from the object-side end, a first lens unit having a positive refractive power, a second lens unit having a negative refractive power, a third lens unit having a positive refractive power, and a fourth lens unit having a positive refractive power. This is because a construction in which all the lens units are movable makes it easy to widen the zooming range and to correct aberration. Moreover, in this four-lens-unit construction, it is desirable that the third lens unit in addition to the second lens unit be moved during focusing, or that the fourth lens unit in addition to the second lens unit be moved during focusing, or that the third and fourth lens units in addition to the second lens unit be moved during focusing.

Moreover, in the present invention, it is desirable that the focusing movement amount of the second lens unit and the amount of change in the distance between the nth and (n+1)th lens units satisfy the following conditional expression (1). When the conditional expression (1) is satisfied, inclination of the image surface in shooting at the closest shooting distance can be corrected more effectively.

$$0.8 \cdot |x_2| > |\Delta x_{n,n+1}| \quad (1)$$

where $x_2$: focusing movement amount of the second lens unit;

$\Delta x_{n,n+1}$: amount of change in the varying distance between the nth and (n+1)th lens units during focusing.

Furthermore, in the present invention, it is desirable that the above amount of change $\Delta x_{n,n+1}$ vary only with the shooting distance but not with zooming. This is because such a construction helps to simplify the lens barrel construction. It is of course possible to allow the amount of change to vary with zooming.

According to another feature of the present invention, a zoom lens system comprises four lens units, that is, from the object-side end, a first lens unit having a positive refractive power, a second lens unit having a negative refractive power, a third lens unit having a positive refractive power, and a fourth lens unit having a positive refractive power. During zooming from the wide-angle end to the telephoto end, all the lens units move in such a way that the distance between the first and second lens units increases and the distance between the second and third lens units decreases. During focusing for close-up shooting, the second lens unit moves toward the object side. Furthermore, the following conditional expressions (2) to (4) are satisfied:

$$4.0 < |f_1/f_2| < 7.0 \quad (2)$$

$$0.1 < f_3/f_4 < 0.5 \quad (3)$$

$$0.45 < (\beta_{2T}/\beta_{2W})/Z < 0.75 \quad (4)$$

where $f_1$: focal length of the first lens unit;
$f_2$: focal length of the second lens unit;
$f_3$: focal length of the third lens unit;
$f_4$: focal length of the fourth lens unit;
$\beta_{2T}$: horizontal magnification of the second lens unit at the longest-focal-length end;
$\beta_{2W}$: horizontal magnification of the second lens unit at the shortest-focal-length end;
Z: zoom ratio.

In the four-lens-unit construction as described above which consists of, from the object-side end, a first lens unit having a positive refractive power, a second lens unit having a negative refractive power, a third lens unit having a positive refractive power, and a fourth lens unit having a positive refractive power, and in which all the lens units are movable, it is easier to widen the zooming range and to correct aberration.

The conditional expression (2) defines the ratio of the refractive power of the first lens unit to that of the second lens unit. When the refractive power of the second lens unit (focusing lens unit) is weaker than that of the first lens unit to such an extent that the lower limit of the conditional expression (2) is exceeded, the movement amount of the second lens unit during focusing for close-up shooting increases, requiring more space to be secured. This makes the total length of the zoom lens system longer and impairs compactness. Moreover, since the distance between the first and second lens units in the infinite-shooting-distance state (object distance =∞) becomes longer, it is difficult to secure sufficient illuminance on the image surface. To reduce the closest shooting distance without impairing compactness, the refractive power of the second lens unit needs to be strengthened. However, when the refractive power of the second lens unit is stronger than that of the first lens unit to such an extent that the upper limit of the conditional expression (2) is exceeded, it is difficult to correct aberrations, especially off-axial coma aberration at the wide-angle end.

The conditional expression (3) defines the ratio of the refractive power of the third lens unit to that of the fourth lens unit. When the refractive power of the third lens unit is stronger than that of the fourth lens unit to such an extent that the lower limit of the conditional expression (3) is exceeded, it is difficult to correct spherical aberration. Reversely, when the refractive power of the fourth lens unit is stronger than that of the third lens unit to such an extent that the upper limit of the conditional expression (3) is exceeded, it is difficult to correct off-axial aberrations, especially sagittal coma aberration, which increases as the whole system is made more compact.

The conditional expression (4) defines the zooming ratio of the second lens unit to that of the whole zoom lens system. To reduce the second lens unit's share of the zooming ratio, either the movement amounts of the third and fourth lens units during zooming need to be made greater, or the refractive powers of the third and fourth lens units need to be made stronger. Reversely, to increase the second lens unit's share of the zooming ratio, either the movement amount of the second lens unit during zooming needs to be made greater, or the refractive power of the second lens unit needs to be made stronger. Therefore, when the second unit's share of the zooming ratio is so small that the lower limit of the conditional expression (4) is exceeded, either the increase in the movement amounts of the third and fourth lens units during zooming impairs compactness, or the excessive refractive powers of the third and fourth lens units make it difficult to correct aberrations, especially spherical aberration and off-axial coma aberration. Reversely, when the second unit's share of the zooming ratio is so large that the upper limit of the conditional expression (4) is exceeded, either the increase in the movement amount of the second lens unit during zooming impairs compactness, or the excessive refractive power of the second lens unit makes it difficult to correct aberrations, especially coma aberration, which affects off-axial optical performance at the wide-angle end.

To achieve a higher degree of compactness and optical performance in a construction according to the present invention, it is preferable that the fourth lens unit include at least one aspherical surface. When the fourth lens unit includes an aspherical surface, it is easy to correct, in particular, sagittal coma aberration, which increases as the whole system is made more compact.

BRIEF DESCRIPTION OF THE DRAWINGS

This and other objects and features of this invention will become clear from the following description, taken in conjunction with the preferred embodiments with reference to the accompanied drawings in which.

Figure 3:
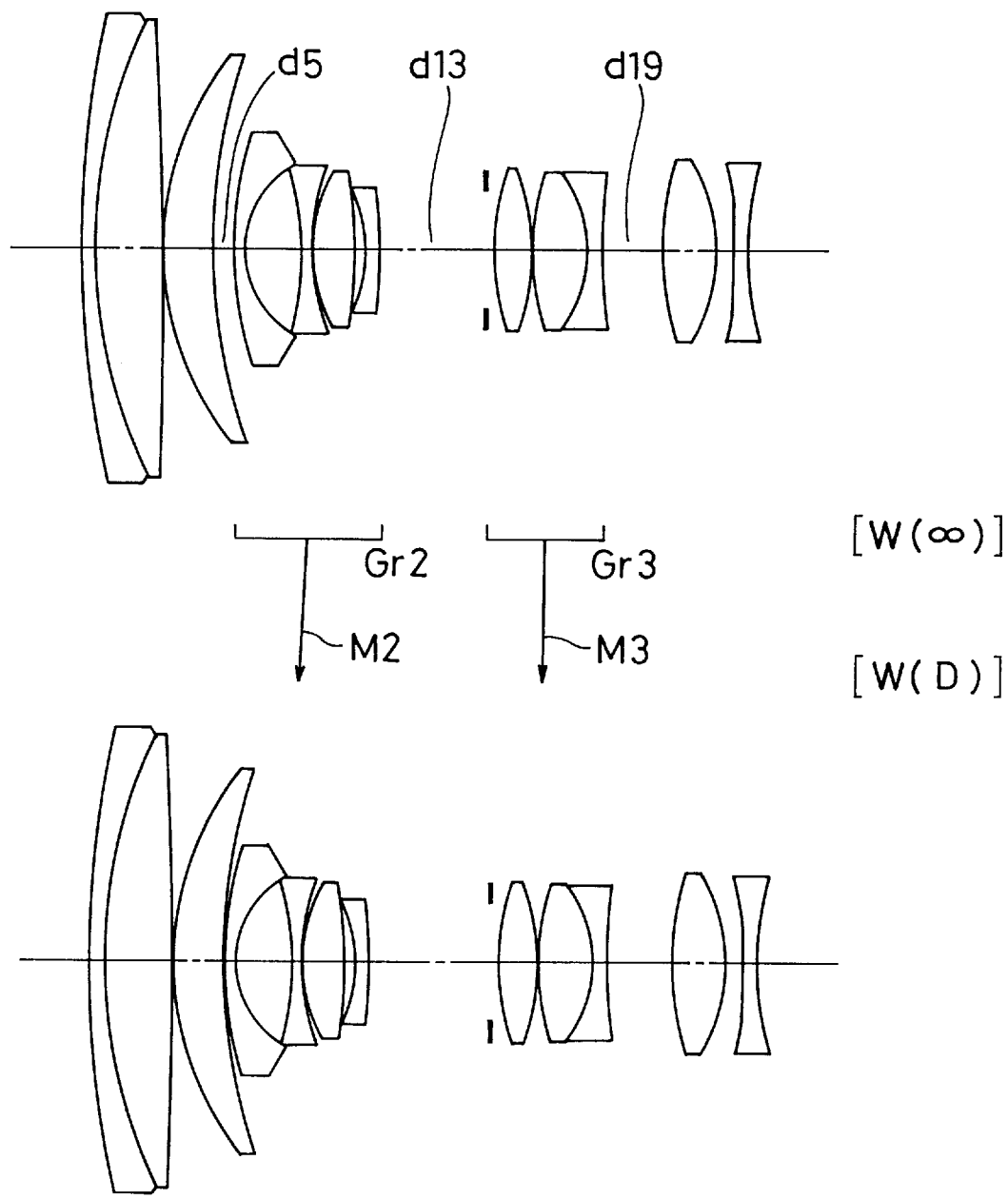
Figure 4A:
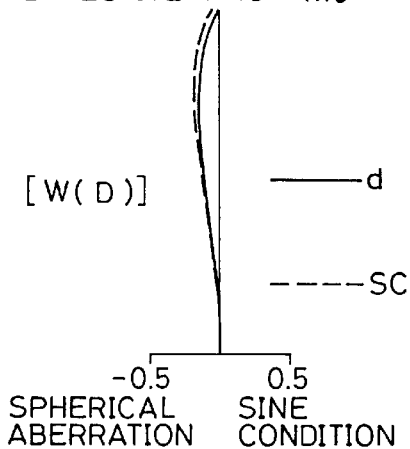
Figure 4B:
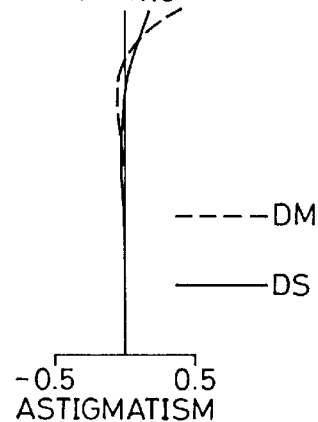
Figure 4C:
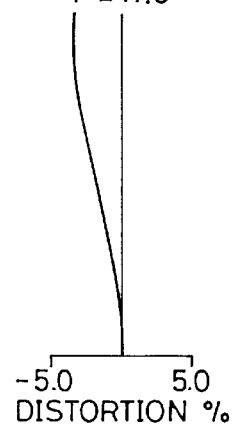
Figure 4D:
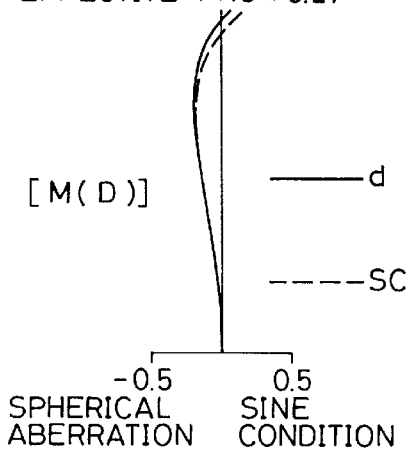
Figure 4E:
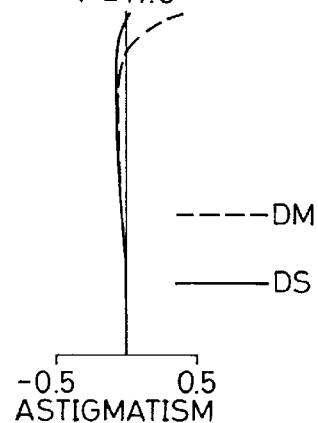
Figure 4F:
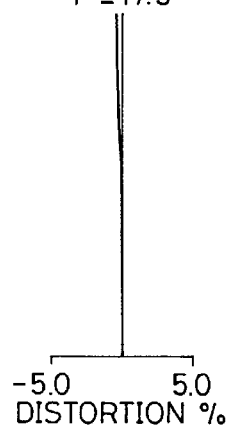
Figure 4G:
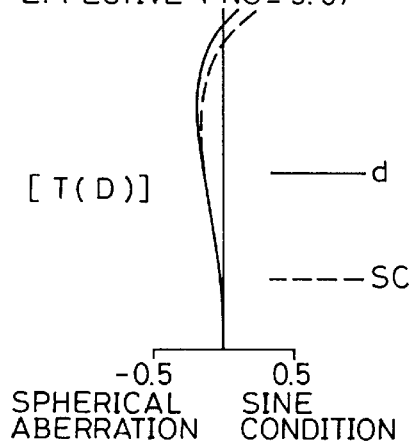
Figure 4H:
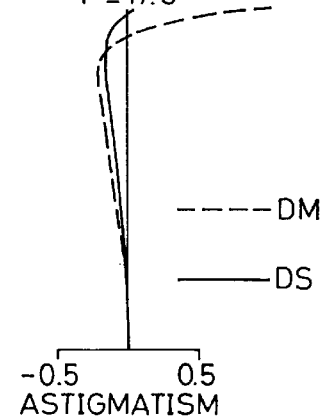
Figure 4I:
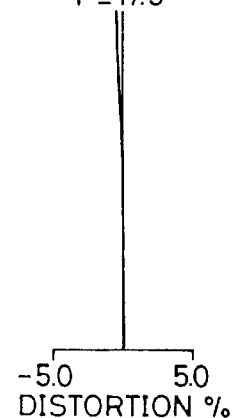
Figure 6A:
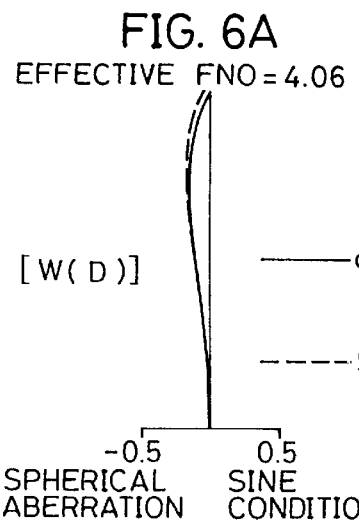
Figure 6B:
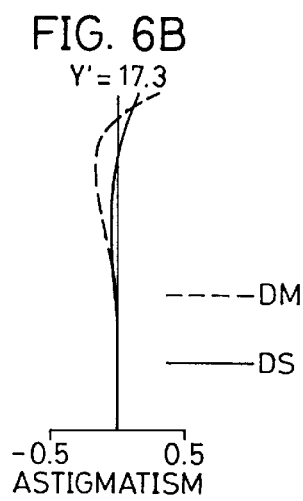
Figure 6C:
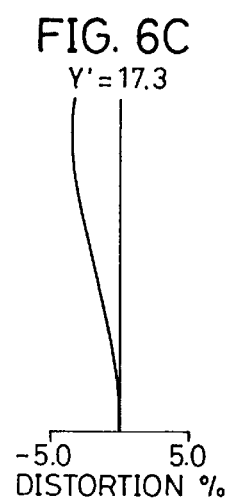
Figure 6D:
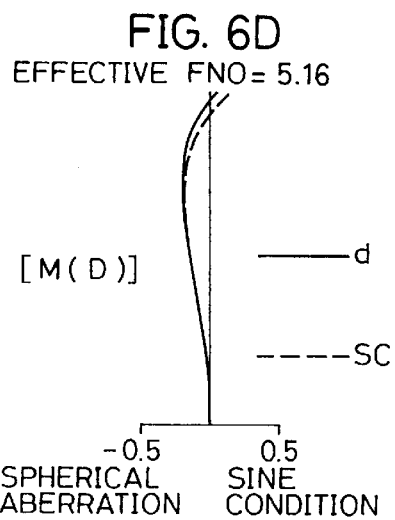
Figure 6E:
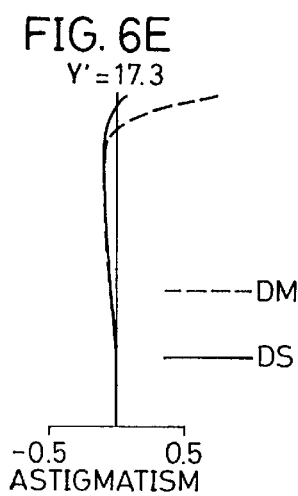
Figure 6F:
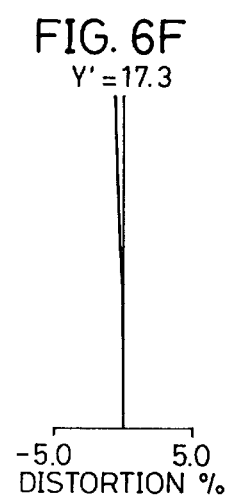
Figure 6G:
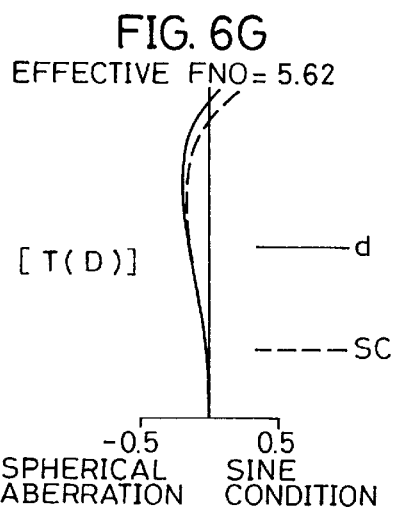
Figure 6H:
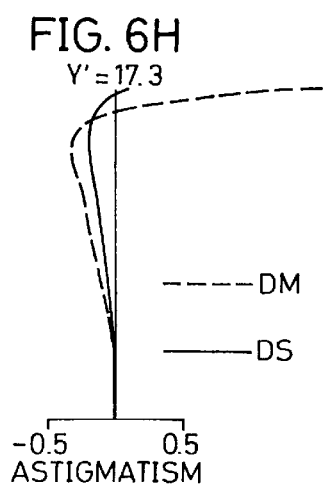
Figure 6I:
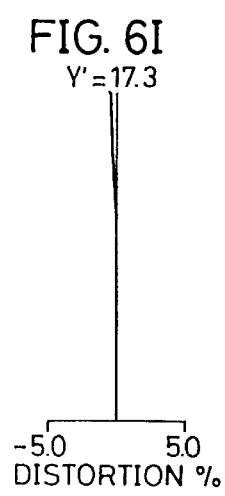
Figure 7:
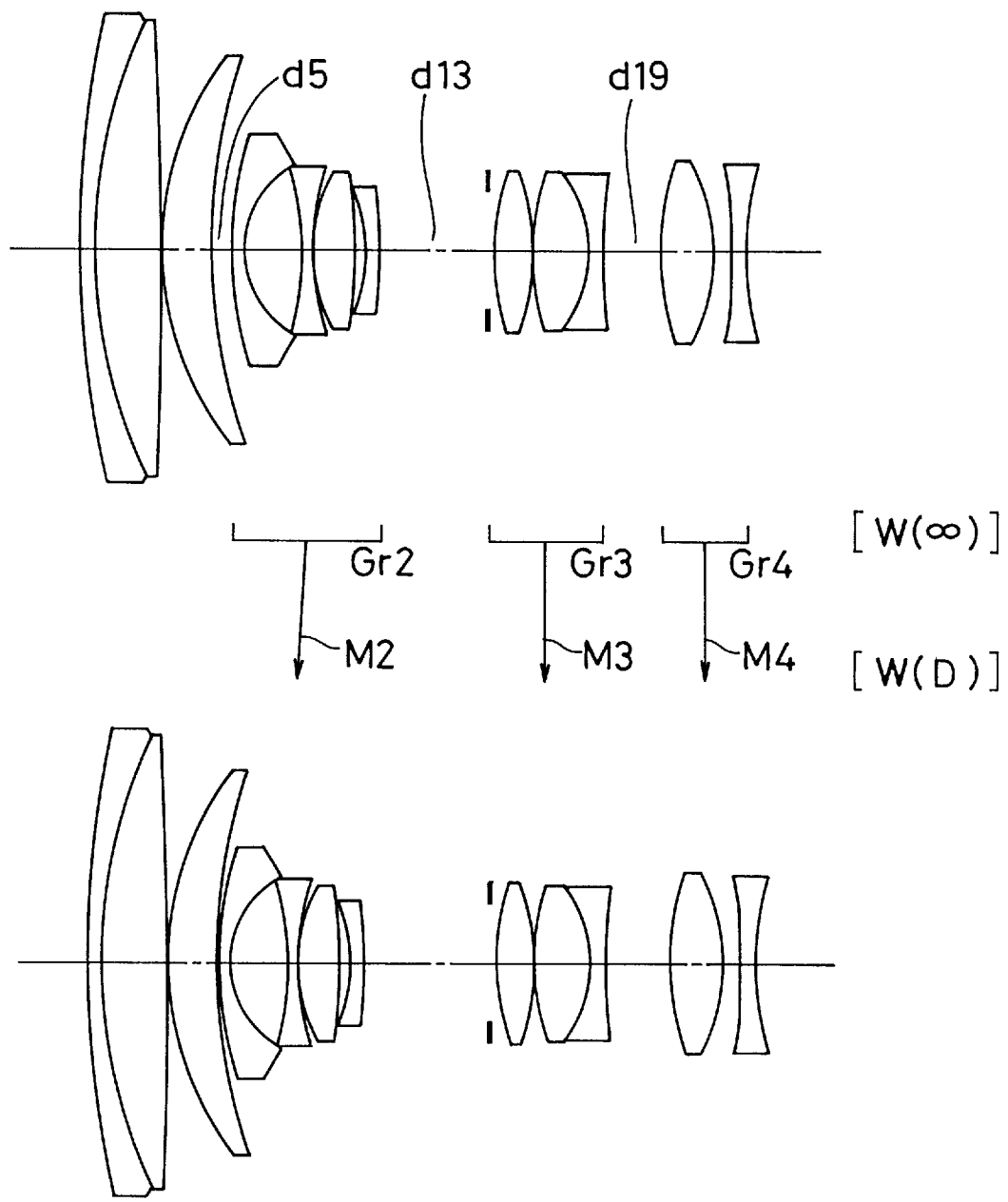
Figure 8A:
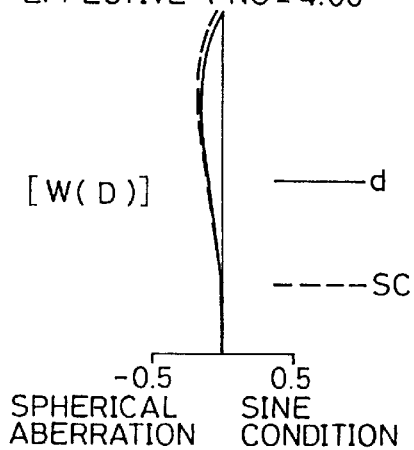
Figure 8B:
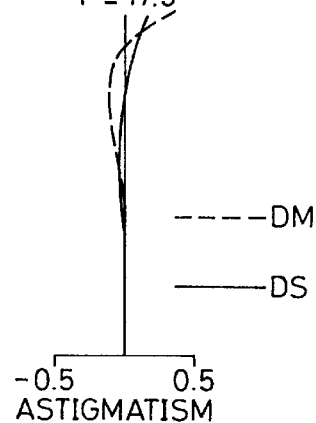
Figure 8C:
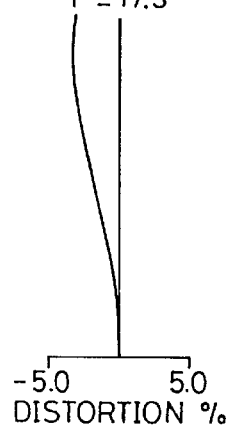
Figure 8D:
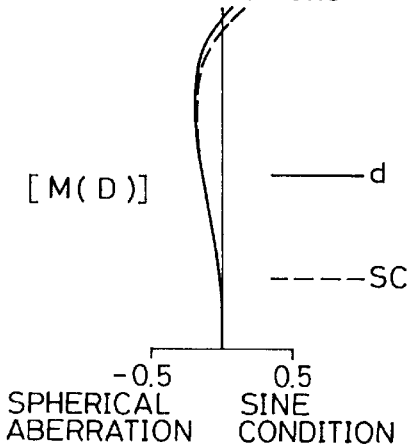
Figure 8E:
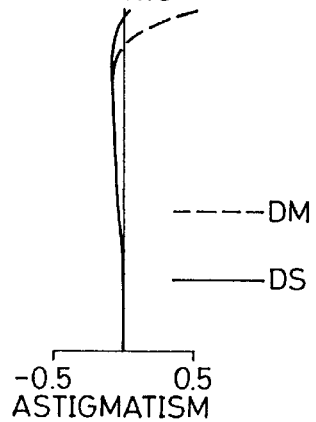
Figure 8F:
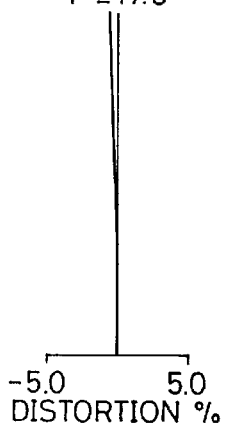
Figure 8G:
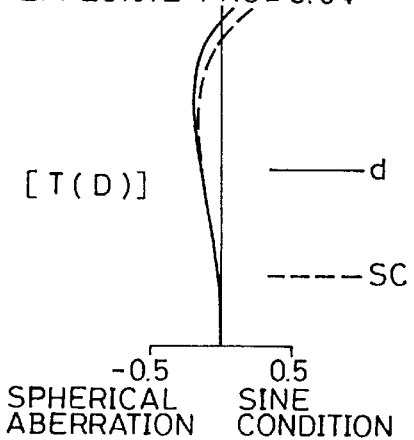
Figure 8H:
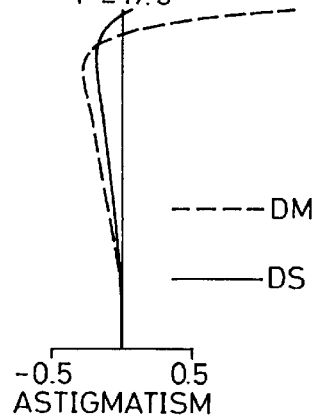
Figure 8I:
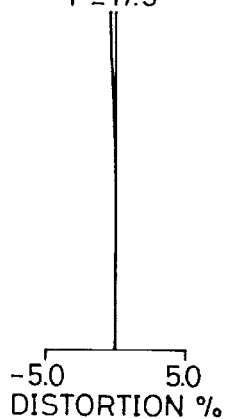
Figure 9:
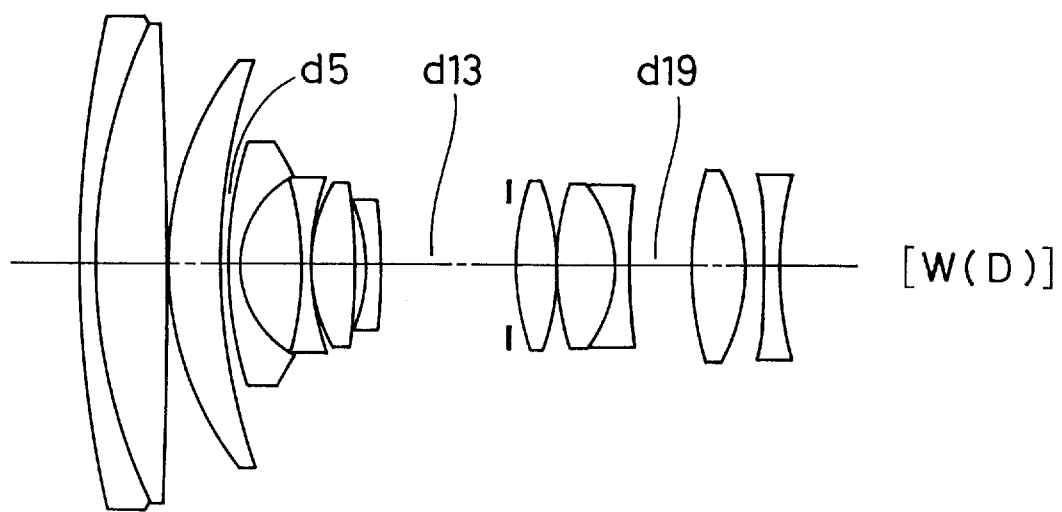
Figure 11:
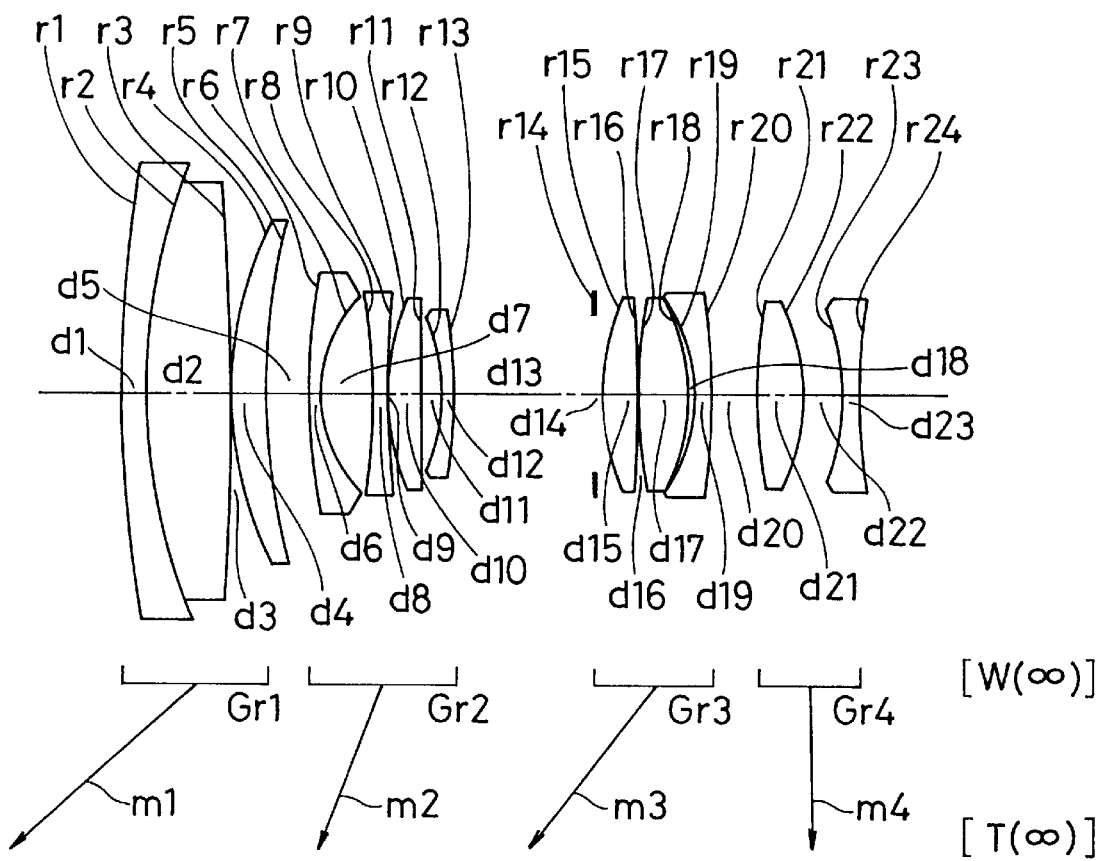
Figure 12A:
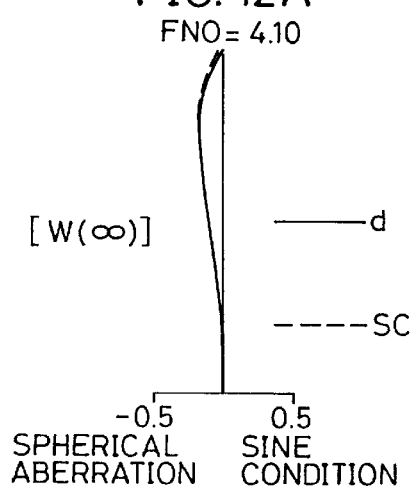
Figure 12B:
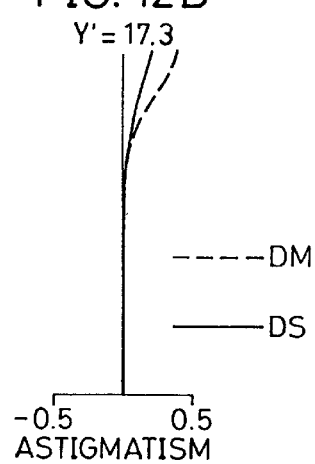
Figure 12C:
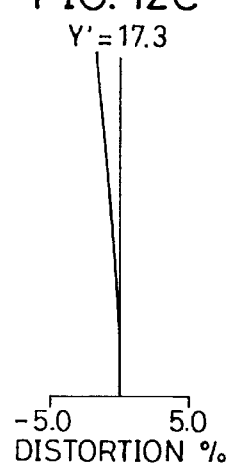
Figure 12D:
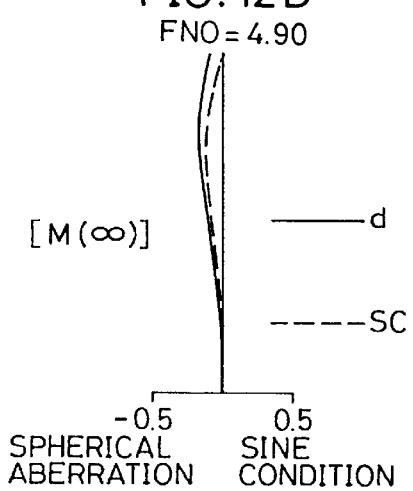
Figure 12E:
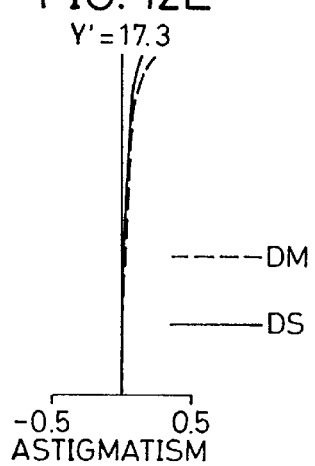
Figure 12F:
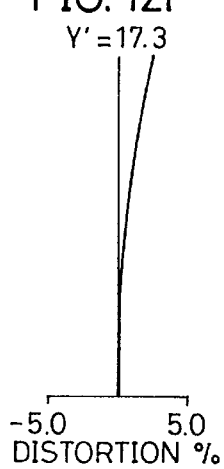
Figure 12G:
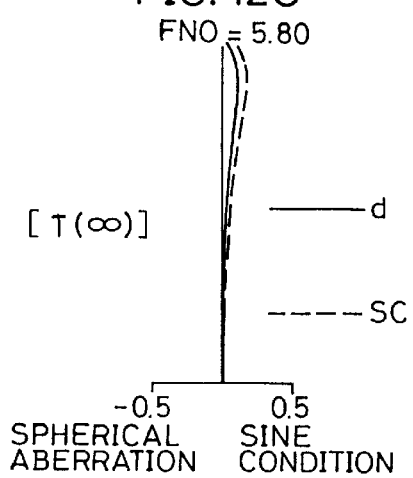
Figure 12H:
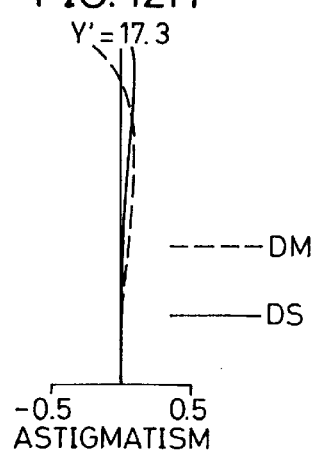
Figure 12I:
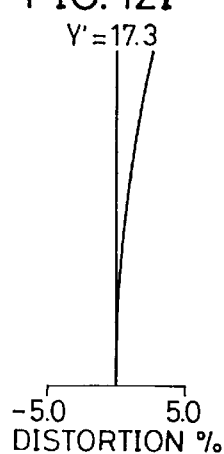
Figure 13:
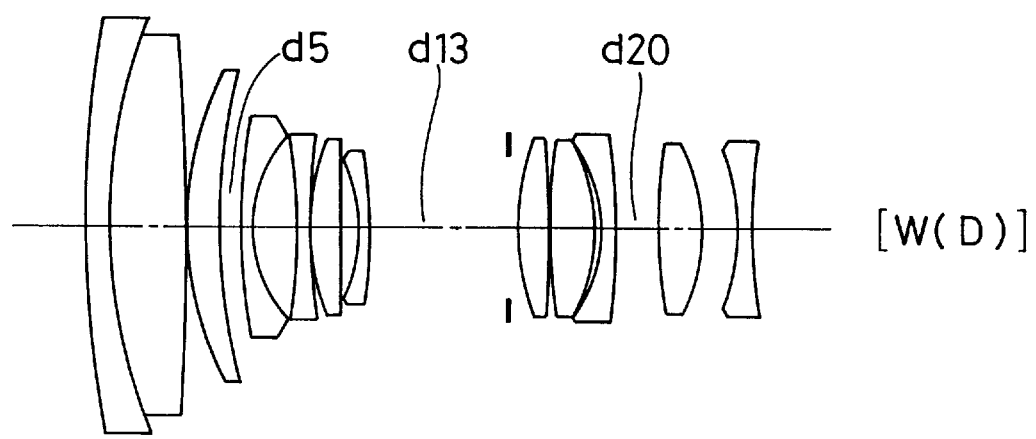
Figure 14A:
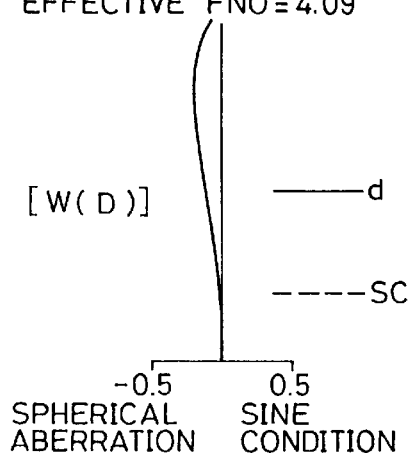
Figure 14B:
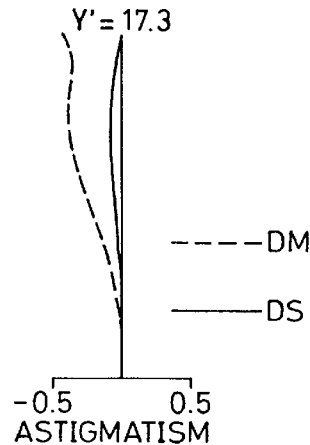
Figure 14C:
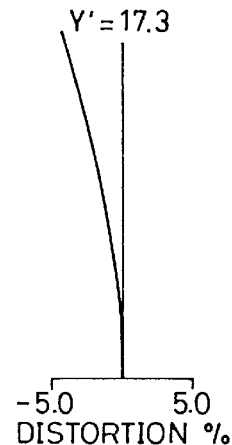
Figure 14D:
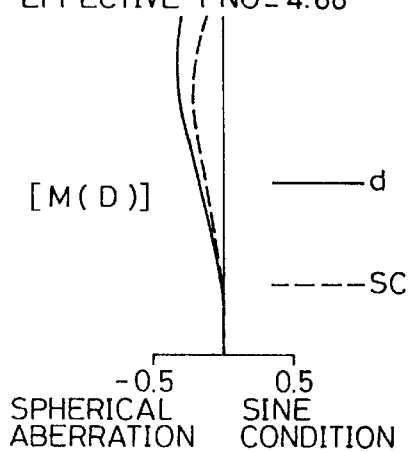
Figure 14E:
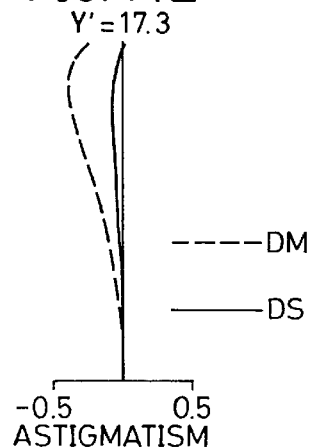
Figure 14F:
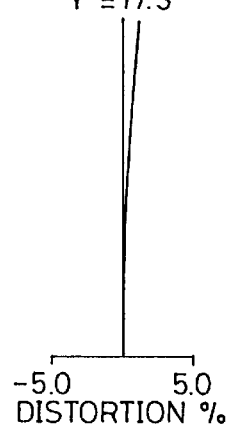
Figure 14G:
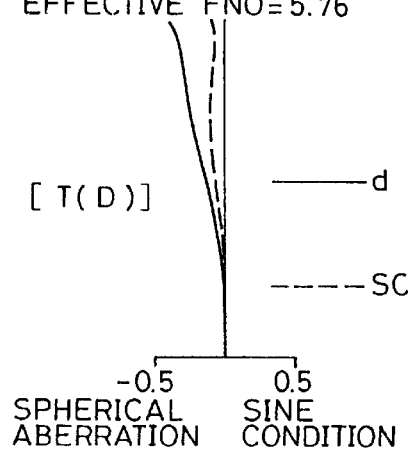
Figure 14H:
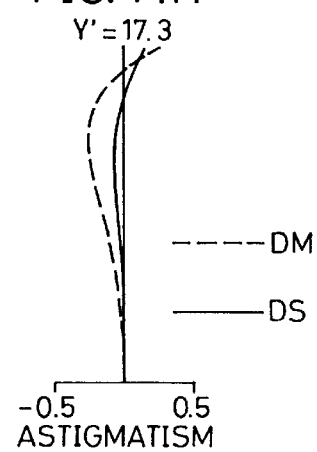
Figure 14I:
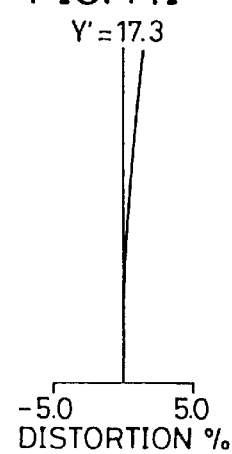
Figure 15:
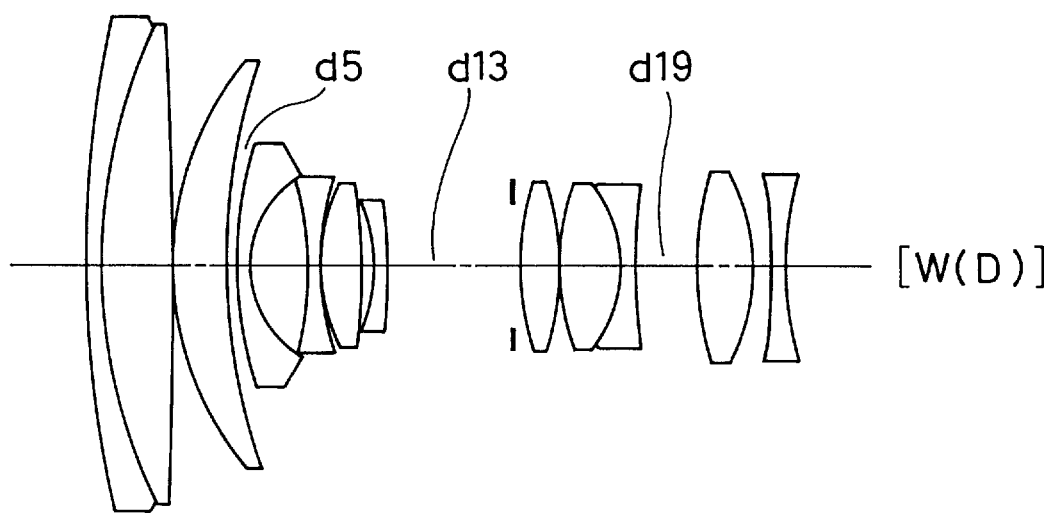
Figure 16A:
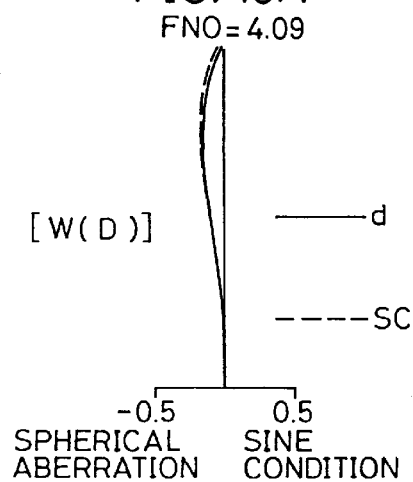
Figure 16B:
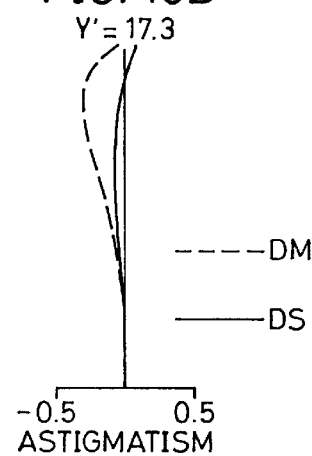
Figure 16C:
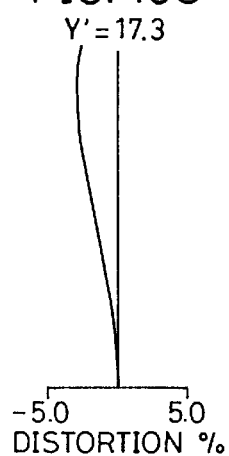
Figure 16D:
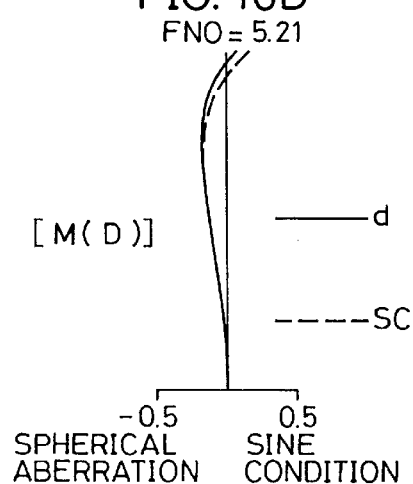
Figure 16E:
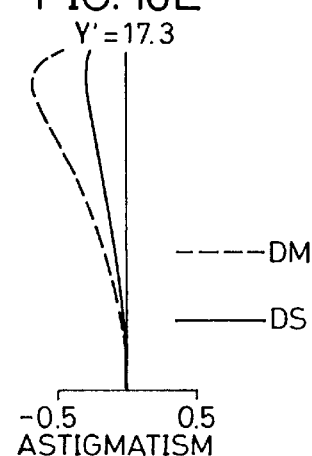
Figure 16F:
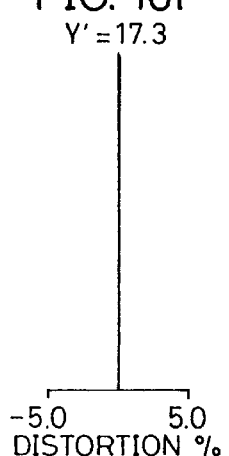
Figure 16G:
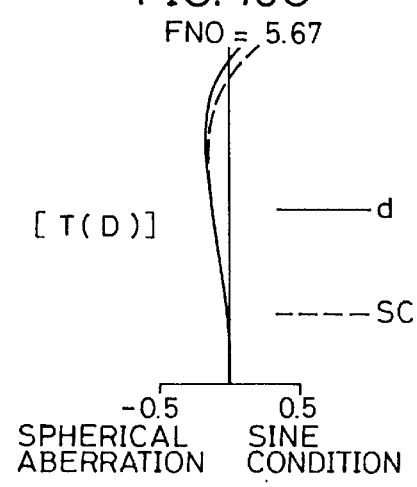
Figure 16H:
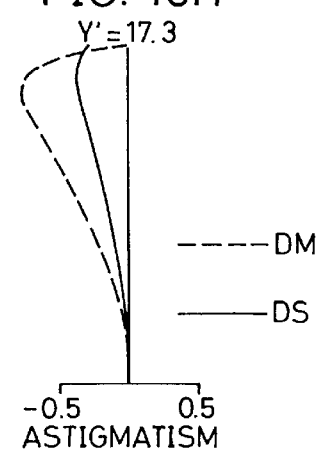
Figure 16I:
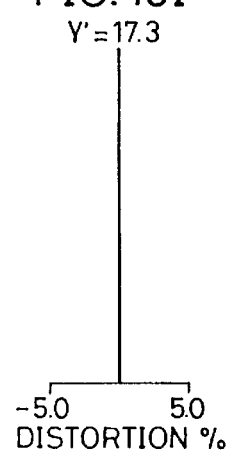
Figure 17:
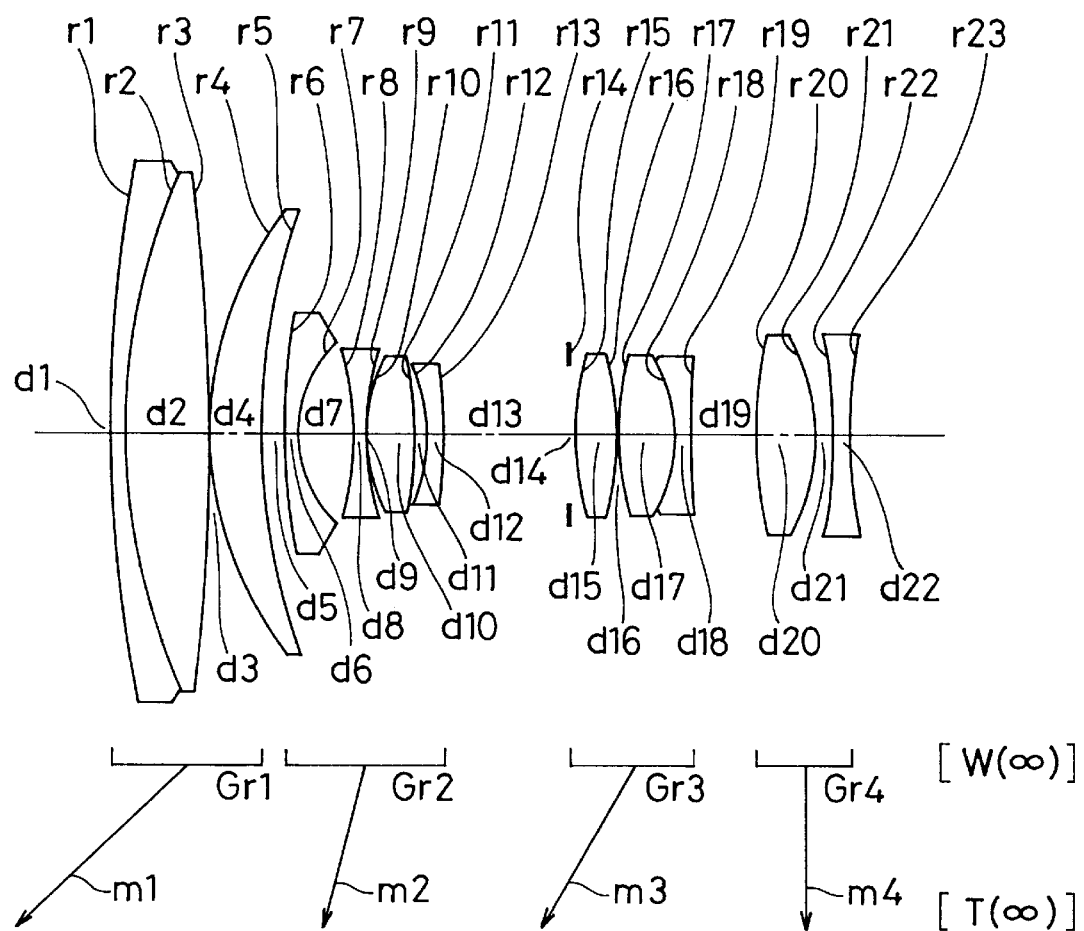
Figure 19:
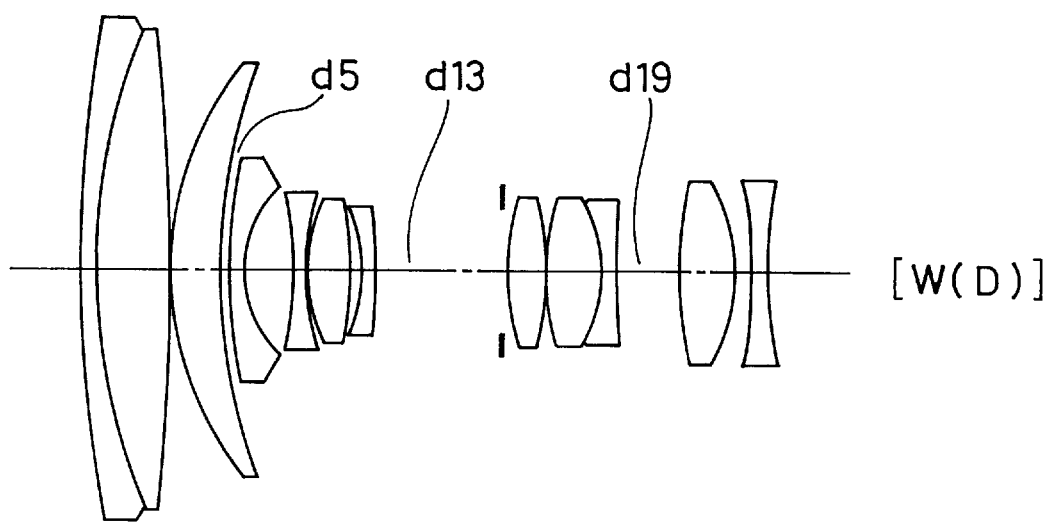
Figure 20A:
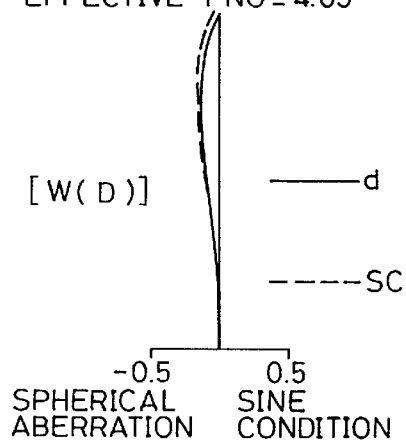
Figure 20B:
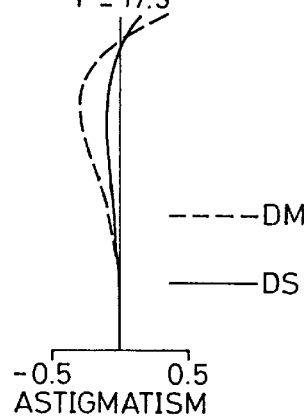
Figure 20C:
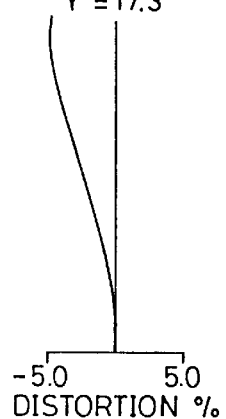
Figure 20D:
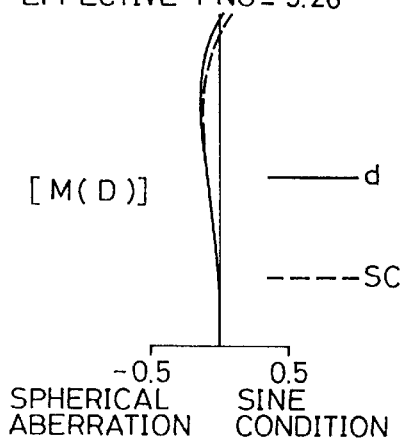
Figure 20E:
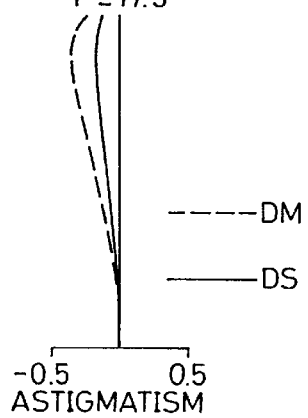
Figure 20F:
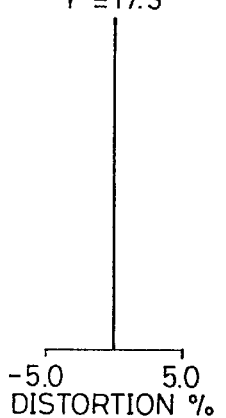
Figure 20G:
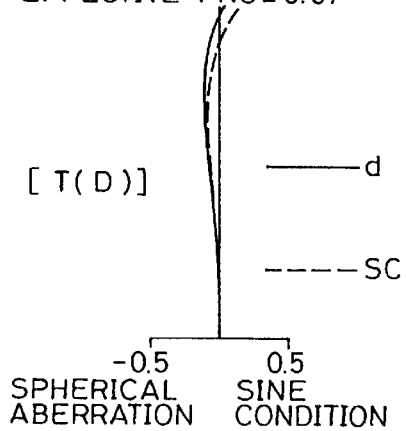
Figure 20H:
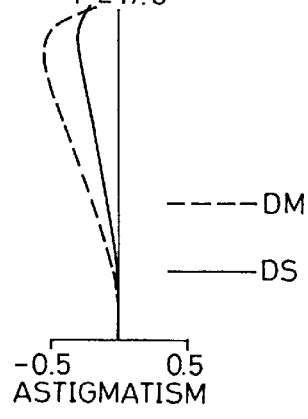
Figure 20I:
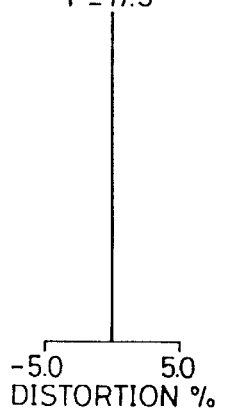
Figure 21:
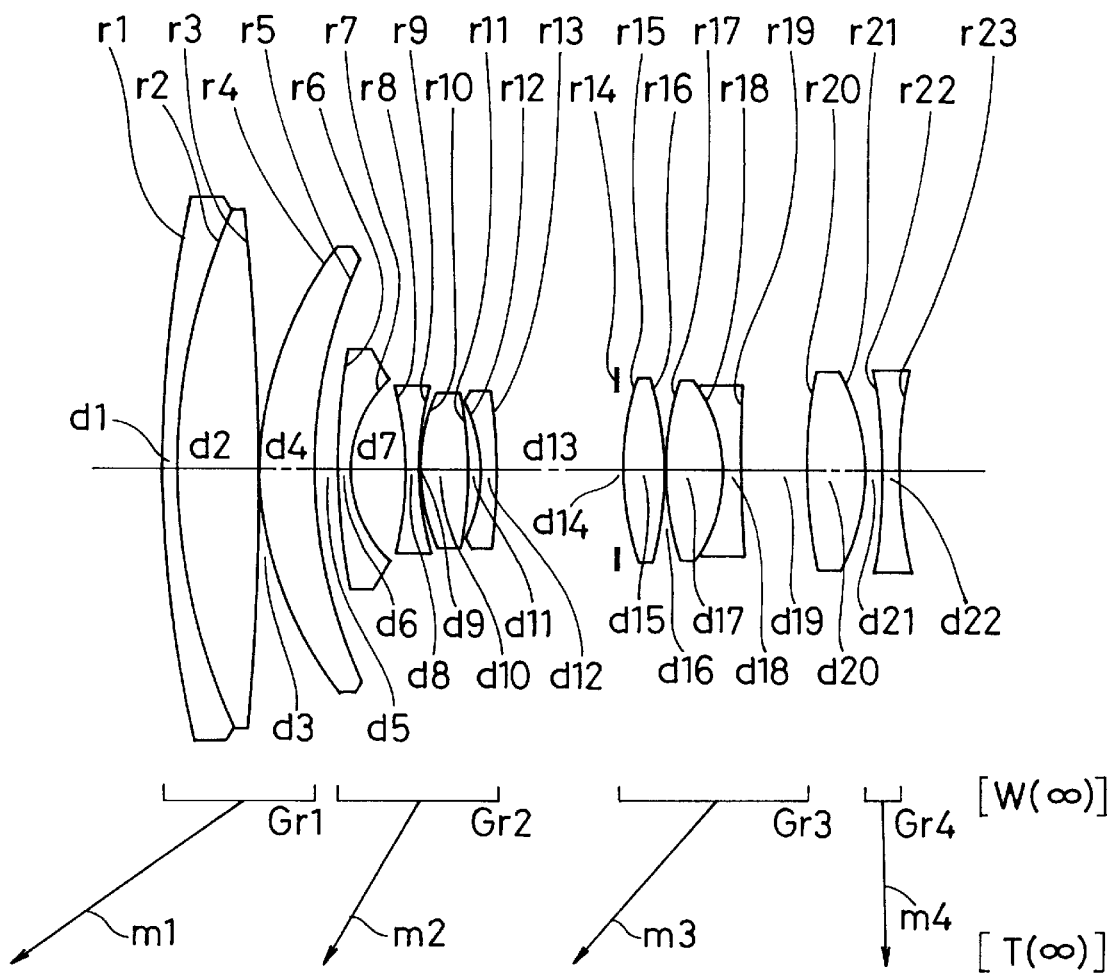
Figure 22A:
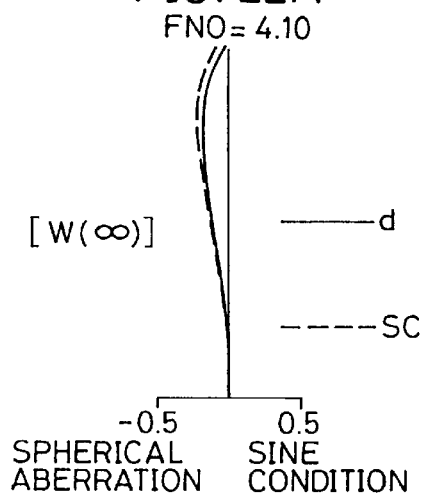
Figure 22B:
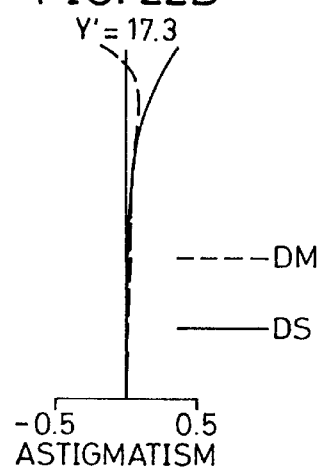
Figure 22C:
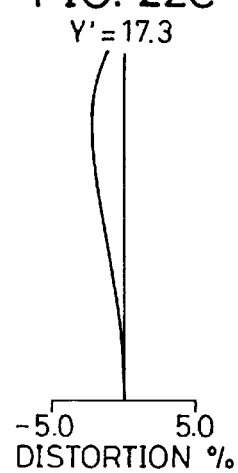
Figure 22D:
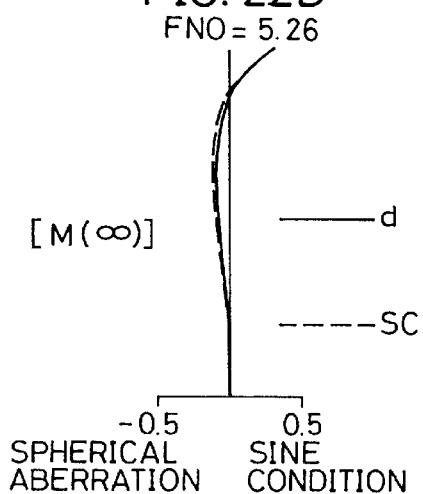
Figure 22E:
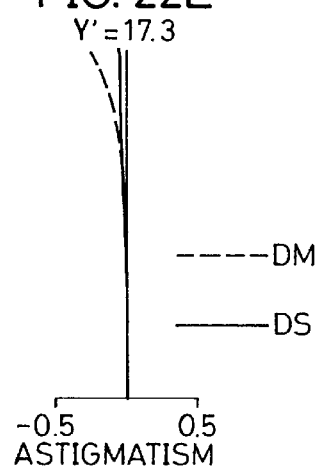
Figure 22F:
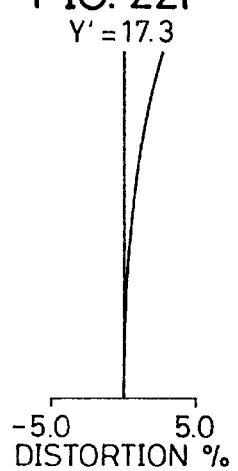
Figure 22G:
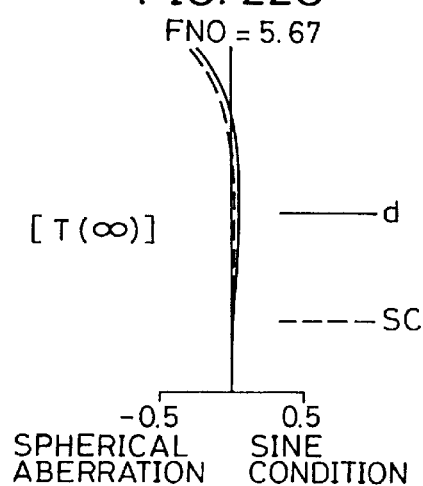
Figure 22H:
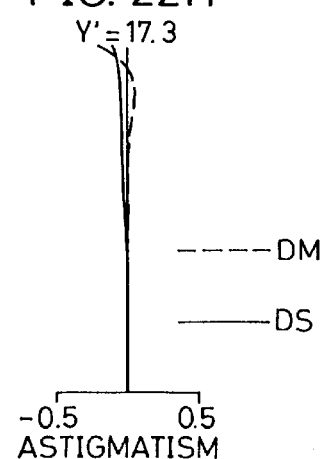
Figure 22I:
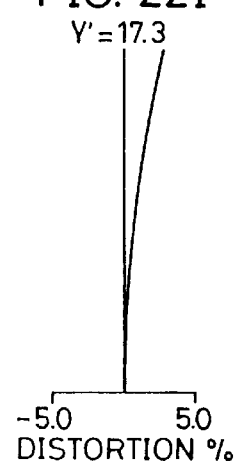
Figure 23:
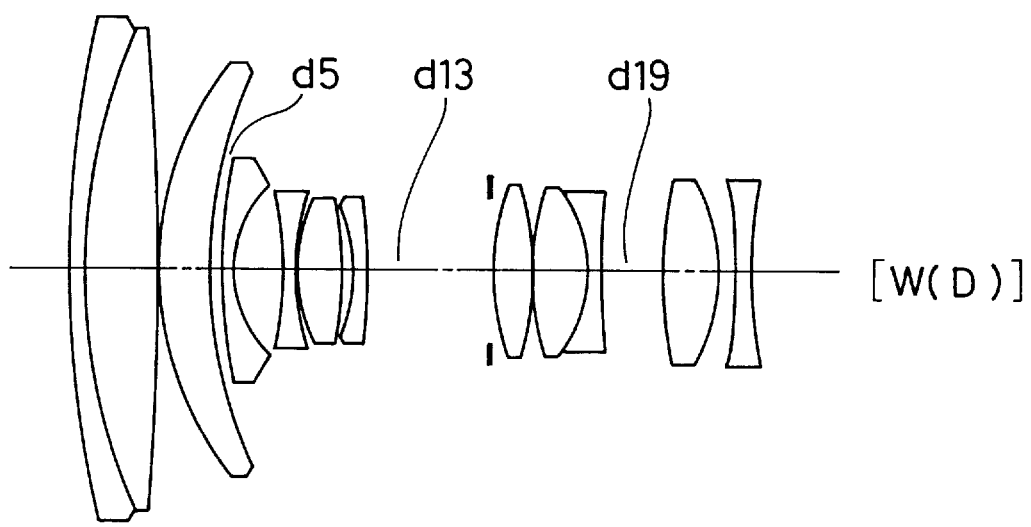
Figure 24A:
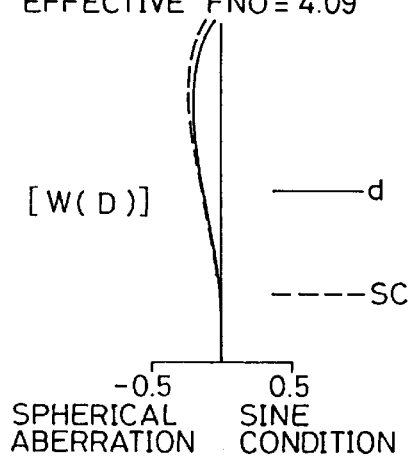
Figure 24B:
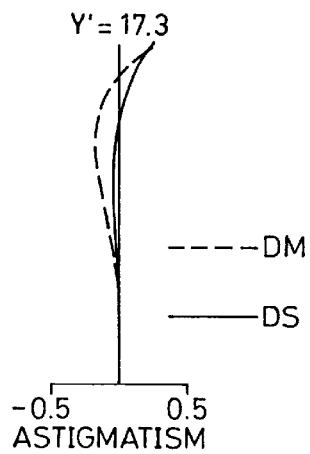
Figure 24C:
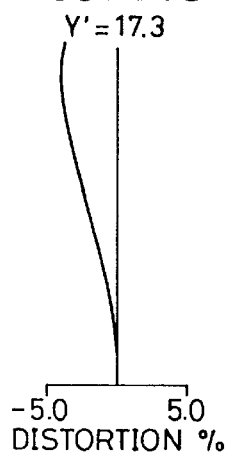
Figure 24D:
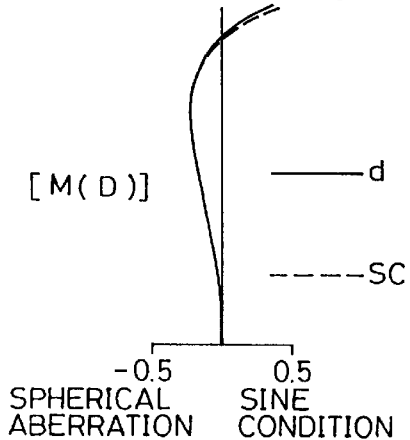
Figure 24E:
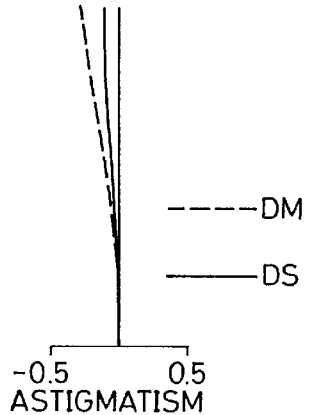
Figure 24F:
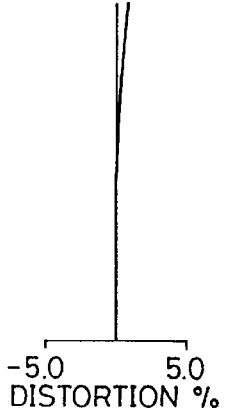
Figure 24G:
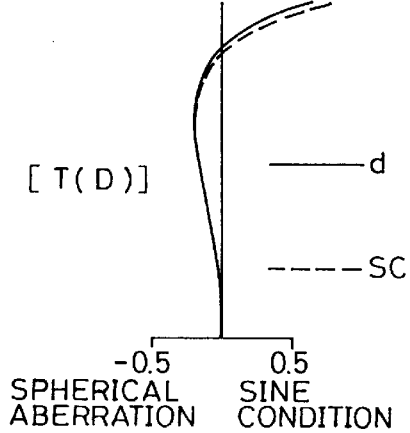
Figure 24H:
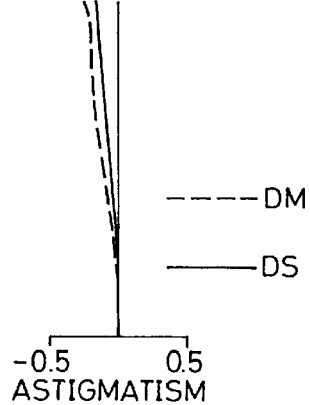
Figure 24I:
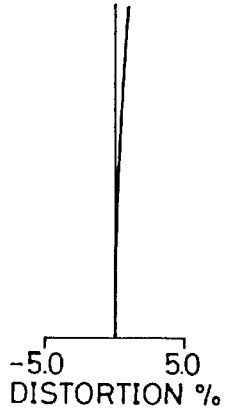
Figure 25:
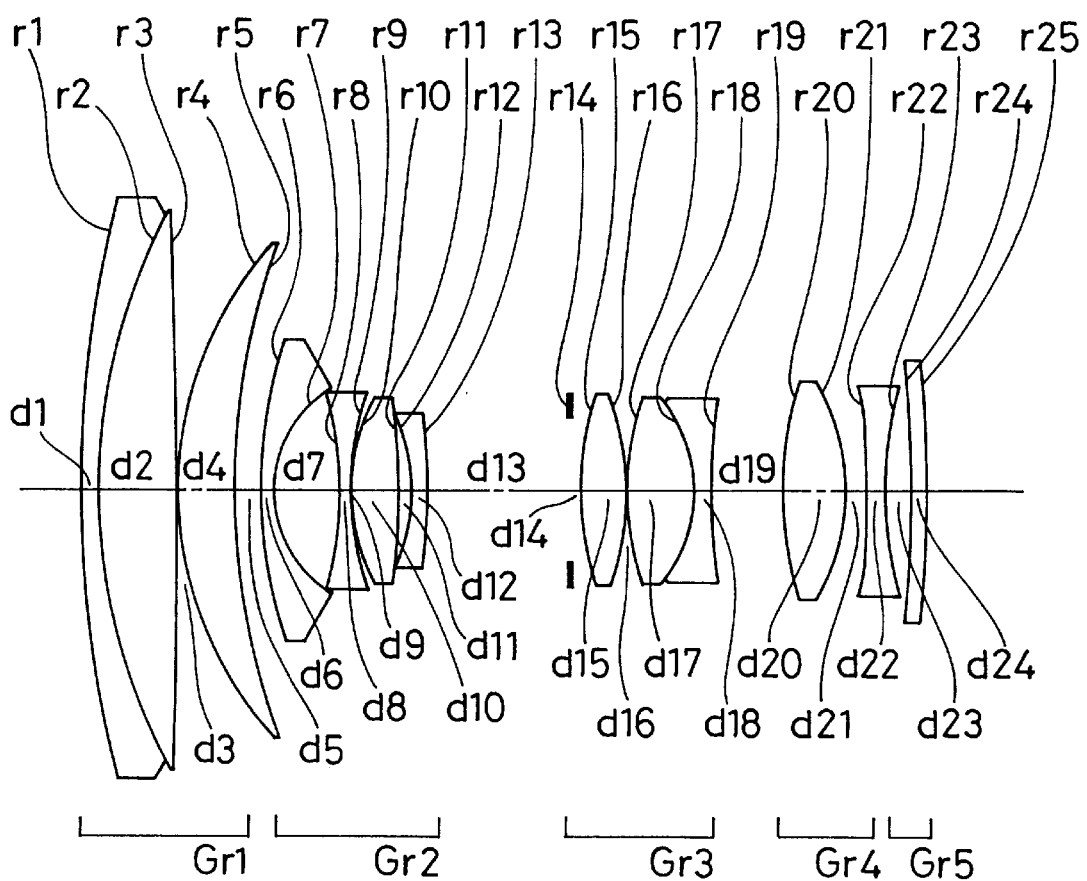
Figure 26A:
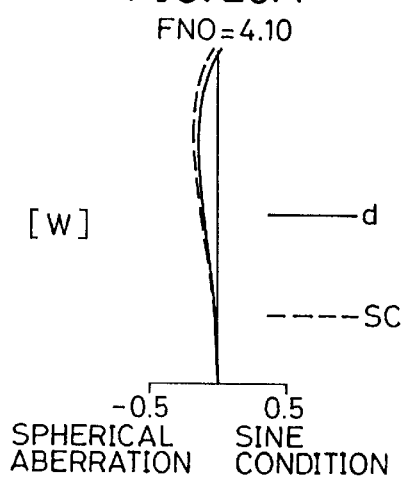
Figure 26B:
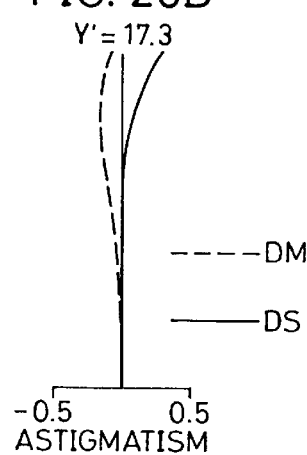
Figure 26C:
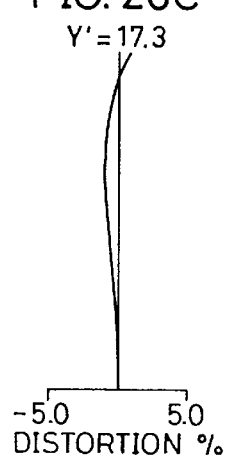
Figure 26D:
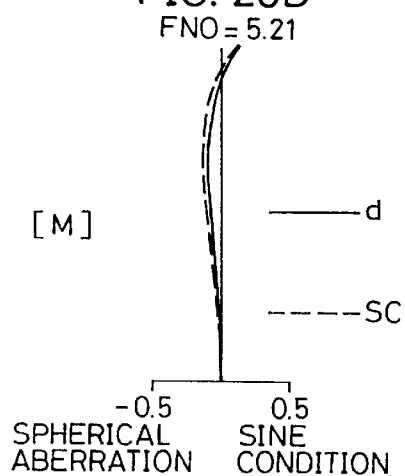
Figure 26E:
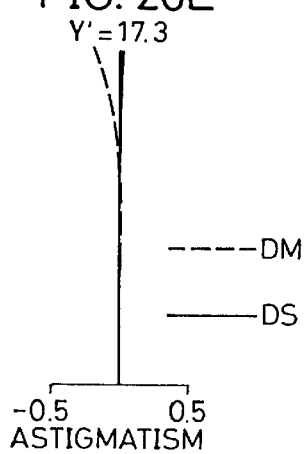
Figure 26F:
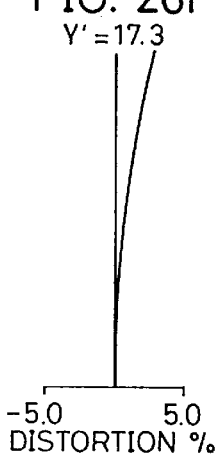
Figure 26G:
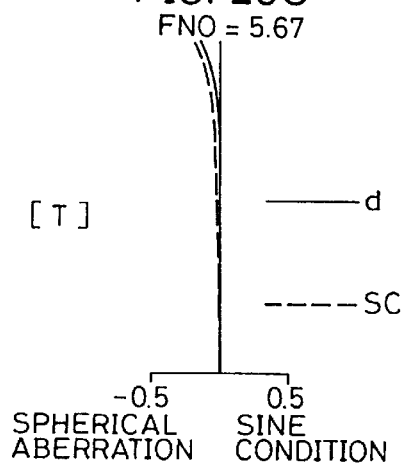
Figure 26H:
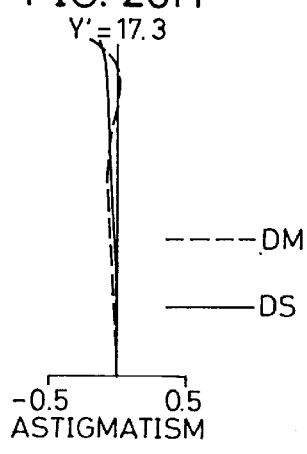
Figure 26I:
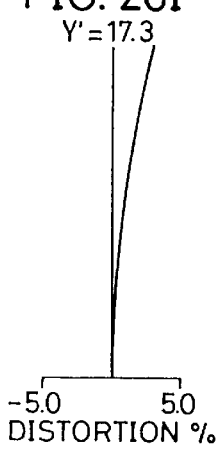
Figure 27:
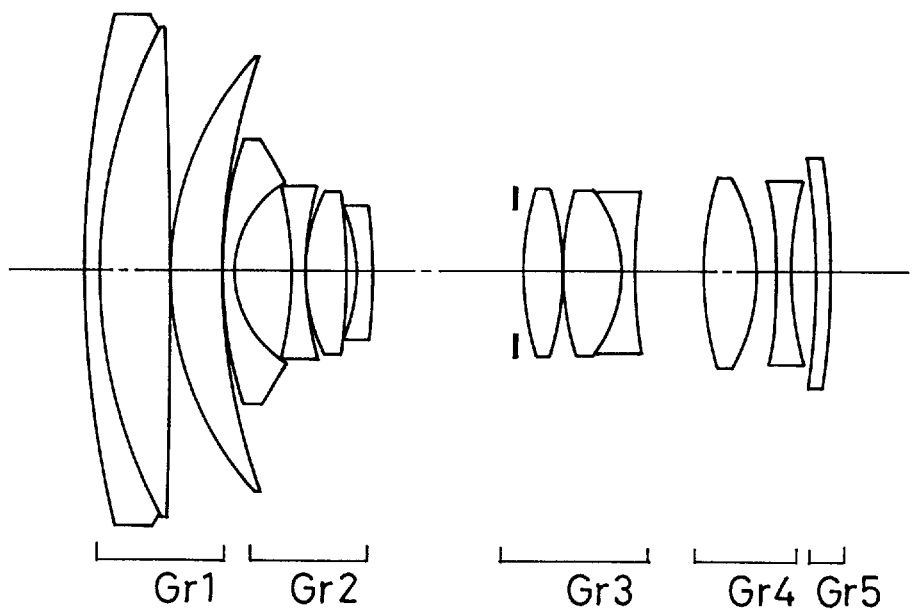
Figure 28A:
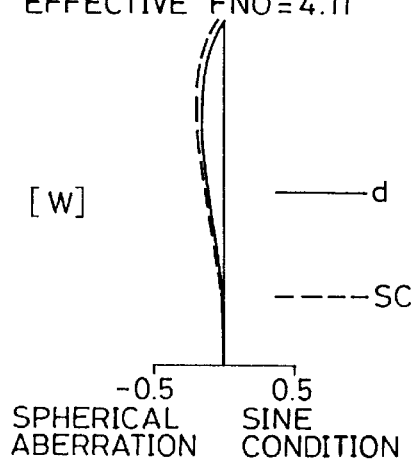
Figure 28B:
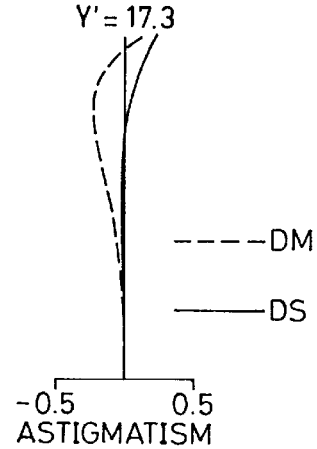
Figure 28C:
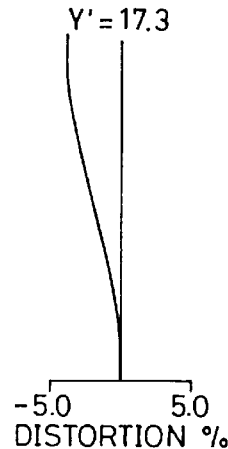
Figure 28D:
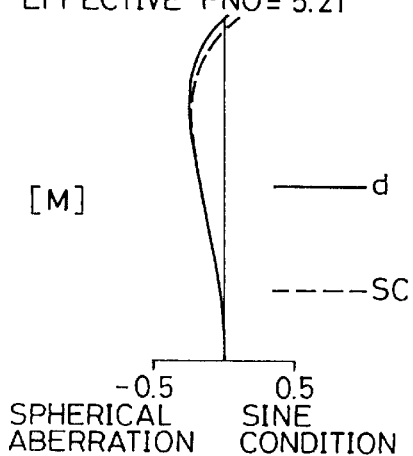
Figure 28E:
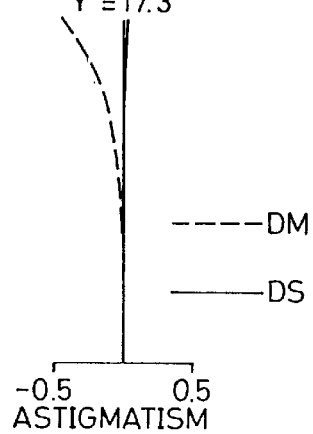
Figure 28F:
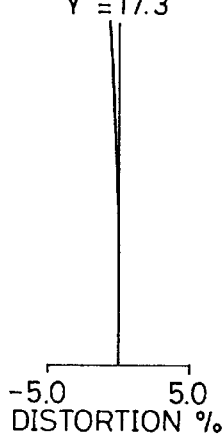
Figure 28G:
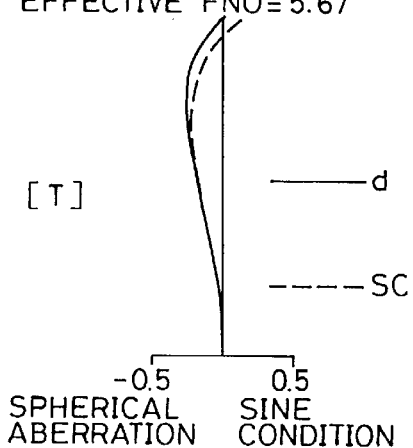
Figure 28H:
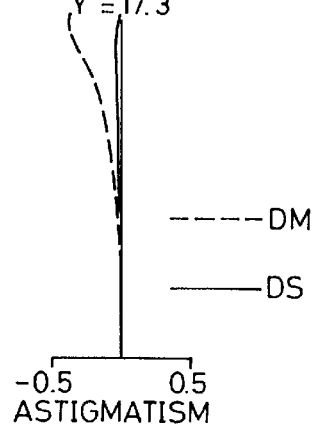
Figure 28I:
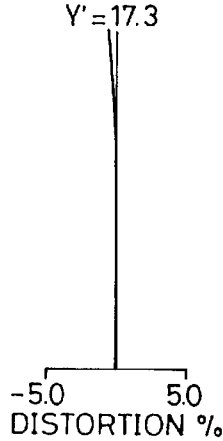
Figure 29:
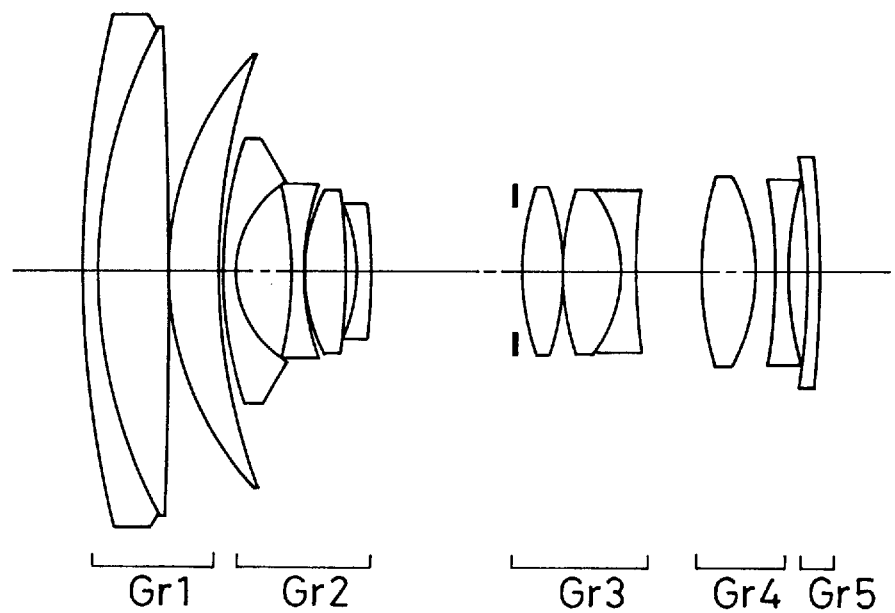
Figure 30A:
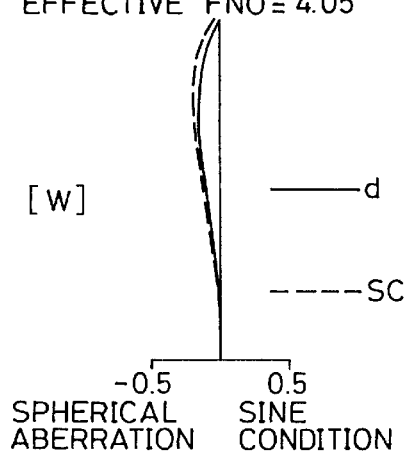
Figure 30B:
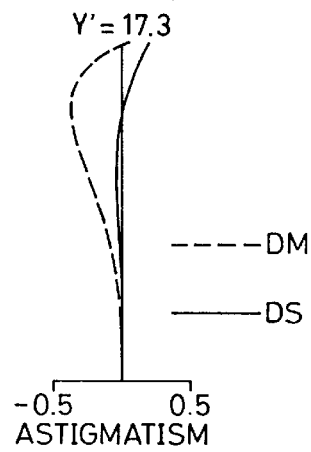
Figure 30C:
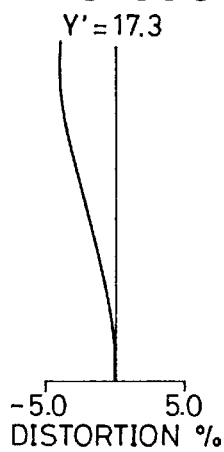
Figure 30D:
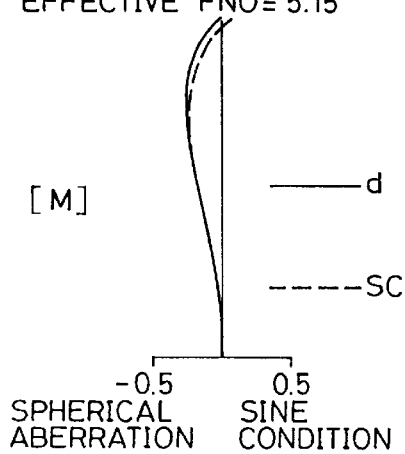
Figure 30E:
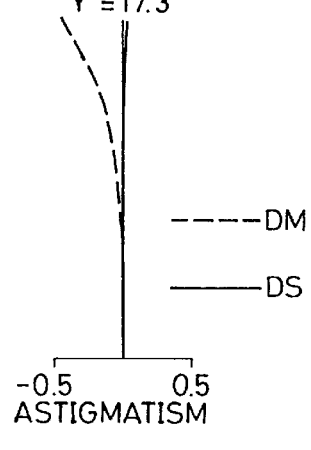
Figure 30F:
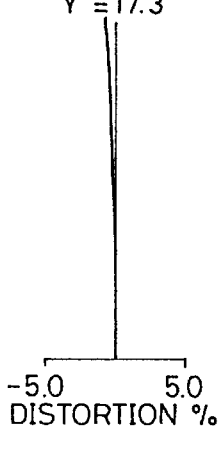
Figure 30G:
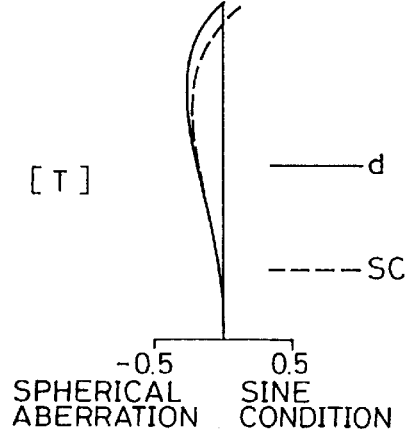
Figure 30H:
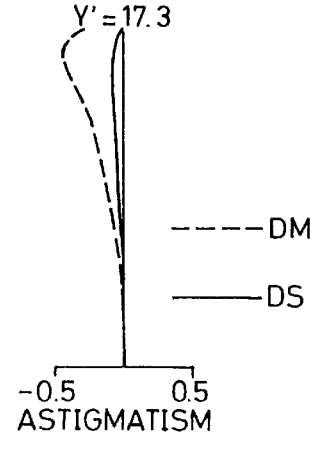
Figure 30I:
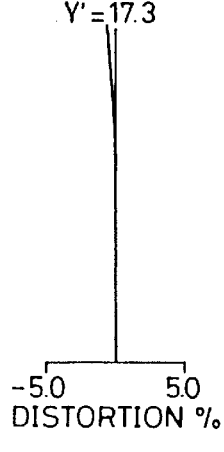
Figure 31:
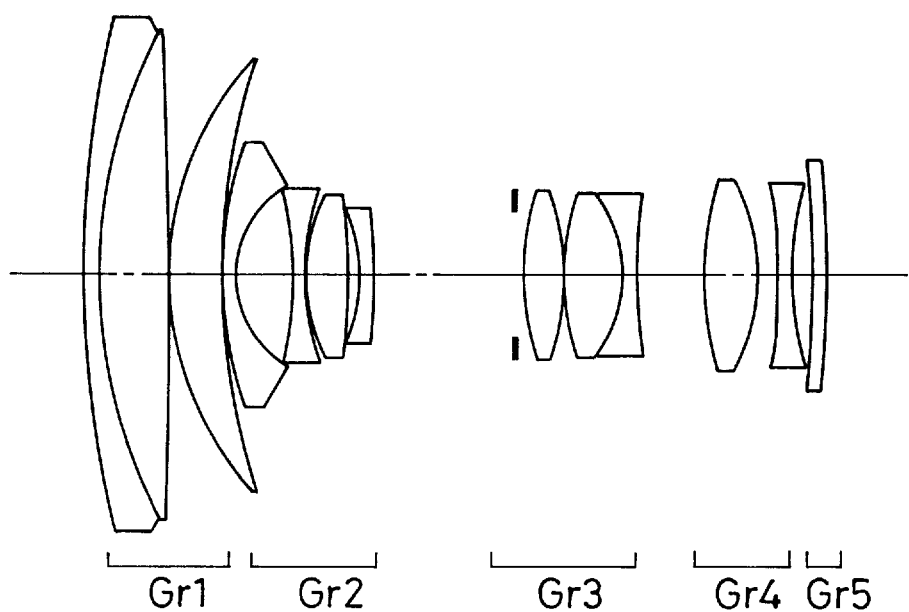
Figure 32A:
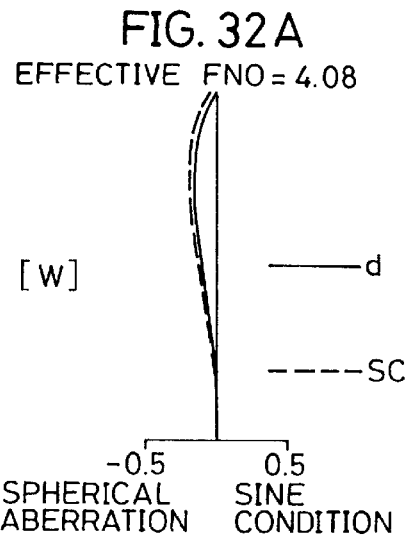
Figure 32B:
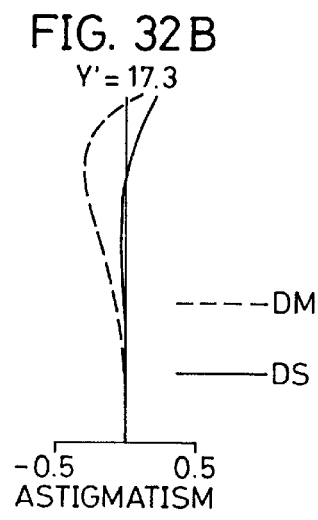
Figure 32C:
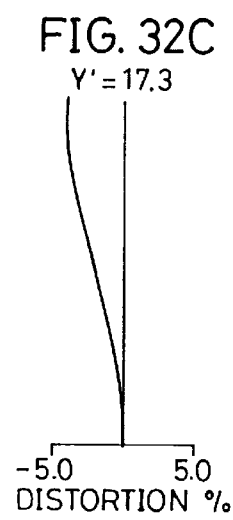
Figure 32D:
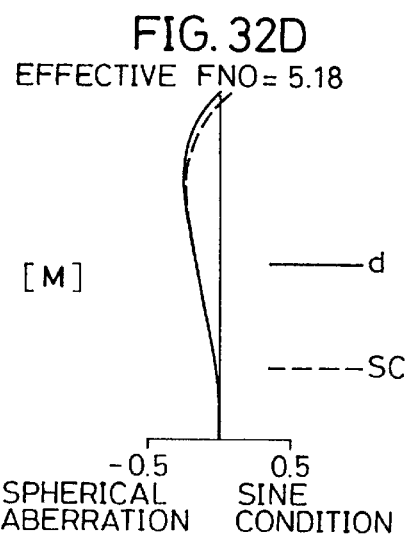
Figure 32E:
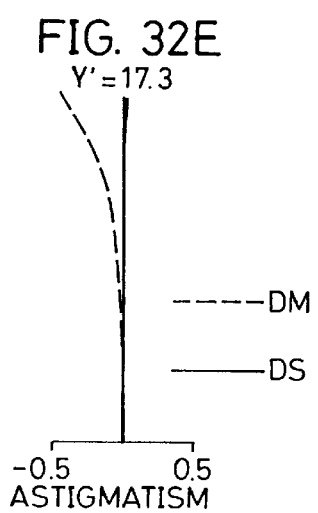
Figure 32F:
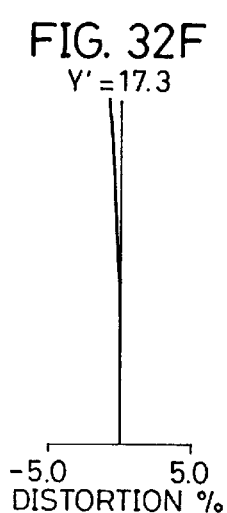
Figure 32G:
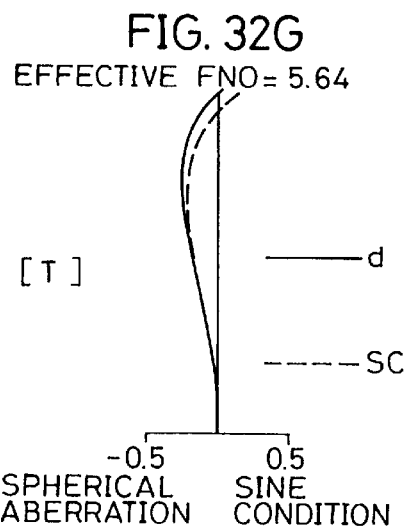
Figure 32H:
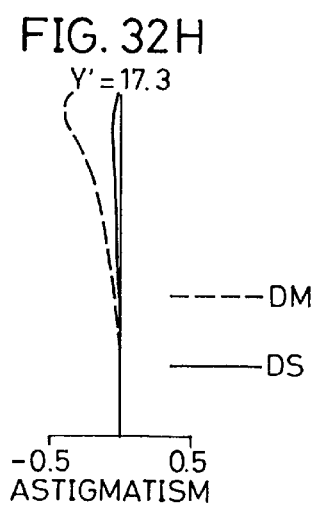
Figure 32I:
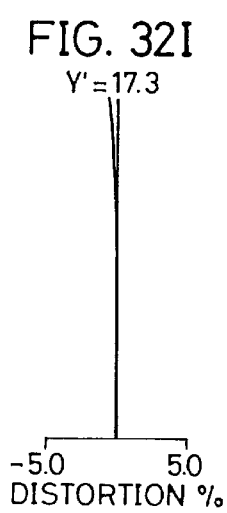
Figure 33:
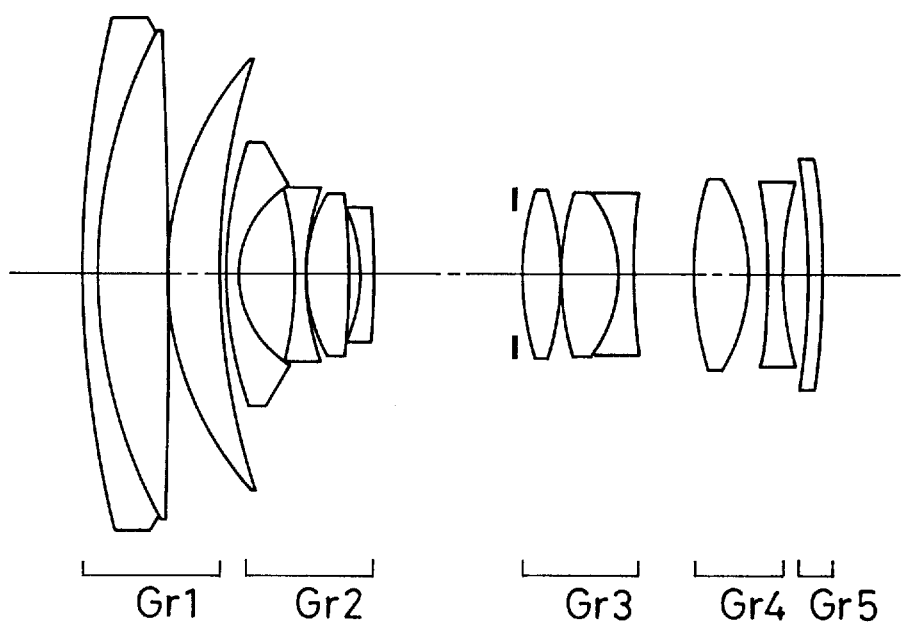
Figure 34A:
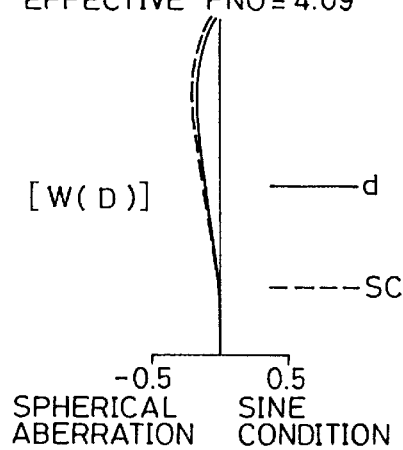
Figure 34B:
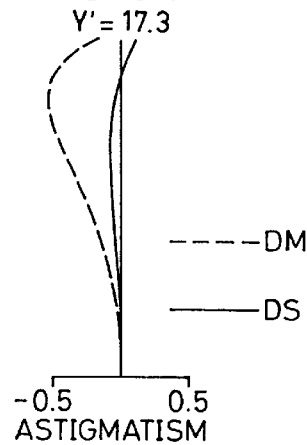
Figure 34C:
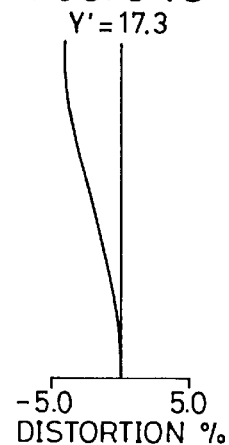
Figure 34D:
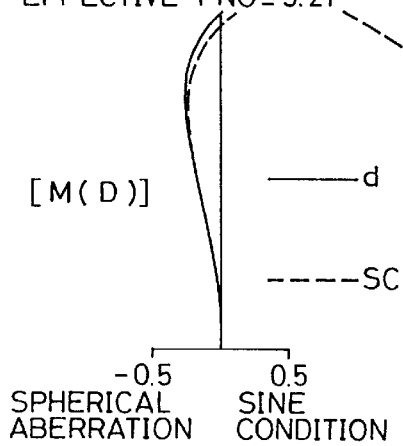
Figure 34E:
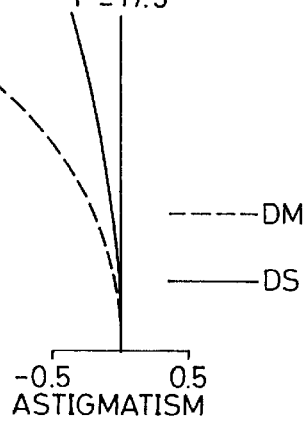
Figure 34F:
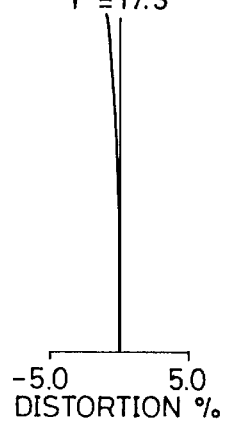
Figure 34G:
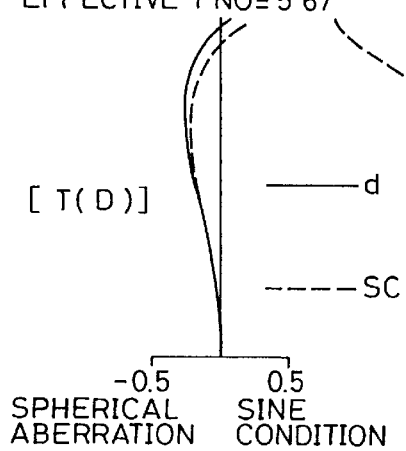
Figure 34H:
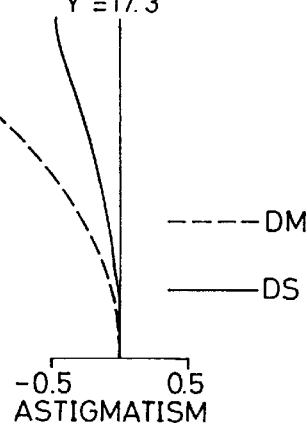
Figure 34I:
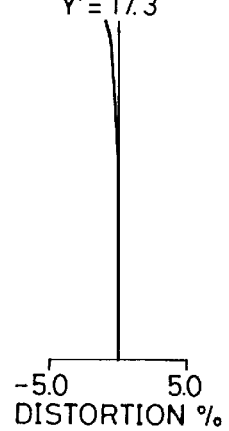

FIGS. to 2A to 2I are diagrams showing aberrations in the infinite-shooting-distance state of the first to third and fifth embodiments and the comparison example;

FIG. 3 is a lens construction diagram showing the focusing operation at the wide-angle end of the first embodiment;

FIGS. 4A to 4I are diagrams showing aberrations in the closest-shooting-distance state of the first embodiment;

FIG. 5 is a lens construction diagram showing the focusing operation at the wide-angle end of the second embodiment;

FIGS. 6A to 6I are diagrams showing aberrations in the closest-shooting-distance state of the second embodiment;

FIG. 7 is a lens construction diagram showing the focusing operation at the wide-angle end of the third embodiment;

FIGS. 8A to 8I are diagrams showing aberrations in the closest-shooting-distance state of the third embodiment;

FIG. 9 is a lens construction diagram showing the closest-shooting-distance shooting-distance state at the wide-angle end of the comparison example;

FIG. 10A to 10I are diagrams showing aberrations in the closest-shooting-distance state of the comparison example;

FIG. 11 is a lens construction diagram showing the zooming operation in the infinite-shooting-distance state of the fourth embodiment of the present invention;

FIGS. 12A to 12I ediagrams showing aberrations in the infinite-shooting-distance state of the fourth embodiment;

FIG. 13 is a lens construction diagram showing the closest-shooting-distance state a the wide-angle end of the fourth embodiment;

FIGS. 14A to 14I are diagrams showing aberrations in the closest-shooting-distance state of the fourth embodiment;

FIG. 15 is a lens construction diagram showing the closest-shooting-distance state at the wide-angle end of the fifth embodiment;

FIGS. 16A to 16I diagrams showing aberrations in the closest-shooting-distance state of the fifth embodiment;

FIG. 17 is a lens construction diagram showing the zooming operation in the infinite-shooting-distance state of the sixth embodiment of the present invention;

FIGS. 18A to 18I are diagrams showing aberrations in the infinite-shooting distance state of the sixth embodiment;

FIG. 19 is a lens construction diagram showing the closest-shooting-distance state at the wide-angle end of the sixth embodiment;

FIGS. to 20A to 20I are diagrams showing aberrations in the closest-shooting-distance state of the sixth embodiment;

FIG. 21 is a lens construction diagram showing the zooming operation in the infinite-shooting-distance state of the seventh embodiment of the present invention;

FIGS. 22A to 22I are diagrams showing aberrations in the infinite-shooting-distance state of the seventh embodiment;

FIG. 23 is a lens instruction diagram showing the closest-shooting-distance state at the wide-angle end of the seventh embodiment;

FIGS. 24A to 24I are diagrams showing aberrations in the closest-shooting-distance of the seventh embodiment;

FIG. 25 is a lens instruction diagram showing the infinite-shooting-distance state at the wide-angle end of the eighth to eleventh embodiments of the present invention;

FIGS. 26A to 26I are diagrams showing aberrations in the infinite-shooting-distance state of the eighth to eleventh embodiments;

FIG. 27 is a lens construction diagram showing the closest-shooting-distant state at the wide-angle end of the eighth embodiment;

FIGS. 28A to 28I are diagrams showing aberrations in the closest-shooting state of the eighth embodiment;

FIG. 29 is a lens construction diagram showing the closest-shooting-distance state at the wide-angle end of the ninth embodiment;

FIGS. 30A to 30I are diagrams showing aberrations in the closest-shooting-distance state of the ninth embodiment;

FIG. 31 is a lens construction diagram showing the closest-shooting-distance state at the wide-angle end of the tenth embodiment;

FIGS. 32A to 32I are diagrams showing aberrations in the closest-shooting-distance state of the tenth embodiment;

FIG. 33 is a lens construction diagram showing the closest-shooting-distance state at the wide-angle end of the eleventh embodiment;

FIGS. 34A to 34I are diagrams showing aberrations in the closest-shooting-distance state of the eleventh embodiment.

Figure 35A:
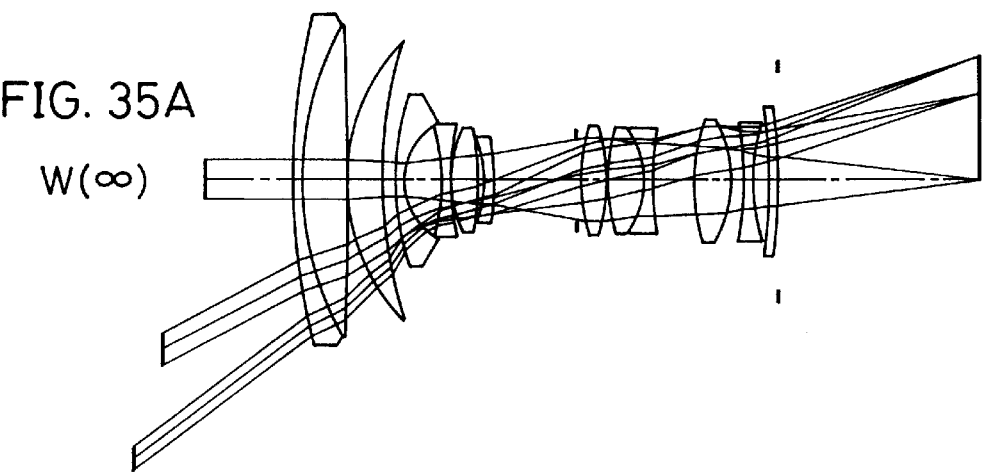
Figure 35B:
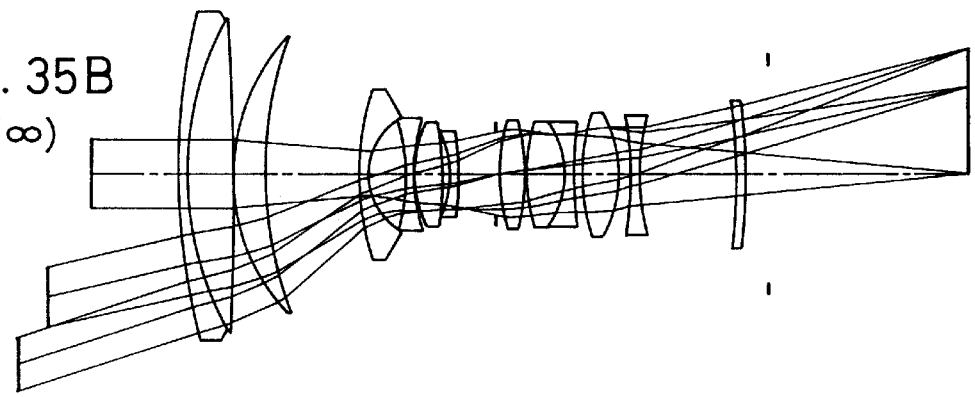
Figure 35C:
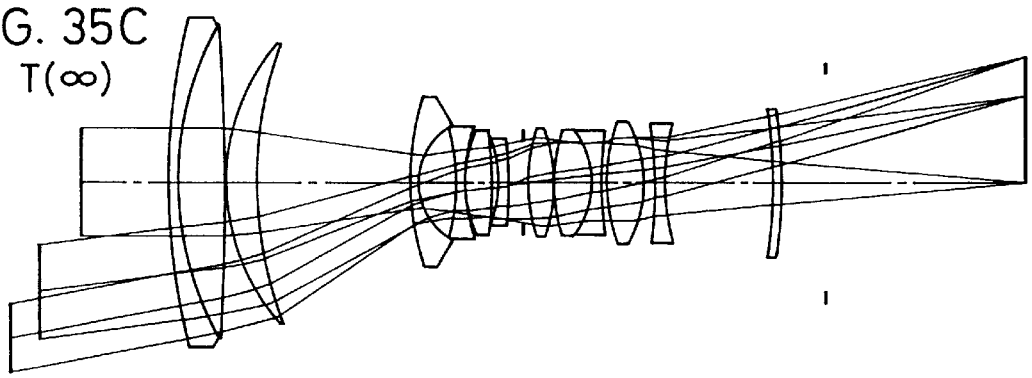
Figure 36A:
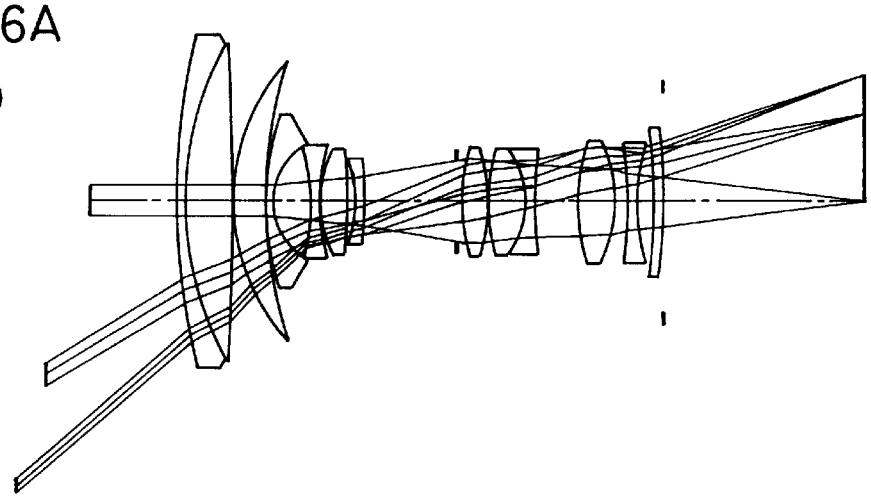
Figure 36B:
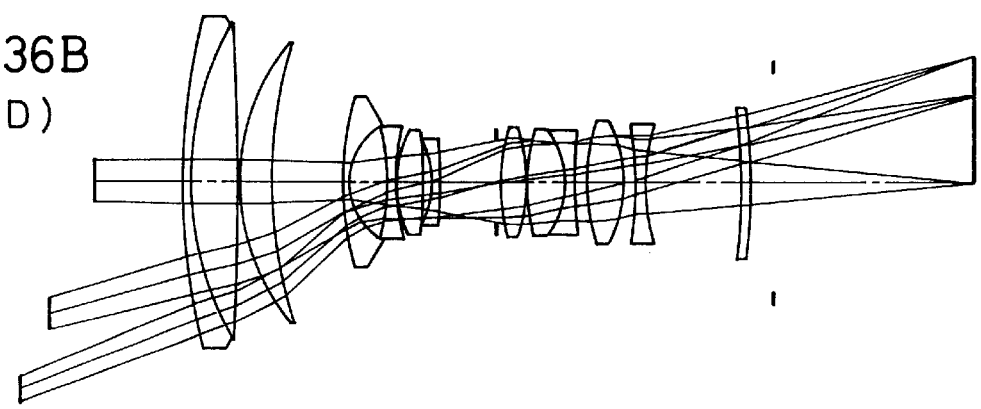
Figure 36C:
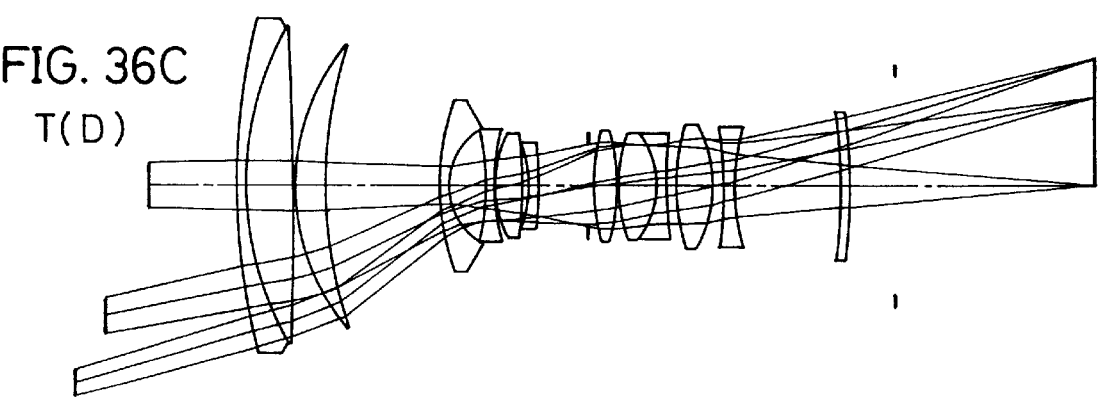
Figure 37A:
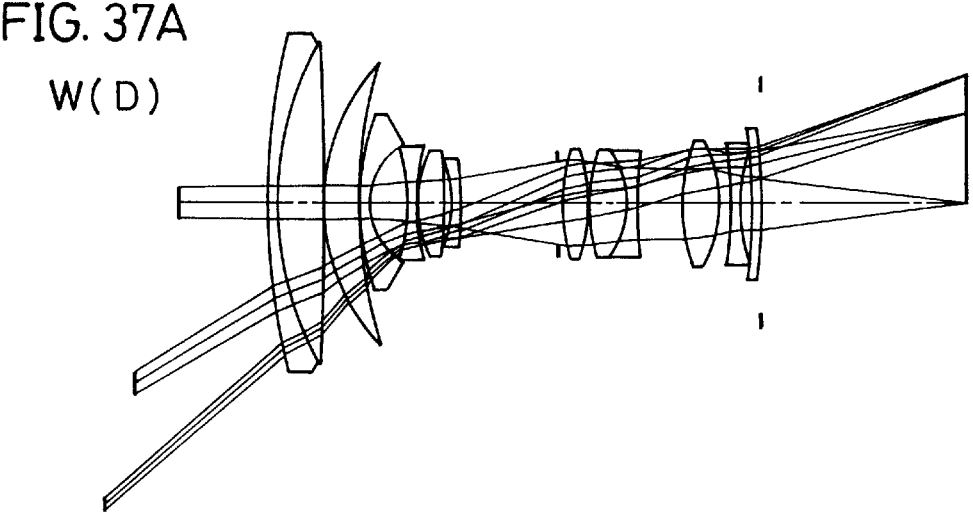
Figure 37B:
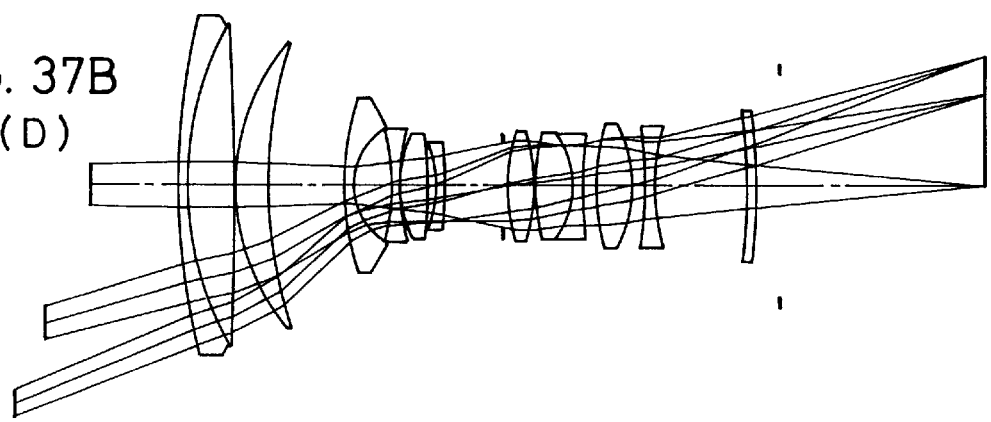
Figure 37C:
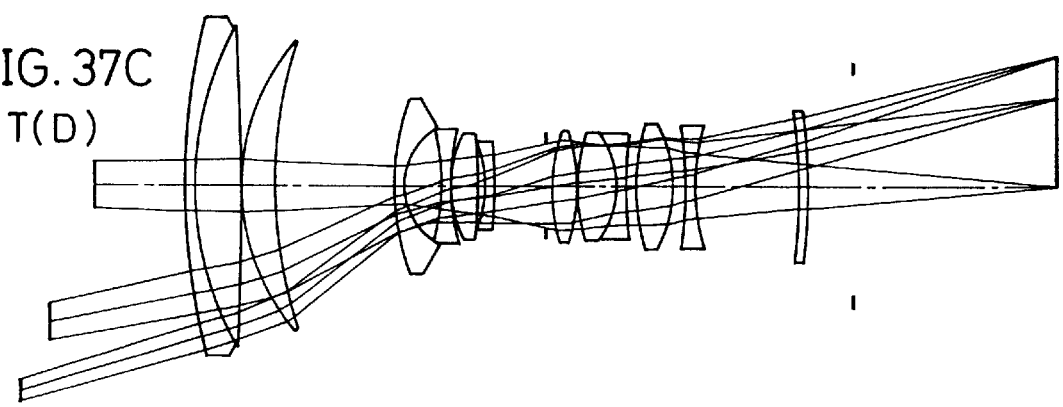
Figure 38A:
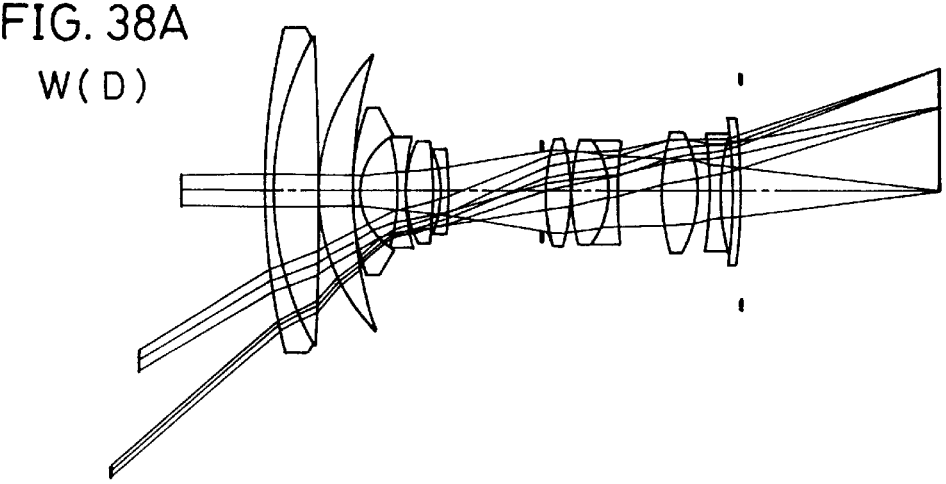
Figure 38B:
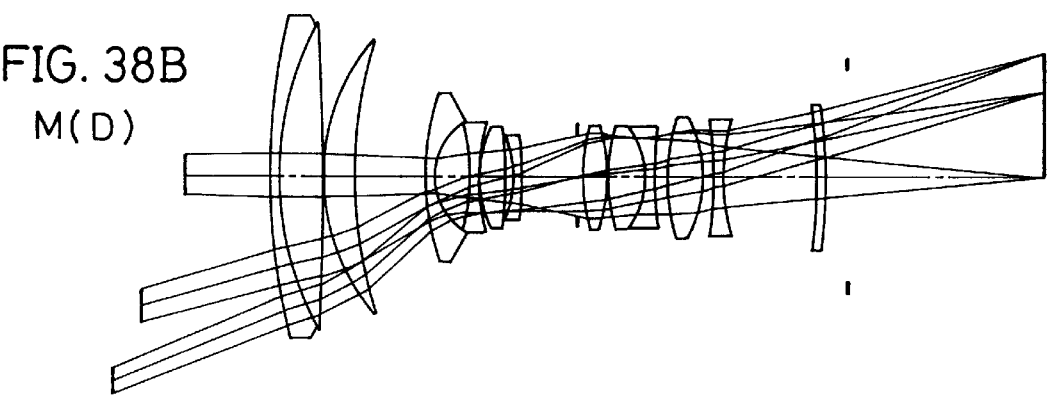
Figure 38C:
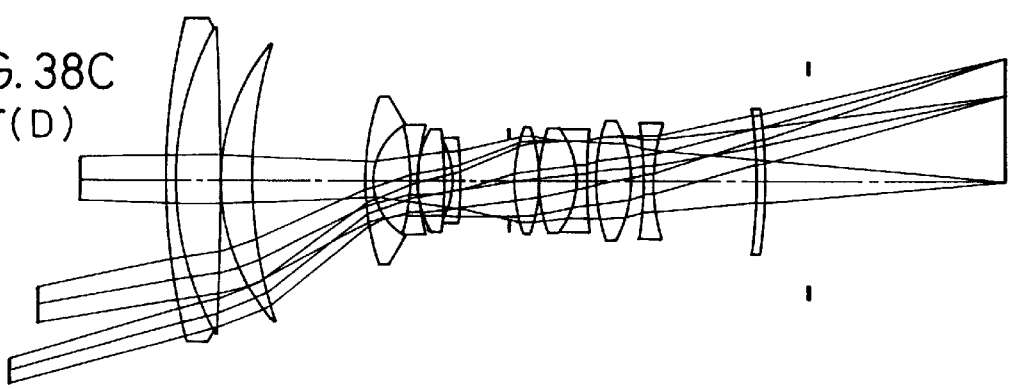
Figure 39A:
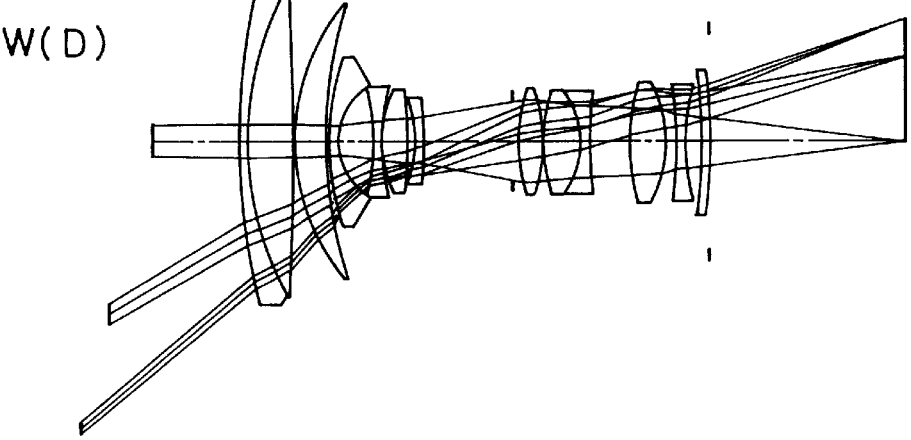
Figure 39B:
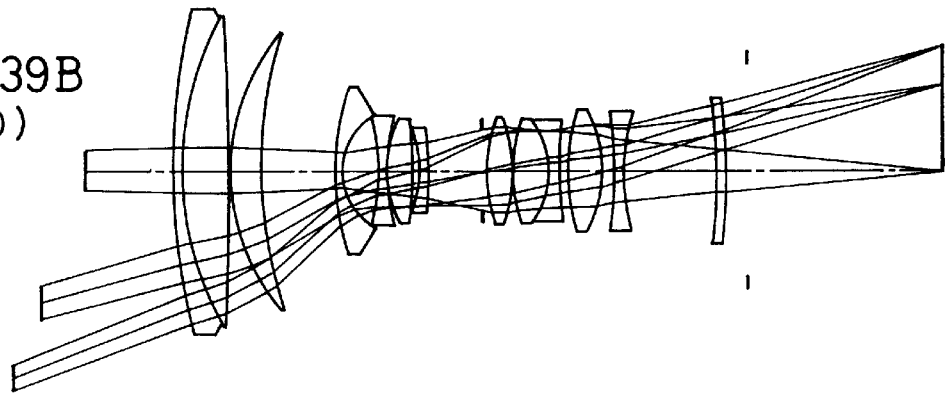
Figure 39C:
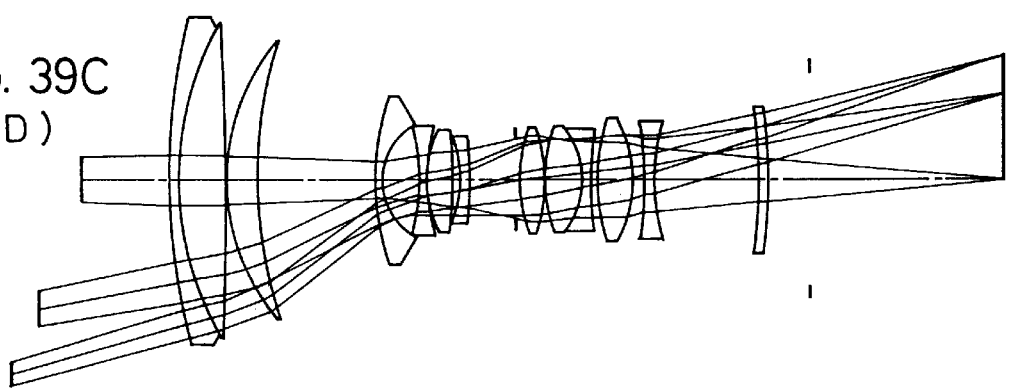

FIGS. 35A to 35C are diagrams showing the zooming operation of the eighth to eleventh embodiments;

FIGS. 36A to 36C are diagrams showing the focusing operation of the eighth embodiment;

FIGS. 37A to 37C are diagrams showing the focusing operation of the ninth embodiment;

FIGS. 38A to 38C diagrams showing the focusing operation of the tenth embodiment; and FIGS. 39A to 39C are diagrams showing the focusing operation of the eleventh embodiment.

DESCRIPTION OF THE PREFERRED EMBODIMENTS

Hereinafter, zoom lens systems according to the present invention will be described with reference to the drawings. FIGS. 3, 5, and 7 are lens construction diagrams corresponding to the zoom lens systems of the embodiments 1, 2, and 3, respectively. Each figure shows lens arrangements in the infinite-shooting-distance state [W(∞)], and the closest-shooting-distance state [W(D)], both at the wide-angle end. In each lens construction diagram, the arrows M2, M3, and M4 schematically indicate the focusing or floating movement of the second, third, and fourth lens units Gr2, Gr3, and Gr4, respectively, from the infinite-shooting-distance state [W(∞)] to the closest-shooting-distance state [W(D)] at the wide-angle end. Further, d5 represents the axial distance between the first and second lens units Gr1 and Gr2, d13 represents the axial distance between the second and third lens units Gr2 and Gr3, and d19 represents the axial distance between the third and fourth lens units Gr3 and Gr4.

The zoom lens systems of the embodiments 1 to 3 each consist of, from the object-side end, a first lens unit Gr1 having a positive refractive power, a second lens unit Gr2 having a negative refractive power, a third lens unit Gr3 having positive refractive power, and a fourth lens unit Gr4 having a positive refractive power. The first lens unit Gr1 is composed of, from the object-side end, a composite lens of a negative meniscus lens with its concave surface facing toward the image side and a biconvex positive lens, and a positive meniscus lens with its convex surface facing toward the object side. The second lens unit Gr2 is composed of, from the object-side end, a negative meniscus lens with its concave surface facing toward the image side, a biconcave negative lens, a biconvex positive lens, and a negative meniscus lens with its concave surface facing toward the object side. The third lens unit Gr3 is composed of, from the object-side end, an aperture diaphragm, a biconvex positive lens, and a composite lens of a biconvex positive lens and a biconcave negative lens. The fourth lens unit Gr4 is composed of, from the object-side end, a biconvex positive lens, and a biconcave negative lens whose object-side surface is an aspherical surface.

The focusing movement of the second lens unit Gr2 achieves internal focusing. Since, during this focusing, the floating movement of the third and fourth lens units Gr3 and Gr4 causes the axial distance d19 between them to vary, the inclination of the image surface resulting from the focusing using the second lens unit Gr2 is corrected. During zooming from the wide-angle end to the telephoto end, all the lens units Gr1 to Gr4 moves forward. As described earlier, this construction in which all the lens units are movable makes it easy to widen the zooming range and to correct aberration.

Hereinafter, the zoom lens systems of the embodiments 1 to 3, together with an example for comparison, will be described more specifically in terms of construction, with reference to their construction data, aberration performance, and other characteristics. In the construction data, ri (i=1, 2, 3, . . . ) represents the curvature radius of the i-th surface from the object-side end, di (i=1, 2, 3, . . . ) represents the i-th axial distance from the object-side end, and Ni (i=1, 2, 3, . . . ) and vi (i=1, 2, 3, . . . ) represent the d-lines refractive coefficient (Nd) and the Abbe number (vd) of the i-th lens from the object-side end. A surface whose curvature radius (ri) is marked with an asterisk (*) is an aspherical surface. Suppose that the shape of such a surface is defined by the following expression (A).

$$X = \frac{C \cdot Y^2}{1 + (1 - \epsilon \cdot Y^2 \cdot C^2)^{1/2}} + \sum_i A i Y^i \quad (A)$$

where

X: displacement from the reference surface of the optical axis direction;

Y: height in the direction perpendicular to the optical axis;

C: paraxial curvature;

$\epsilon$: quadric surface parameter;

Ai (i=1, 2, 3 . . . ): aspherical coefficient.

First, the construction data of the embodiments 1 to 3 and the comparison example will be shown below, together with the axial distances (d5, d13, d19) that vary with zooming in the infinite-shooting-distance state. In addition, the focal lengths f and the f-numbers FNO of the whole system at the wide-angle end [W(∞)], at the midpoint (medium focal length state) [M(∞)], and at the telephoto end [T(∞)] in the infinite-shooting-distance state are also shown below.

TABLE 1

<Construction Data: Embodiments 1 to 3, the Comparison Example>
f = 22.5~50.5~78.0
FNo = 4.10~5.21~5.67

| | Curvature Radius | Axial Surface Distance | Refractive Power | Abbe Number |
|---|---|---|---|---|
| r1 | 105.189 | d1 1.300 | N1 1.83350 | v1 21.00 |
| r2 | 49.269 | d2 6.100 | N2 1.58913 | v2 61.11 |
| r3 | −507.117 | d3 0.100 | | |
| r4 | 29.478 | d4 4.560 | N3 1.75450 | v3 51.57 |
| r5 | 56.439 | d5 1.870~14.604~21.719 | | |
| r6 | 36.467 | d6 1.100 | N4 1.83400 | v4 37.05 |
| r7 | 9.278 | d7 5.090 | | |
| r8 | −31.258 | d8 1.000 | N5 1.75450 | v5 51.57 |
| r9 | 21.659 | d9 0.100 | | |
| r10 | 16.555 | d10 3.700 | N6 1.79850 | v6 22.60 |
| r11 | −52.248 | d11 0.920 | | |
| r12 | −16.197 | d12 1.300 | N7 1.69680 | v7 56.47 |
| r13 | −46.193 | d13 9.806~4.189~1.810 | | |
| r14 | ∞ (aperture) | d14 0.800 | | |
| r15 | 25.517 | d15 3.350 | N8 1.60311 | v8 60.74 |
| r16 | −24.538 | d16 0.100 | | |
| r17 | 24.105 | d17 5.000 | N9 1.51742 | v9 52.15 |
| r18 | −12.147 | d18 1.340 | N10 1.80741 | v10 31.59 |
| r19 | 62.656 | d19 5.400~1.210~0.770 | | |
| r20 | 28.821 | d20 4.760 | N11 1.51742 | v11 52.15 |

TABLE 1-continued

<Construction Data: Embodiments 1 to 3, the Comparison Example>
f = 22.5~50.5~78.0
FNo = 4.10~5.21~5.67

| | Curvature Radius | Axial Surface Distance | Refractive Power | Abbe Number |
|---|---|---|---|---|
| r21 | −17.785 | d21 1.620 | | |
| r22* | −128.506 | d22 1.440 | N12 1.80750 | v12 35.43 |
| r23 | 33.569 | | | |

Figure 1:
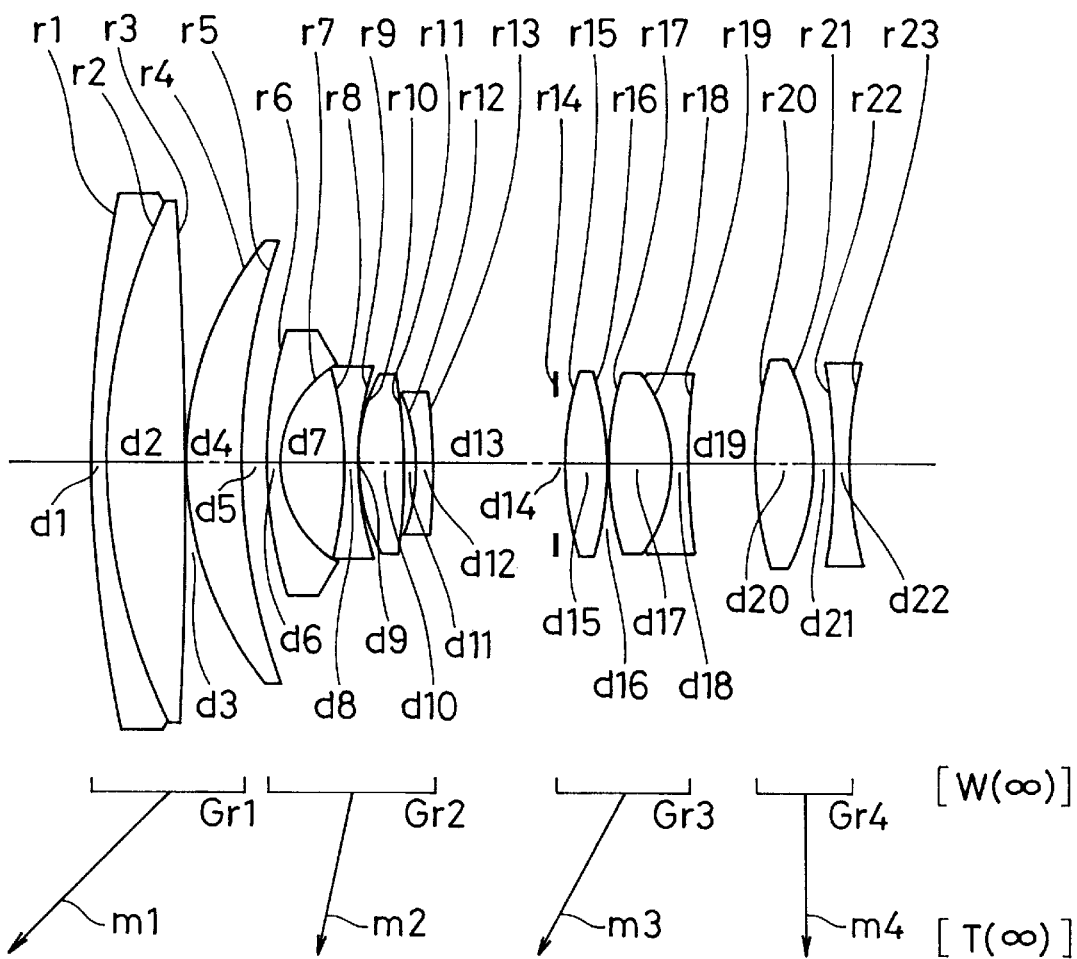
FIG. 1 is a lens construction diagram showing the zooming operation in the infinite-shooting-distance state of the first to third and fifth embodiments of the present invention and of a comparison example.
Figure 2A:
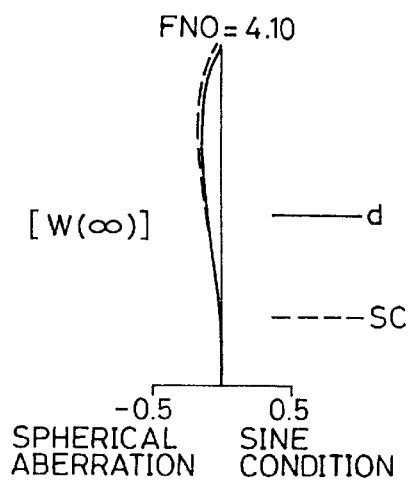
Figure 2B:
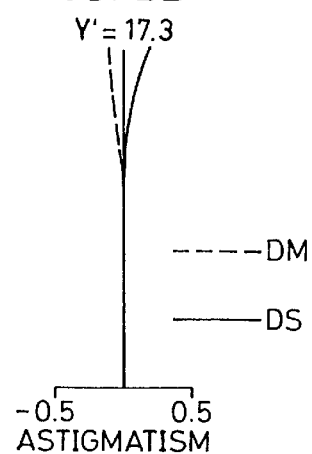
Figure 2C:
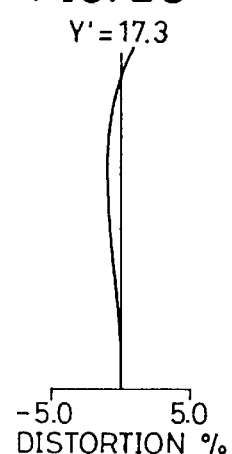
Figure 2D:
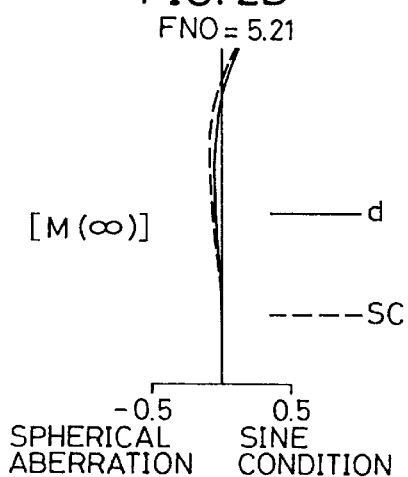
Figure 2E:
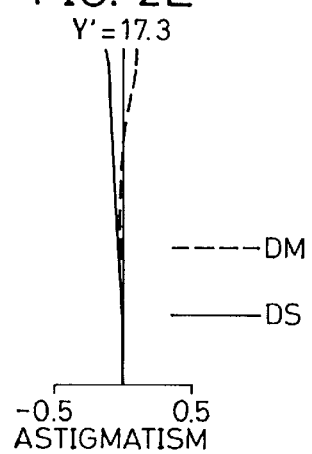
Figure 2F:
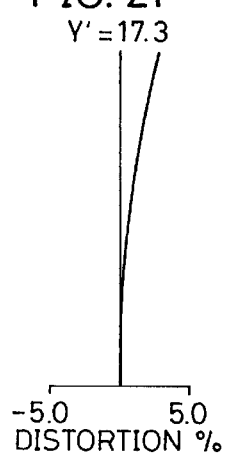
Figure 2G:
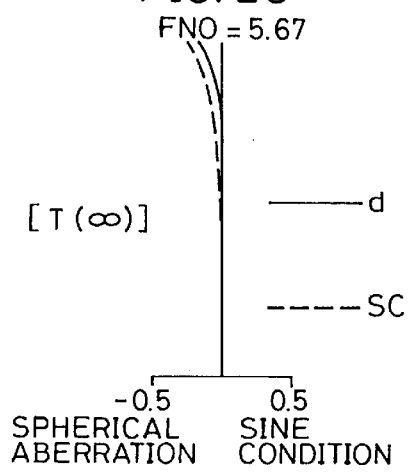
Figure 2H:
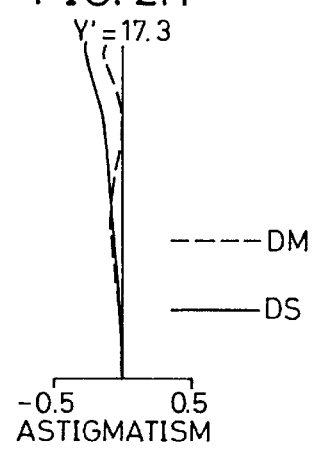
Figure 2I:
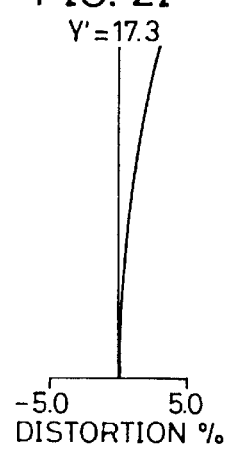

Aspherical Coefficient
r22:

$\epsilon$ = 1.0000
A4 = 0.71856 × 10$^{-4}$
A6 = −0.26052 × 10$^{-6}$
A8 = 0.22685 × 10$^{-9}$
A10 = −0.11743 × 10$^{-10}$
A12 = 0.15020 × 10$^{-13}$ FIG. 1 shows the lens construction of the embodiments 1 to 3 and the comparison example, which are represented by the above construction data, in the infinite-shooting-distance state at the wide-angle end [W(∞)], and the movements of the lens units Gr1 to Gr4 from that state [W(∞)] to the infinite-shooting-distance state at the telephoto end [T(∞)]. In FIG. 1, the arrows m1 to m4 indicate the movements of the lens units Gr1 to Gr4, respectively. These movements of the lens units Gr1 to Gr4 (each moves forward) effect zooming (f=22.5 to 78.0 mm) in the embodiments 1 to 3 and in the comparison example, thereby allowing the view of angle 2ω to vary in the range between 75° and 25°.

Tables 1 to 4 below list the axial distances (d5, d13, d19), the shooting magnifications β, and the effective f-numbers FNO at the wide-angle end [W(D)], at the midpoint [M(D)], and at the telephoto end [T(D)] in the closest-shooting-distance state (shooting distance=0.25 m) of the embodiments 1 to 3 and the comparison example.

TABLE 2

<Embodiment 1 (Focusing: Gr2, Floating: Gr3)>

| | d5 | d13 | d19 | β | Effective FNO |
|---|---|---|---|---|---|
| W(D) | 0.079 | 11.076 | 5.920 | −0.12 | 4.10 |
| M(D) | 11.575 | 6.697 | 1.730 | −0.22 | 5.21 |
| T(D) | 17.185 | 5.825 | 1.290 | −0.28 | 5.67 |

TABLE 3

<Embodiment 2 (Focusing: Gr2, Floating: Gr4)>

| | d5 | d13 | d19 | β | Effective FNO |
|---|---|---|---|---|---|
| W(D) | 0.358 | 11.318 | 5.920 | −0.11 | 4.06 |
| M(D) | 11.995 | 6.797 | 1.730 | −0.22 | 5.16 |
| T(D) | 17.627 | 5.902 | 1.290 | −0.28 | 5.62 |

TABLE 4

<Embodiment 3 (Focusing: Gr2, Floating: Gr3, Gr4)>

|      | d5     | d13    | d19   | β     | Effective FNO |
|------|--------|--------|-------|-------|---------------|
| W(D) | 0.220  | 11.196 | 5.920 | -0.12 | 4.08          |
| M(D) | 11.786 | 6.747  | 1.730 | -0.22 | 5.19          |
| T(D) | 17.406 | 5.863  | 1.290 | -0.28 | 5.64          |

TABLE 5

<Comparison Example (Focusing: Gr2 alone)>

|      | d5     | d13    | d19   | β     | Effective FNO |
|------|--------|--------|-------|-------|---------------|
| W(D) | 0.596  | 11.079 | 5.400 | -0.12 | 4.09          |
| M(D) | 12.107 | 6.686  | 1.210 | -0.22 | 5.21          |
| T(D) | 17.715 | 5.814  | 0.770 | -0.28 | 5.67          |

Tables 5 to 8 below list the movement amount and the values corresponding to the conditional expression (1) above of the second to fourth lens units Gr2 to Gr4 at the wide-angle end [W(D)], at the midpoint [M(D)], and at the telephoto end [T(D)] during focusing (from the infinite-shooting-distance state to the closest-shooting-distance state, shooting distance=0.25 m) of the embodiments 1 to 3 and the comparison example.

TABLE 6

<Embodiment 1>

|      | $x_2$ | $x_3$ | $x_4$ | $\Delta x_{3,4}$ |
|------|-------|-------|-------|-------|
| W(D) | 1.791 | 0.520 | 0.000 | 0.520 |
| M(D) | 3.029 | 0.520 | 0.000 | 0.520 |
| T(D) | 4.534 | 0.520 | 0.000 | 0.520 |

TABLE 7

<Embodiment 2>

|      | $x_2$ | $x_3$ | $x_4$  | $\Delta x_{3,4}$ |
|------|-------|-------|--------|-------|
| W(D) | 1.512 | 0.000 | -0.520 | 0.520 |
| M(D) | 2.609 | 0.000 | -0.520 | 0.520 |
| T(D) | 4.092 | 0.000 | -0.520 | 0.520 |

TABLE 8

<Embodiment 3>

|      | $x_2$ | $x_3$ | $x_4$  | $\Delta x_{3,4}$ |
|------|-------|-------|--------|-------|
| W(D) | 1.650 | 0.260 | -0.260 | 0.520 |
| M(D) | 2.818 | 0.260 | -0.260 | 0.520 |
| T(D) | 4.313 | 0.260 | -0.260 | 0.520 |

TABLE 9

<Comparison Example (focusing with Gr2 alone)>

|      | $x_2$ | $x_3$ | $x_4$ | $\Delta x_{3,4}$ |
|------|-------|-------|-------|-------|
| W(D) | 1.274 | 0.000 | 0.000 | 0.000 |
| M(D) | 2.497 | 0.000 | 0.000 | 0.000 |
| T(D) | 4.004 | 0.000 | 0.000 | 0.000 |

FIG. 2 shows aberration curves of the embodiments 1 to 3 and the comparison example in the infinite-shooting-distance state, illustrating aberrations at the wide-angle end [W(∞)], at the midpoint [M(∞)], and at the telephoto end [T(∞)]. FIGS. 4, 6, 8, and 10 show aberration curves of the embodiments 1 to 3 and the comparison example, respectively, in the closest-shooting-distance state, illustrating aberrations at the wide-angle end [W(D)], at the midpoint [M(D)], and at the telephoto end [T(D)]. In these figures, solid lines (d) represent d-lines aberrations, broken lines (SC) represent sine conditions, and broken lines (DM) and solid lines (DS) represent astigmatisms on the meridional image surface and on the sagittal image surface, respectively.

In the embodiments 1 to 3, the inclination of the image surface resulting from the focusing movement of the second lens unit Gr2 (indicated by arrow M2 in each figure) is corrected by the variation in distance d19 between the third and fourth lens unit Gr3 and Gr4. The variation in distance d19 between the third and fourth lens unit Gr3 and Gr4 is achieved by the floating movement (arrow M3) of the third lens unit Gr3 toward the object side during focusing in the embodiment 1, by the floating movement (arrow M4) of the fourth lens unit Gr4 toward the image-surface side during focusing in the embodiment 2, and by the floating movement (arrow M3) of the third lens unit Gr3 toward the object side and the floating movement (arrow M4) of the fourth lens unit Gr4 toward the image-surface side during focusing in the embodiment 3.

In the comparison example, focusing is achieved by simply moving the second lens unit Gr2, without any floating. FIG. 9 shows the lens arrangement of this comparison example in the closest-shooting-distance state at the wide-angle end [W(D)]. From the aberration curves in FIG. 10, it is seen that the image surface inclines downward at each shooting magnification β(=-0.12 to -0.28). The inclination of the image surface is especially striking at the telephoto end [T(D)] where the shooting magnification exceeds -1/4 and reaches -1/3.6. In addition, the inclination of the image surface also impairs the optical performance even at the wide-angle end [W(D)].

By contrast, in the embodiments 1 to 3, the inclination of the image surface is properly corrected at the shooting magnifications similar to those used with the comparison example (see the aberration curves in FIGS. 2, 4, 6, and 8). Consequently, it is possible to maintain the image-surface in a good condition over the whole range from infinite to closest shooting distances. Furthermore, in the embodiments 1 to 3, the distance d19, which is varied for image-surface correction, is kept constant even during zooming as long as the shooting distance is kept constant. This is because such a method allows the cam construction to be simplified. It is of course possible to allow the distance d19 to vary with zooming in order to achieve better image-surface correction.

As described above, according to the present invention, during focusing, while the second lens unit moves, the distance between the nth and (n+1)th lens units varies. This keeps aberration deterioration small even when the closest shooting distance is made shorter. As a result, it is possible to shoot an object at closer distances than ever.

Note that the present invention can also be applied to a zoom lens system consisting of five or more lens units.

Hereinafter, zoom lens systems according to the present invention will be described with reference to the drawings. FIGS. 11, 1, 17, and 21 are lens construction diagrams corresponding to the zoom lens systems of the embodiments 4, 5, 6, and 7, respectively, each illustrating lens arrangements in the infinite-shooting-distance state [W(∞)] at the wide-angle end. In each lens construction diagram, ri (i=1, 2, 3, . . . ) represents the curvature radius of the i-th surface from the object-side end, di (i=1, 2, 3, . . . ) represents the i-th axial distance from the object-side.

The zoom lens systems of the embodiment 4 to 7 consist of four lens units, that is, from the object-side end, a first lens unit Gr1 having a positive refractive power, a second lens unit Gr2 having a negative refractive power, a third lens unit Gr3 having a positive refractive power, and a fourth lens unit Gr4 having a positive refractive power. The lens units Gr1 to Gr4, as indicated by corresponding arrows m1 to m4 in each lens construction diagram, all move forward during zooming from the wide-angle end [W(∞)] to the telephoto end [T(∞)] in such a way that the distance between the first and second lens units Gr1 and Gr2 increases and the distance between the second and third lens units Gr2 and Gr3 decreases. As described earlier, this construction in which all the lens units are movable makes it easy to widen the zooming range and to correct aberration.

In the embodiments 4, 6, and 7, the first lens unit Gr1 is composed of, from the object-side end, a composite lens of a negative meniscus lens with its concave surface facing toward the image side and a biconvex lens, and a positive meniscus lens with its convex surface facing toward the object side. The second lens unit Gr2 is composed of, from the object-side end, a negative meniscus lens with its concave surface facing toward the image side, a biconcave negative lens, a positive meniscus lens with its convex surface facing toward the object side, and a negative meniscus lens with its concave surface facing toward the object side. The third lens unit Gr3 is composed of, from the object-side end, an aperture diaphragm, two biconvex positive lens, and a negative meniscus lens with its concave surface facing toward the object side. The fourth lens unit Gr4 is composed of, from the object-side end, a biconvex positive lens, and a biconcave negative lens whose object-side surface is an aspherical surface.

In the embodiment 5, as shown in FIG. 1, the first lens unit Gr1 is composed of, from the object-side end, a composite lens of a negative meniscus lens with its concave surface facing toward the image side and a biconvex positive lens, and a positive meniscus lens with its convex surface facing toward the object side. The second lens unit Gr2 is composed of, from the object-side end, a negative meniscus lens with its concave surface facing toward the image side, a biconcave negative lens, a biconvex positive lens, and a negative meniscus lens with its concave surface facing toward the object side. The third lens unit Gr3 is composed of, from the object-side end, an aperture diaphragm, a biconvex positive lens, and a composite lens of a biconvex positive lens and a biconcave negative lens. The fourth lens unit Gr4 is composed of, from the object-side end, a biconvex positive lens, and a biconcave negative lens whose object-side surface is an aspherical surface.

FIGS. 13, 15, 19, and 23 are lens construction diagrams corresponding to the zoom lens systems of the embodiments 4, 5, 6, and 7, respectively, each illustrating lens arrangements in the closest-shooting-distance state [W(D)] at the wide-angle end. As seen from these diagrams, in any of these embodiments, the second lens unit Gr2 moves toward the object side during focusing for close-up shooting. However, since the refractive power of the second lens unit Gr2 is strengthened to satisfy the above conditional expressions (2) and (4), a high degree of optical performance is obtained even when the closest shooting distance is made shorter. As a result, it is possible to shoot an object at closer distances than ever. Moreover, since the refractive power of the fourth lens unit Gr4 is weakened by satisfying the above conditional expressions (3) and (4), the deterioration of the off-axial optical performance (especially sagittal coma aberration and the like), as occurs when the whole system is made more compact, is reduced. As a result, it is possible to make the whole zoom lens system more compact at the same as realizing a high degree of optical performance.

Hereinafter, the zoom lens systems of the embodiments 4 to 7 will be described more specifically in terms of construction, with reference to their construction data, aberration performance, and other characteristics. The construction data of the embodiments 4, 5, 6, and 7 are shown on the Tables 10, 1, 11, and 12. In the construction data, ri (i=1, 2, 3, . . . ) represents the curvature radius of the i-th surface from the object-side end, di (i=1, 2, 3, . . . ) represents the i-th axial distance from the object-side end, and Ni (i=1, 2, 3, . . .) and vi (i=1, 2, 3, . . .) represent the d-lines refractive coefficient (Nd) and the Abbe number (vd) of the i-th lens from the object-side end. In the construction data, the axial distances that vary with zooming represent the distances between the lens units at the wide-angle end [W(∞)], at the midpoint (medium focal length state) [M(∞)], and at the telephoto end [T(∞)] in the infinite-shooting-distance state, and these values are shown together with the focal lengths f and the f-numbers FNO of the whole system in respective states. A surface whose curvature radius (ri) is marked with an asterisk (*) is an aspherical surface. Suppose that the shape of such a surface is defined by the above-described expression (A).

TABLE 10

<Construction Data: Embodiments 4>
f = 28.8~53.5~82.0
FNo = 4.10~4.90~5.80

| | Curvature Radius | Axial Surface Distance | Refractive Power | Abbe Number |
|---|---|---|---|---|
| r1 | 111.490 | d1 2.000 | N1 1.84666 | v1 23.82 |
| r2 | 49.000 | d2 6.600 | N2 1.51680 | v2 64.20 |
| r3 | −253.588 | d3 0.100 | | |
| r4 | 31.982 | d4 2.723 | N3 1.72000 | v3 50.31 |
| r5 | 52.641 | d5 3.400~13.522~22.329 | | |
| r6 | 52.641 | d6 1.100 | N4 1.80500 | v4 40.97 |
| r7 | 11.955 | d7 3.886 | | |
| r8 | −59.054 | d8 1.100 | N5 1.80500 | v5 40.97 |
| r9 | 58.808 | d9 0.100 | | |
| r10 | 21.363 | d10 2.569 | N6 1.83350 | v6 21.00 |
| r11 | 318.494 | d11 1.583 | | |
| r12 | −16.476 | d12 1.000 | N7 1.48749 | v7 70.44 |
| r13 | −40.870 | d13 10.712~4.278~1.000 | | |
| r14 | ∞ (aperture) | d14 0.800 | | |
| r15 | 22.211 | d15 2.673 | N8 1.78100 | v8 44.55 |
| r16 | −121.973 | d16 0.100 | | |
| r17 | 54.427 | d17 3.894 | N9 1.48749 | v9 70.44 |
| r18 | −16.631 | d18 0.550 | | |
| r19 | −13.916 | d19 1.404 | N10 1.80518 | v10 25.43 |
| r20 | −54.389 | d20 3.650~1.550~0.750 | | |
| r21 | 43.817 | d21 3.633 | N11 1.58913 | v11 61.11 |
| r22 | −17.679 | d22 3.192 | | |
| r23* | −24.378 | d23 1.400 | N12 1.77250 | v12 49.77 |

TABLE 10-continued

<Construction Data: Embodiments 4>
f = 28.8~53.5~82.0
FNo = 4.10~4.90~5.80

| | Curvature Radius | Axial Surface Distance | Refractive Power | Abbe Number |
|---|---|---|---|---|
| r24 | 48.189 | | | |

Aspherical Coefficient
r23:

$\epsilon = 1.0000$
$A4 = -0.10399 \times 10^{-3}$
$A6 = -0.83377 \times 10^{-7}$
$A8 = -0.17037 \times 10^{-7}$
$A10 = 0.40368 \times 10^{-9}$
$A12 = -0.35927 \times 10^{-11}$

TABLE 11

<Construction Data: Embodiments 6>
f = 22.6~50.5~78.0
FNo = 4.10~5.26~5.67

| | Curvature Radius | Axial Surface Distance | Refractive Power | Abbe Number |
|---|---|---|---|---|
| r1 | 105.189 | d1 1.300 | N1 1.83350 | v1 21.00 |
| r2 | 53.669 | d2 6.550 | N2 1.58913 | v2 61.11 |
| r3 | −205.629 | d3 0.100 | | |
| r4 | 29.463 | d4 4.250 | N3 1.71300 | v3 53.93 |
| r5 | 53.227 | d5 1.845~14.835~22.393 | | |
| r6 | 52.326 | d6 1.100 | N4 1.80420 | v4 46.50 |
| r7 | 10.138 | d7 4.400 | | |
| r8 | −30.399 | d8 1.000 | N5 1.75450 | v5 51.57 |
| r9 | 20.301 | d9 0.300 | | |
| r10 | 16.862 | d10 3.700 | N6 1.75000 | v6 25.14 |
| r11 | −36.284 | d11 0.950 | | |
| r12 | −15.519 | d12 1.300 | N7 1.69680 | v7 56.47 |
| r13 | −45.760 | d13 10.041~4.350~2.000 | | |
| r14 | ∞ (aperture) | d14 0.500 | | |
| r15 | 24.865 | d15 3.300 | N8 1.62041 | v8 60.29 |
| r16 | −28.088 | d16 0.100 | | |
| r17 | 26.355 | d17 4.720 | N9 1.51742 | v9 52.15 |
| r18 | −12.599 | d18 1.360 | N10 1.80741 | v10 31.59 |
| r19 | 121.808 | d19 5.300~1.560~1.000 | | |
| r20 | 40.196 | d20 4.800 | N11 1.51823 | v11 58.96 |
| r21 | −17.479 | d21 1.470 | | |
| r22* | −88.664 | d22 1.450 | N12 1.80500 | v12 40.97 |
| r23 | 41.938 | | | |

Aspherical Coefficient
r22:

$\epsilon = 1.0000$
$A4 = -0.69660 \times 10^{-4}$
$A6 = -0.22557 \times 10^{-6}$
$A8 = -0.17938 \times 10^{-9}$
$A10 = -0.13539 \times 10^{-10}$
$A12 = 0.29634 \times 10^{-14}$

TABLE 12

<Construction Data: Embodiments 7>
f = 22.6~50.5~78.0
FNo = 4.10~5.26~5.67

| | Curvature Radius | Axial Surface Distance | Refractive Power | Abbe Number |
|---|---|---|---|---|
| r1 | 99.570 | d1 1.300 | N1 1.83350 | v1 21.00 |
| r2 | 51.213 | d2 6.550 | N2 1.58913 | v2 61.11 |
| r3 | −231.256 | d3 0.100 | | |
| r4 | 29.771 | d4 4.250 | N3 1.71300 | v3 53.93 |
| r5 | 41.486 | d5 1.845~14.063~23.329 | | |

TABLE 12-continued

<Construction Data: Embodiments 7>
f = 22.6~50.5~78.0
FNo = 4.10~5.26~5.67

| | Curvature Radius | Axial Surface Distance | Refractive Power | Abbe Number |
|---|---|---|---|---|
| r6 | 48.547 | d6 1.100 | N4 1.80420 | v4 46.50 |
| r7 | 10.166 | d7 4.400 | | |
| r8 | −29.871 | d8 1.000 | N5 1.75450 | v5 51.57 |
| r9 | 20.567 | d9 0.300 | | |
| r10 | 17.091 | d10 3.700 | N6 1.75000 | v6 25.14 |
| r11 | −35.212 | d11 0.950 | | |
| r12 | −15.461 | d12 1.300 | N7 1.69680 | v7 56.47 |
| r13 | −45.120 | d13 9.776~3.945~2.000 | | |
| r14 | ∞ (aperture) | d14 0.500 | | |
| r15 | 24.012 | d15 3.300 | N8 1.62041 | v8 60.29 |
| r16 | −27.706 | d16 0.100 | | |
| r17 | 25.738 | d17 4.720 | N9 1.51742 | v9 52.15 |
| r18 | −12.417 | d18 1.360 | N10 1.80741 | v10 31.59 |
| r19 | 103.642 | d19 5.300~1.560~1.000 | | |
| r20 | 40.082 | d20 4.800 | N11 1.51823 | v11 58.96 |
| r21 | −17.548 | d21 1.470 | | |
| r22* | −98.721 | d22 1.450 | N12 1.80500 | v12 40.97 |
| r23 | 40.242 | | | |

Aspherical Coefficient
r22:

$\epsilon = 1.0000$
$A4 = -0.70354 \times 10^{-4}$
$A6 = -0.23711 \times 10^{-6}$
$A8 = -0.27543 \times 10^{-9}$
$A10 = -0.13964 \times 10^{-10}$
$A12 = 0.21543 \times 10^{-14}$ In the embodiment 4, as shown in FIG. 11, the lens units Gr1 to Gr4 move forward (m1 to m4) to effect zooming (f=28.8 to 82.0 mm). The zooming allows the angle of view 2ω to vary between 62° to 24°. In the embodiment 5, as shown in FIG. 1, the lens units Gr1 to Gr4 move forward (m1 to m4) to effect zooming (f=22.5 to 78.0 mm). The zooming allows the angle of view 2ω to vary between 75° to 25°. In the embodiment 6, as shown in FIG. 17, the lens units Gr1 to Gr4 move forward (m1 to m4) to effect zooming (f=22.6 to 78.0 mm). The zooming allows the angle of view 2ω to vary between 75° to 25°. In the embodiment 7, as shown in FIG. 21, the lens units Gr1 to Gr4 move forward (m1 to m4) to effect zooming (f=22.6 to 78.0 mm). The zooming allows the angle of view 2ω to vary between 75° to 25°.

Tables 13 to 16 below list the axial distances d5, d13, d19, and d20 that vary with focusing, the shooting magnifications β, and the effective f-numbers FNO at the wide-angle end [W(D)], at the midpoint [M(D)], and at the telephoto end [T(D)] in the closest-shooting-distance state of the embodiments 4 to 7. The lens arrangement of each embodiment in the closest-shooting-distance state at the wide-angle end [W(D)] is shown in FIGS. 13, 15, 19, and 23.

TABLE 13

<Embodiment 4 (shooting range = 0.4 m)>

| | d5 | d13 | d20 | β | Effective FNO |
|---|---|---|---|---|---|
| W(D) | 1.827 | 12.285 | 3.650 | −0.08 | 4.09 |
| M(D) | 11.239 | 6.561 | 1.550 | −0.14 | 4.88 |
| T(D) | 19.006 | 4.323 | 0.750 | −0.20 | 5.76 |

TABLE 14

<Embodiment 5 (shooting range = 0.3 m)>

|  | d5 | d13 | d19 | β | Effective FNO |
|---|---|---|---|---|---|
| W(D) | 0.853 | 10.822 | 5.400 | −0.09 | 4.09 |
| M(D) | 12.542 | 6.250 | 1.210 | −0.18 | 5.21 |
| T(D) | 18.287 | 5.242 | 0.770 | −0.24 | 5.67 |

TABLE 15

<Embodiment 6 (shooting range = 0.3 m)>

|  | d5 | d13 | d19 | β | Effective FNO |
|---|---|---|---|---|---|
| W(D) | 0.839 | 11.047 | 5.300 | −0.09 | 4.09 |
| M(D) | 12.815 | 6.370 | 1.560 | −0.19 | 5.26 |
| T(D) | 19.008 | 5.385 | 1.000 | −0.24 | 5.67 |

TABLE 16

<Embodiment 7 (shooting range = 0.3 m)>

|  | d5 | d13 | d19 | β | Effective FNO |
|---|---|---|---|---|---|
| W(D) | 1.054 | 10.561 | 5.300 | −0.10 | 4.09 |
| M(D) | 12.722 | 5.286 | 1.560 | −0.21 | 5.29 |
| T(D) | 21.179 | 4.419 | 1.000 | −0.28 | 5.72 |

TABLE 17

<Corresponding Values in Conditional Expressions (2) to (4)>

|  | Embodiment 4 | Embodiment 5 | Embodiment 6 | Embodiment 7 |
|---|---|---|---|---|
| $|f_1/f_2|$ | 5.144 | 5.723 | 5.774 | 6.786 |
| $f_3/f_4$ | 0.168 | 0.480 | 0.386 | 0.381 |
| $(\beta_{2T}/\beta_{2W})/Z$ | 0.724 | 0.594 | 0.594 | 0.506 |

FIGS. 12A to 12I, 2A to 2I, 18A to 18I, and 22A to 22I show aberration curves of the embodiments 4 to 7, respectively, in the infinite-shooting-distance state, illustrating aberrations at the wide-angle end [W(∞)], at the midpoint [M(∞)], and at the telephoto end [T(∞)]. FIGS. 14A to 14I, 16A to 16I, 20A to 20I, and 24A to 24I show aberration curves of the embodiments 4 to 7, respectively, in the closest-shooting-distance state, illustrating aberrations at the wide-angle end [W(D)], at the midpoint [M(D)], and at the telephoto end [T(D)]. In these figures, solid lines (d) represent d-lines aberrations, broken lines (SC) represent sine conditions, and broken lines (DM) and solid lines (DS) represent astigmatisms on the meridional image surface and on the sagittal image surface, respectively.

In any of these embodiments 4 to 7, the second lens unit Gr2 moves as a focusing lens unit. However, since the above-mentioned conditional expressions (2) and (4) are satisfied, a high degree of optical performance is obtained even when the closest shooting distance is made shorter. As a result, it is possible to shoot an object at closer distances than ever. Moreover, since the above-mentioned conditional expressions (3) and (4) are satisfied, the deterioration of the off-axial optical performance (especially sagittal coma aberration and the like), as occurs when the whole system is made more compact, is reduced. As a result, it is possible to make the whole zoom lens system more compact at the same as realizing a high degree of optical performance.

Next, the embodiments 8 to 11 of the present invention will be described below. The zoom lens systems of these embodiments consist of five lens units. Of the five lens units, the first to fourth lens units Gr1 to Gr4 are substantially the same as the lens units in the above-described embodiments 1 to 7. The fifth lens unit Gr5 is composed of a weakly negative meniscus lens with its convex surface facing toward the image-side end. This lens has aspherical surfaces on its both sides. The fifth lens unit Gr5 is stationary, and therefore it does not move either during zooming or during focusing.

Table 18 shows the construction data of the embodiments 8 to 11 together with the axial distance (d5, d13, d19, d23) that vary with zooming in the infinite-shooting-distance state. In addition, the focal length f and the f-number FNO of the whole system at the wide-angle end [W(∞)], at the midpoint (medium focal length state) [M(∞)], and at the telephoto end [T(∞)] in the infinite-shooting-distance state are also shown in Table 18.

TABLE 18

<Construction Data: Embodiments 8 to 11>
f = 22.5~50.0~85.0
FNo = 4.10~5.21~5.67

|  | Curvature Radius | Axial Surface Distance | Refractive Power | Abbe Number |
|---|---|---|---|---|
| r1 | 95.973 | d1 1.300 | N1 1.83350 | ν1 21.00 |
| r2 | 45.930 | d2 6.100 | N2 1.58913 | ν2 61.11 |
| r3 | −702.662 | d3 0.100 |  |  |
| r4 | 28.536 | d4 4.500 | N3 1.75450 | ν3 51.57 |
| r5 | 57.563 | d5 2.000~12.940~21.113 |  |  |
| r6 | 37.359 | d6 1.100 | N4 1.83400 | ν4 37.05 |
| r7 | 9.310 | d7 5.090 |  |  |
| r8 | −31.835 | d8 1.000 | N5 1.75450 | ν5 51.57 |
| r9 | 21.879 | d9 0.100 |  |  |
| r10 | 16.683 | d10 3.700 | N6 1.79850 | ν6 22.60 |
| r11 | −53.142 | d11 0.920 |  |  |
| r12 | −16.181 | d12 1.300 | N7 1.69680 | ν7 56.47 |
| r13 | −48.613 | d13 10.915~4.859~1.810 |  |  |
| r14 | ∞ (aperture) | d14 0.800 |  |  |
| r15 | 25.670 | d15 3.350 | N8 1.62280 | ν8 56.88 |
| r16 | −25.589 | d16 0.100 |  |  |
| r17 | 24.697 | d17 5.000 | N9 1.51742 | ν9 52.15 |
| r18 | −12.261 | d18 1.340 | N10 1.80741 | ν10 31.59 |
| r19 | 62.995 | d19 5.400~1.210~0.770 |  |  |
| r20 | 29.336 | d20 4.760 | N11 1.51742 | ν11 52.15 |
| r21 | −17.730 | d21 1.620 |  |  |
| r22* | −128.799 | d22 1.440 | N12 1.80750 | ν12 35.43 |
| r23 | 33.411 | d23 2.000~12.790~14.330 |  |  |
| r24* | −79.926 | d24 1.200 | N13 1.75450 | ν13 51.57 |
| r25* | −97.712 |  |  |  |

Aspherical Coefficient r22: ε = 0.10000
A4 = −0.71812 × 10⁻⁴
A6 = −0.28122 × 10⁻⁶
A8 = 0.84356 × 10⁻¹¹
A10 = −0.10626 × 10⁻¹⁰
A12 = 0.43861 × 10⁻¹³ r24: ε = 0.10000
A4 = −0.47694 × 10⁻⁶
A6 = −0.18010 × 10⁻⁸
A8 = 0.33985 × 10⁻¹⁰
A1 = 0.26742 × 10⁻¹²
A12 = 0.75806 × 10⁻¹⁵ r25: ε = 0.10000
A4 = −0.26350 × 10⁻⁶
A6 = −0.35172 × 10⁻⁸
A8 = −0.60502 × 10⁻¹⁰
A10 = −0.13052 × 10⁻¹²
A12 = 0.61965 × 10⁻¹⁴

FIG. 25 shows the lens construction of the embodiments 8 to 11 which are represented by the construction data of the table 18 in the infinite-shooting-distance state at the wide-angle end [W(∞)].

Tables 19 to 22 below list the axial distances (d5, d13, d19, d23), the shooting magnification β, and the effective numbers FNO at the wide-angle end [W(D)], at the midpoint [M(D)], and at the telephoto end [T(D)] in the closest-shooting-distance state (shooting distance=0.25 m) of the embodiments 8 to 11.

TABLE 19

<Embodiment 8 (Focusing: Gr2, Floating: Gr3)>

|  | d5 | d13 | d19 | d23 | β | Effective FNO |
|---|---|---|---|---|---|---|
| W(D) | 0.082 | 12.233 | 6.000 | 2.000 | −0.12 | 4.11 |
| M(D) | 9.816 | 7.383 | 1.810 | 12.790 | −0.22 | 5.21 |
| T(D) | 15.892 | 6.431 | 1.370 | 14.330 | −0.29 | 5.67 |

TABLE 20

<Embodiment 9 (Focusing: Gr2, Floating: Gr4)>

|  | d5 | d13 | d19 | d23 | β | Effective FNO |
|---|---|---|---|---|---|---|
| W(D) | 0.361 | 12.554 | 6.000 | 1.400 | −0.11 | 4.05 |
| M(D) | 10.287 | 7.512 | 1.810 | 12.190 | −0.22 | 5.15 |
| T(D) | 16.393 | 6.530 | 1.370 | 13.730 | −0.29 | 5.61 |

TABLE 21

<Embodiment 10 (Focusing: Gr2, Floating: Gr3,Gr4)>

|  | d5 | d13 | d19 | d23 | β | Effective FNO |
|---|---|---|---|---|---|---|
| W(D) | 0.223 | 12.392 | 6.000 | 1.700 | −0.12 | 4.08 |
| M(D) | 10.052 | 7.447 | 1.810 | 12.490 | −0.22 | 5.18 |
| T(D) | 16.143 | 6.480 | 1.370 | 14.030 | −0.29 | 5.64 |

TABLE 22

<Embodiment 11 (Focusing: Gr2 alone)>

|  | d5 | d13 | d19 | d23 | β | Effective FNO |
|---|---|---|---|---|---|---|
| W(D) | 0.671 | 12.244 | 5.400 | 2.000 | −0.12 | 4.09 |
| M(D) | 10.433 | 7.366 | 1.210 | 12.790 | −0.22 | 5.21 |
| T(D) | 16.510 | 6.413 | 0.770 | 14.330 | −0.29 | 5.67 |

Tables 23 to 26 below list the movement amount and the values corresponding to the conditional expression (1) above of the second to fourth lens units Gr2 to Gr4 at the wide-angle end [W(D)], at the midpoint [M(D)], and at the telephoto end [T(D)] during focusing (from the infinite-shooting-distance state to the closest-shooting-distance state, shooting distance=0.25 m) of the embodiments 8 to 11.

TABLE 23

<Embodiment 8>

|  | $x_2$ | $x_3$ | $x_4$ | $\Delta x_{3,4}$ |
|---|---|---|---|---|
| W(D) | 1.918 | 0.600 | 0.000 | 0.600 |
| M(D) | 3.124 | 0.600 | 0.000 | 0.600 |
| T(D) | 5.221 | 0.600 | 0.000 | 0.600 |

TABLE 24

<Embodiment 9>

|  | $x_2$ | $x_3$ | $x_4$ | $\Delta x_{3,4}$ |
|---|---|---|---|---|
| W(D) | 1.639 | 0.000 | −0.600 | 0.600 |
| M(D) | 2.653 | 0.000 | −0.600 | 0.600 |
| T(D) | 4.720 | 0.000 | −0.600 | 0.600 |

TABLE 25

<Embodiment 10>

|  | $x_2$ | $x_3$ | $x_4$ | $\Delta x_{3,4}$ |
|---|---|---|---|---|
| W(D) | 1.777 | 0.300 | −0.300 | 0.600 |
| M(D) | 2.888 | 0.300 | −0.300 | 0.600 |
| T(D) | 4.970 | 0.300 | −0.300 | 0.600 |

TABLE 26

<Embodiment 11>

|  | $x_2$ | $x_3$ | $x_4$ | $\Delta x_{3,4}$ |
|---|---|---|---|---|
| W(D) | 1.329 | 0.000 | 0.000 | 0.000 |
| M(D) | 2.507 | 0.000 | 0.000 | 0.000 |
| T(D) | 4.603 | 0.000 | 0.000 | 0.000 |

FIGS. 27, 29, 31, and 33 are lens construction diagrams corresponding to the embodiments 8, 9, 10, and 11, respectively. Each figure shows the lens arrangements in the closest-shooting-distance state [W(D)] at the wide-angle end. FIGS. 28A to 28I, 30A to 30I, 32A to 32I, and 34A to 34I show aberration curves of the embodiments 8 to 11, respectively, in the closest-shooting-distance state, illustrating aberrations (FIGS. 28A to 28C, 30A to 30C, 32A to 32C, and 34A to 34C) at the wide-angle end [W(D)], aberrations (FIGS. 28D to 28F, 30D to 30F, 32D to 32F, and 34D to 34F) at the midpoint [M(D)], and aberrations (FIGS. 28G to 28I, 30G to 30I, 32G to 32I, and 34G to 34I) at the telephoto end [T(D)].

FIG. 35A shows the same state as in FIG. 25. FIGS. 35B and 35C show the states after zooming from the state of FIG. 35A. FIG. 35B shows the midpoint state, and FIG. 35C shows the telephoto state. The states shown in FIGS. 35A to 35C are common to the embodiments 8 to 11.

FIGS. 36A to 36C show the focusing states of the embodiment 8. FIGS. 37A to 37C show the focusing states of the embodiment 9. Moreover, FIGS. 38A to 38C show the focusing states of the embodiment 10. Similarly, FIGS. 39A to 39C show the focusing states of the embodiment 11. FIGS. 36A, 37A, 38A, and 39A each show the states after focusing from the state of FIG. 35A; FIGS. 36B, 37B, 38B, and 39B each show the states after focusing from the state of FIG. 35B; FIGS. 36C, 37C, 38C, and 39C each show the states after focusing from the state of FIG. 35C.

FIGS. 27, 29, 31, and 33 correspond to FIGS. 36A, 37A, 38A, and 39A, respectively.

As described above, according to the present invention, it is possible to realize a zoom lens system that offers a shorter closest shooting distance, compactness, and a high degree of optical performance at the same time.

What is claimed is:

1. A method of focusing in a zoom lens system which comprises a plurality of lens units and in which at least a first lens unit arranged at a most object-side is moved during zooming, comprising:

a step of arranging, from an object-side end, a first positive lens unit and a first negative lens unit, and further arranging at least a second positive lens unit at an image-surface side of said first negative lens unit, and arranging a third positive lens unit at said image-surface side of said second positive lens unit; and a step of moving said first negative lens unit while varying a distance between said second and third positive lens units arranged at said image-surface side of said first negative lens unit during focusing so that the third positive lens unit is moved toward an image-surface side.

2. A method of focusing as claimed in claim 1, wherein, while said first negative lens unit is moved during focusing, said second positive lens unit is moved.

3. A method of focusing as claimed in claim 1, wherein a movement amount of said first negative lens unit and an amount of change in a distance between said second and said third positive lens unit satisfy the following conditional expression:

$$0.8 \cdot |X| > |\Delta X|$$

wherein

X: movement amount of the first negative lens unit;

$\Delta X$: amount of change in a distance between the second and the third positive lens unit.

4. A method of focusing as claimed in claim 3, wherein the amount of change in the distance varying during focusing between said second and said third positive lens unit does not vary during zooming.

5. A zoom lens system having, from an object-side end, a positive first lens unit, a negative second lens unit, a positive third lens unit, and a positive fourth lens unit, wherein at least said first lens unit is moved during zooming, further comprising:

a control means for moving said second lens unit and varying a distance between said third and fourth lens units during focusing by moving the fourth lens unit toward an image-surface side.

6. A zoom lens system as claimed in claim 5, wherein, while the second lens unit is moved during focusing, the third lens unit is moved.

7. A zoom lens system as claimed in claim 6, wherein the third lens unit is moved toward an object side.

8. A zoom lens system as claimed in claim 5, wherein a movement amount of the second lens unit and an amount of change in a distance between the third and fourth lens units satisfy the following conditional expression:

$$0.8 \cdot |x_2| > |\Delta x_{3,4}|$$

where $x_2$: movement amount of the second lens unit;

$\Delta x_{3,4}$: amount of change in a distance between the third and fourth lens units.

9. A zoom lens system as claimed in claim 8, wherein the amount of change in the distance varying during focusing between the third and fourth lens units does not vary during zooming.

10. A zoom lens system comprising, from an object-side end, a positive first lens unit, a negative second lens unit, a positive third lens unit, and a positive fourth lens unit, wherein, during zooming from a shortest-focal-length end to a longest-focal-length end, all the lens units are moved in such a way that a distance between said first and second lens units increases and a distance between said second and third lens units decreases, wherein focusing for close-up shooting is achieved by moving said second lens unit toward an object side, and wherein the following conditional expressions are satisfied:

$$4.0 < |f_1/f_2| < 7.0$$

$$0.1 < f_3/f_4 < 0.5$$

$$0.45 < (\beta_{2T}/\beta_{2w})/Z < 0.75$$

where $f_1$: focal length of the first lens unit;

$f_2$: focal length of the second lens unit;

$f_3$: focal length of the third lens unit;

$f_4$: focal length of the fourth lens unit;

$\beta_{2T}$: horizontal magnification of the second lens unit at a longest-focal-length end;

$\beta_{2W}$: horizontal magnification of the second lens unit at a shortest-focal-length end;

Z: zoom ratio.

11. A zoom lens system as claimed in claim 10, wherein the fourth lens unit is provided with at least one lens element having an aspherical surface.

12. A zoom lens system comprising, from an object side, a first lens unit having a positive refractive power provided at a most object-side of the zoom lens system, said first lens unit is moved along an optical axis during zooming;

a second lens unit having a negative refractive power;

a third lens unit having a positive refractive power; and a fourth lens unit having a positive refractive power, wherein a zooming operation is performed by varying each of the distances between said first through fourth lens units, a focusing operation from an infinite-shooting-distance to a closest-shooting-distance is performed by moving said second lens unit along the optical axis toward an object side and varying a distance between said third and fourth lens units, and wherein the zoom lens system fulfills the following condition:

$$4.0 < |f1/f2| < 7.0$$

$$0.1 < f3/f4 < 0.5$$

where f1: focal length of the first lens unit f2: focal length of the second lens unit;

f3 : focal length of the third lens unit f4: focal length of the fourth lens unit.

13. A zoom lens system as claimed in claim 12, wherein said focusing operation is performed by moving said third lens and fixing the fourth lens unit.

14. A zoom lens system as claimed in claim 13, wherein said third lens unit is moved toward the object-side.

15. A zoom lens system as claimed in claim 12, wherein said focusing operation is performed by fixing said third lens and moving the fourth lens unit.

16. A zoom lens system as claimed in claim 16, wherein said fourth lens unit is moved toward the image-side.

17. A zoom lens system as claimed in claim 12, wherein said focusing operation is performed by moving said third and fourth lens units.

18. A zoom lens system as claimed in claim 17, wherein, while said third lens unit is moved toward the object-side, said fourth lens unit is moved toward the image-side.

19. A zoom lens system as claimed in claim 12, wherein said zoom lens system fulfills the following condition:

$$0.8 \cdot |X| > \Delta X|$$

where:
- X: movement amount of the first negative lens unit;
- ΔX: amount of change in a distance between the second and third lens unit.

20. A zoom lens system as claimed in claim 19, wherein said ΔX is a predetermined constant value during the zooming operation.

21. A zoom lens system comprising, from an object-side,
- a first lens unit having a positive refractive power provided at a most object-side of the zoom lens system, said first lens unit is moved along an optical axis during zooming;
- a second lens unit having a negative refractive power;
- a third lens unit having a positive refractive power; and
- a fourth lens unit having a positive refractive power,
- wherein a zooming operation is performed by varying each of the distances between said first through fourth lens units,
- wherein a focusing operation from an infinite-shooting-distance to a closest-shooting-distance is performed by moving said second lens unit along the optical axis toward an object-side and varying a distance between said third and fourth lens units, and
- wherein the variation of the distance between said third and fourth lens units is performed by moving the fourth lens unit toward the image side.

22. A zoom lens system as claimed in claim 21, wherein said zoom lens system fulfills the following condition $$0.8 \cdot |X| > \Delta X|$$

where:
- X: movement amount of the first negative lens unit;
- ΔX: amount of change in a distance between the second and third lens unit.

23. A zoom lens system as claimed in claim 22, wherein said ΔX is a predetermined constant value during the zooming operation.

24. A zoom lens system comprising, from an object side:
- a first lens unit having a positive refractive power provided at a most object-side of the zoom lens system, said first lens unit is moved along an optical axis during zooming;
- a second lens unit having a negative refractive power;
- a third lens unit having a positive refractive power; and
- a fourth lens unit having a positive refractive power,
- wherein a zooming operation is performed by varying each of the distances between said first through fourth lens units;
- wherein a focusing operation from an infinite-shooting-distance to a closest-shooting-distance is performed by moving said second lens unit along the optical axis toward an object-side and varying a distance between said third and fourth lens units, and
- wherein the variation of the distance between said third and fourth lens units is performed by moving the third lens unit toward the object-side and fourth lens unit toward the image-side.

25. A zoom lens system as claimed in claim 24, wherein said zoom lens system fulfills the following condition:

$$0.8 \cdot |x| > |\Delta x|$$

where:
- X: movement amount of the first negative lens unit;
- ΔX: amount of change in a distance between the second and third lens unit.

26. A zoom lens system as claimed in claim 25, wherein said ΔX is a predetermined constant value during the zooming operation.

27. A method of focusing in a zoom lens system which comprises a plurality of lens units and in which at least a first lens unit arranged at a most object-side is moved during zooming, comprising:
- a step of arranging, from an object-side end, a first positive lens unit and a first negative lens unit, and further arranging at least a second positive lens unit at an image-surface side of said first negative lens unit, and arranging a third positive lens unit at said image-surface side of said second positive lens unit; and
- a step of moving said first negative lens unit while varying a distance between said second and third positive lens units arranged at said image-surface side of said first negative lens unit during focusing, wherein said second positive lens unit is moved toward an object side and said third positive lens unit is moved toward an image-surface side.

28. A method of focusing as claimed in claim 27, wherein a movement amount of said first negative lens unit and an amount of change in a distance between said second and said third positive lens unit satisfy the following conditional expression:

$$0.8 \cdot |X| > |\Delta X|$$

wherein:
- X: movement amount of the first negative lens unit;
- ΔX: amount of change in a distance between the second and third positive lens unit.

29. A method of focusing as claimed in claim 28, wherein the amount of change in the distance varying during focusing between said second and said third positive lens unit does not vary during zooming.

30. A method of focusing in a zoom lens system which comprises a plurality of lens units and in which at least a first lens unit arranged at a most object-side is moved during zooming, comprising:
- a step of arranging, from an object-side end, a first positive lens unit and a first negative lens unit, and further arranging at least a second positive lens unit at an image-surface side of said first negative lens unit, and arranging a third positive lens unit at said image-surface side of said second positive lens unit; and
- a step of moving said first negative lens unit with varying a distance between said second and third positive lens units arranged at said image-surface side of said first negative lens unit during focusing, wherein a movement amount of said first negative lens unit and an amount of change in a distance between said second and second and said third positive lens unit satisfy the following conditional expression:

wherein:

X: movement amount of the first negative lens unit;

ΔX: amount of change in a distance between the second and third positive lens unit.

31. A method of focusing as claimed in claim 30, wherein the amount of change in the distance varying during focusing between said second and said third positive lens unit does not vary during zooming.

32. A zoom lens system having, from an object-side end, a positive first lens unit, a negative second lens unit, a positive third lens unit, and positive fourth lens unit, wherein at least said first lens unit is moved during zooming, further comprising:

a control means for moving said second lens unit and varying a distance between said third and fourth lens units during focusing, wherein a movement amount of the second lens unit and an amount of change in a distance between the third and fourth lens units satisfy the following conditions expression:

$$0.8 \cdot |X_2| > |\Delta X_{3,4}|$$

wherein:

$X_2$: movement amount of the second negative lens unit;

$\Delta X_{3,4}$: amount of change in a distance between the third and fourth lens units; and wherein the amount of change in the distance varying during focusing between the third and fourth lens units does not vary during zooming.

33. A zoom lens system as claimed in claim 32, wherein the fourth lens unit is provided with at least one lens element having an aspherical surface.

\* \* \* \* \*